United States Patent
Ramanasankaran et al.

(10) Patent No.: US 12,372,955 B2
(45) Date of Patent: Jul. 29, 2025

(54) BUILDING DATA PLATFORM WITH DIGITAL TWIN FUNCTIONALITY INDICATORS

(71) Applicant: Tyco Fire & Security GmbH, Neuhausen am Rheinfall (CH)

(72) Inventors: Rajiv Ramanasankaran, Santa Clara, CA (US); Ambuj Shatdal, Madison, WI (US); Michael James Risbeck, Madison, WI (US); Young Lee, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 498 days.

(21) Appl. No.: 17/737,436

(22) Filed: May 5, 2022

(65) Prior Publication Data
US 2023/0359189 A1    Nov. 9, 2023

(51) Int. Cl.
*G05B 23/02*    (2006.01)
*G06F 16/901*   (2019.01)

(52) U.S. Cl.
CPC ..... *G05B 23/0243* (2013.01); *G06F 16/9024* (2019.01)

(58) Field of Classification Search
CPC ............... G05B 23/0243; G05B 15/02; G05B 2219/2614; G05B 23/0248; G06F 16/9024; G06F 16/288; H04L 12/2803
See application file for complete search history.

(56) References Cited

U.S. PATENT DOCUMENTS

| | | |
|---|---|---|
| 5,301,109 A | 4/1994 | Landauer et al. |
| 5,446,677 A | 8/1995 | Jensen et al. |
| 5,581,478 A | 12/1996 | Cruse et al. |
| 5,812,962 A | 9/1998 | Kovac |
| 5,960,381 A | 9/1999 | Singers et al. |

(Continued)

FOREIGN PATENT DOCUMENTS

| | | |
|---|---|---|
| AU | 2019226217 A1 | 11/2020 |
| AU | 2019226264 A1 | 11/2020 |

(Continued)

OTHER PUBLICATIONS

U.S. Appl. No. 17/566,029, Passivelogic, Inc.

(Continued)

*Primary Examiner* — Yuhui R Pan
(74) *Attorney, Agent, or Firm* — Foley & Lardner LLP

(57) ABSTRACT

A building system operates to store a digital twin comprising a building graph, the building graph comprising a plurality of nodes representing a plurality of entities of a building and a plurality of edges between the plurality of nodes representing relationships between the plurality of entities. The instructions cause the one or more processors to determine a value for a functionality indicator for a piece of building equipment based on data received from the piece of building equipment, identify a first node of the plurality of nodes representing the functionality indicator by identifying an edge of the plurality of edges relating a second node of the plurality of nodes representing the piece of building equipment to the first node, and cause the first node to store the value for the functionality indicator, or a link to the value for the functionality indicator.

19 Claims, 41 Drawing Sheets

(56) References Cited

U.S. PATENT DOCUMENTS

| | | |
|---|---|---|
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,359,745 B2 | 7/2019 | Meruva et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |

(56) References Cited

U.S. PATENT DOCUMENTS

| | | |
|---|---|---|
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0018940 A1* | 1/2014 | Casilli .................... G05B 15/02 700/29 |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |

(56) References Cited

U.S. PATENT DOCUMENTS

| | | |
|---|---|---|
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0097904 A1 | 3/2019 | Park et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1* | 5/2019 | Park ................... H04L 12/2809 |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0162280 A1 | 5/2020 | Drees et al. |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2020/0400330 A1* | 12/2020 | Przybylski ............... F24F 11/88 |
| 2021/0042299 A1 | 2/2021 | Migliori |
| 2021/0043221 A1 | 2/2021 | Yelchuru et al. |
| 2021/0200173 A1 | 7/2021 | Ploegert et al. |
| 2021/0313075 A1 | 10/2021 | McNamara et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0203287 A1 | 6/2022 | Wenger et al. |
| 2022/0203288 A1 | 6/2022 | Wenger et al. |
| 2022/0205962 A1 | 6/2022 | Vanderkoy |
| 2022/0207215 A1 | 6/2022 | Liu et al. |
| 2022/0215264 A1 | 7/2022 | Harvey et al. |
| 2022/0228756 A1 | 7/2022 | Gupta et al. |
| 2022/0254483 A1 | 8/2022 | Boisvert et al. |
| 2022/0277851 A1 | 9/2022 | Wellig |
| 2022/0282886 A1 | 9/2022 | Hriljac et al. |
| 2022/0305438 A1 | 9/2022 | Wenger et al. |
| 2022/0305881 A1 | 9/2022 | Neu et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

(56) References Cited

FOREIGN PATENT DOCUMENTS

| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

U.S. Appl. No. 17/567,275, Passivelogic, Inc.
U.S. Appl. No. 17/722,115, Passivelogic, Inc.
U.S. Appl. No. 17/528,026, filed Nov. 16, 2021, Johnson Controls Tyco IP Holdings LLP.
U.S. Appl. No. 17/528,038, filed Nov. 16, 2021, Johnson Controls Tyco IP Holdings LLP.
U.S. Appl. No. 17/529,118, filed Nov. 17, 2021, Johnson Controls Tyco IP Holdings LLP.
U.S. Appl. No. 17/529,120, filed Nov. 17, 2021, Johnson Controls Tyco IP Holdings LLP.
U.S. Appl. No. 17/537,046, filed Nov. 29, 2021, Johnson Controls Tyco IP Holdings LLP.
Balaji et al., "Brick: Towards a Unified Metadata Schema for Buildings," dated Nov. 16-17, 2016, 10 pages.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Bhattacharya et al., "Short Paper: Analyzing Metadata Schemas for Buildings—The Good, the Bad and the Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Present ation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023- Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Jan. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).

(56) References Cited

OTHER PUBLICATIONS

International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing Ltd., Birmingham, UK, Oct. 2014 (170 pages).
The Virtual Nuclear Tourist, "Calvert Cliffs Nuclear Power Plant," URL: http://www.nucleartourist.com/US/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q et al., "Knowledge-infused and Consistent Complex Event Processing over Real-time and Persistent Streams," Further Generation Computer Systems, 2017, 76 (pp. 391-406).

* cited by examiner

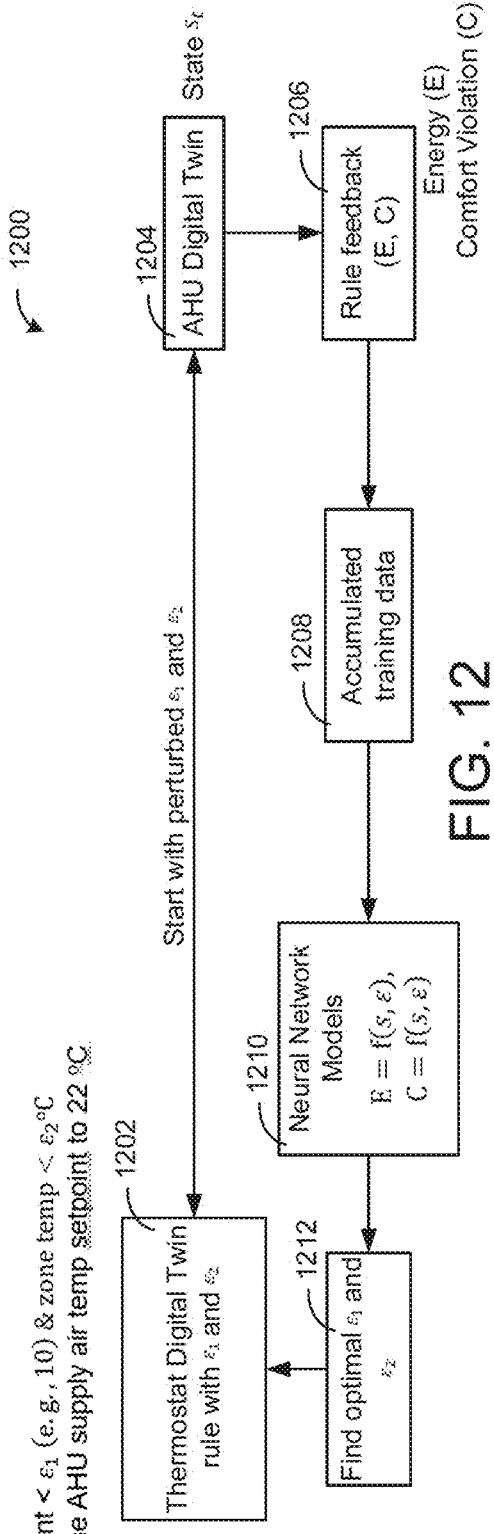
FIG. 12
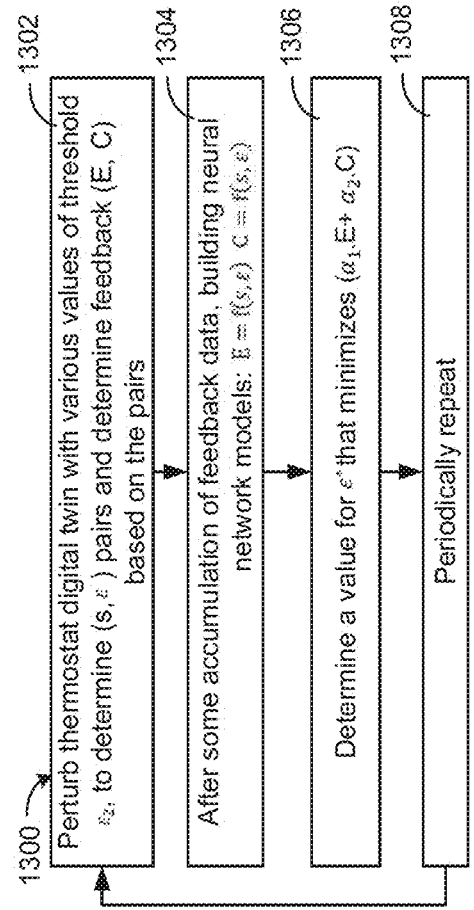
FIG. 13
$$\min_{\varepsilon^*}(\alpha_1 \cdot E + \alpha_2 \cdot C)$$
$$s.t.\ E(s, \varepsilon),$$
$$C(s, \varepsilon)$$
FIG. 14

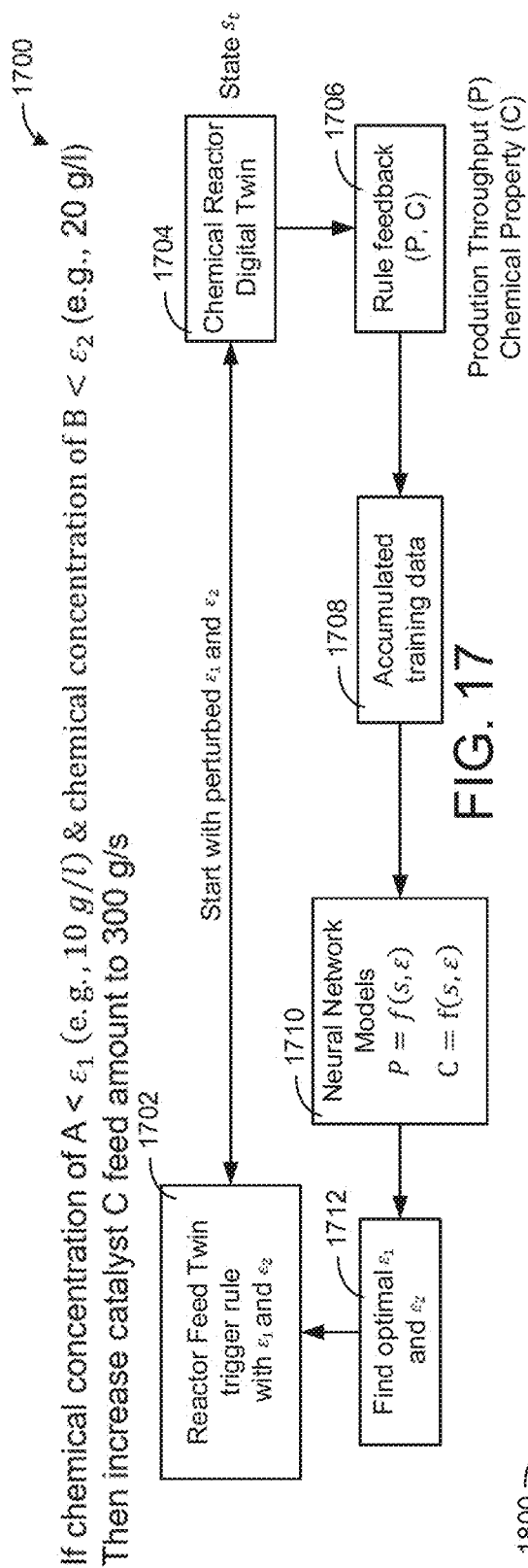
FIG. 17
FIG. 18
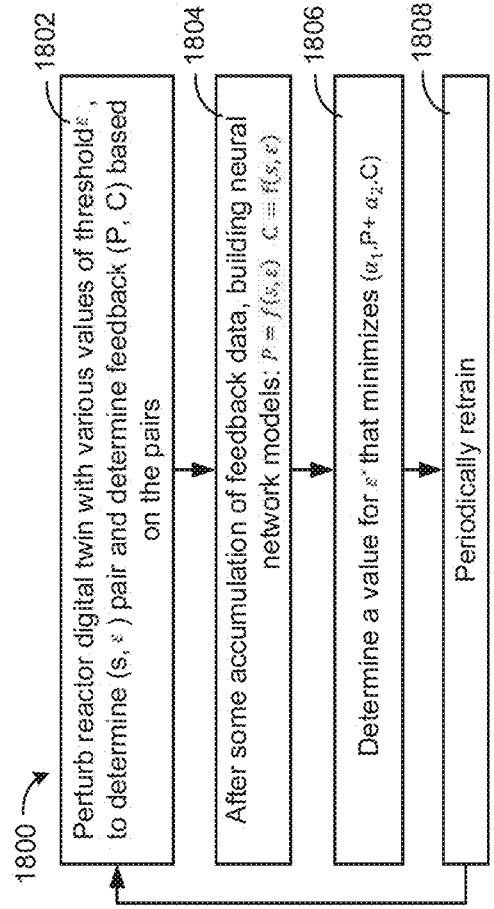
FIG. 19

| | Attributes 2552 | Inherited Attributes 2554 | Triggers 2556 | Actions 2558 |
|---|---|---|---|---|
| Air Handling Unit Digital Twin 2502 | • Fan Speed<br>• Static Pressure Setpoint<br>• Outdoor Air Mix | • Supply Air Temp Sensor<br>• Supply Air Flow Sensor<br>• Supply Air Flow Setpoint<br>• Damper Position Setpoint | Inherited Triggers<br>• When {VAV_ID}.ZN-T is [== < > !=] x<br>• When {VAV_ID}.SUPFLOW is [== < > !=] x<br>• When {VAV_ID}.SUPFLSP is [== < > !=] x<br>• When {VAV_ID}.{DAMPER_ID}.DPRPOS is [== < > !=] x | Inherited Actions<br>• Set {VAV_ID}.ZN-T to y<br>• Set {VAV_ID}.SUPFLOW to y<br>• Set {VAV_ID}.SUPFLSP to y<br>• Set {VAV_ID}.{DAMPER_ID}.DPRPOS to y |
| Variable Air Volume Digital Twin 2504 | • Zone Temperature (ZN-T) Sensor<br>• Supply Air Flow (SUPFLOW) Sensor<br>• Supply Air Flow Setpoint (SUPFLSP) | • DPRPOS | • When ZN-T is [== < > !=] x<br>• When SUPFLOW is [== < > !=] x<br>• When SUPFLSP is [== < > !=] x<br>Inherited Triggers<br>• When {DAMPER_ID}.DPRPOS is [== < > !=] x | • Set ZN-T to y<br>• Set SUPFLOW to y<br>• Set SUPFLSP to y<br>Inherited Actions<br>• Set {DAMPER_ID}.DPRPOS to y |
| Damper Digital Twin 2506 | • Damper Position Setpoint (DPRPOS) | | • When DPRPOS is [== < > !=] x | • Set DPRPOS to y |

| | Attributes | Inherited Attributes | Triggers | Actions |
|---|---|---|---|---|
| Air Handling Unit Digital Twin 2702 | • Fan Speed<br>• Static Pressure Setpoint<br>• Outdoor Air Mix | • Supply Air Temp Sensor<br>• Supply Air Flow Sensor<br>• Supply Air Flow Setpoint<br>• Damper Position Setpoint | • When *total* SUPFLOW is [== < > !=] x<br>Inherited Triggers<br>• When *either/both* ZN-T is [== < > !=] x<br>• When *either/both* SUPFLOW is [== < > !=] x<br>• When *either/both* SUPFLSP is [== < > !=] x<br>• When *either/both* DPRPOS is [== < > !=] x | Inherited Actions<br>• Set *all* ZN-T to y<br>• Set *all* SUPFLOW to y<br>• Set *all* SUPFLSP to y |
| Variable Air Volume Digital Twin 2704 | • Zone Temperature (ZN-T) Sensor<br>• Supply Air Flow (SUPFLOW) Sensor<br>• Supply Air Flow Setpoint (SUPFLSP) | • Deamper Position Setpoint DPRPOS | • When ZN-T is [== < > !=] x<br>• When SUPFLOW is [== < > !=] x<br>• When SUPFLSP is [== < > !=] x<br>Inherited Triggers<br>• When {DAMPER_ID}.DPRPOS is [== < > !=] x | • Set ZN-T to y<br>• Set SUPFLOW to y<br>• Set SUPFLSP to y<br>Inherited Actions<br>• Set {DAMPER_ID}.DPRPOS to y |

FIG. 27B

| | Attributes | Inherited Attributes | Triggers | Actions |
|---|---|---|---|---|
| Sustainability Digital Twin 2802 | • Sustainability Score<br>• Sustainability Mode | | • When *SUSTAINABILITY Score* is [== < > !=] x<br>• When *SUSTAINABILITY Mode* is y | • Set *SUSTAINABILITY Mode* is y |
| HVAC Digital Twin 2804 | • HVAC Mode<br>• Lighting Mode<br>• Occupancy Mode | • HVAC DT Attributes<br>• Lighting DT Attributes<br>• Occupancy DT Attributes | Inherited Triggers<br>• HVAC Triggers<br>• Lighting Triggers<br>• Occupancy Triggers | Inherited Triggers<br>• HVAC Actions<br>• Lighting Actions<br>• Occupancy Actions |
| Lighting Digital Twin 2806 | | • HVAC DT Attributes<br>• Lighting DT Attributes<br>• Occupancy DT Attributes | • HVAC Triggers<br>• Lighting Triggers<br>• Occupancy Triggers | • HVAC Actions<br>• Lighting Actions<br>• Occupancy Actions |
| Occupancy Digital Twin 2808 | | | | |

| General |
|---|
| *General* |
| Id: Task_01rsvz6 |
| Name: HVAC Digital Twin |
| Element Template: Hvac::adjustSetPoint |
| *Custom Fields* |
| Implementation Type: external |
| Topic: Hvac::AdjustSetPoint |
| SetPoint: 71 |
| Was Temp Adjusted: jci_isTempAdjusted |
| Specifies whether the temperature was adjusted successfully. |
| Temp Adjusted Message: jci_tempAdjustedMessage |
| Message temperature was adjusted successfully. |

FIG. 34 (3400)

| General |
|---|
| *General* |
| Id: Task_1170gf8 |
| Name: Cafeteria Digital Twin |
| Element Template: Cafeteria::orderItem |
| *Custom Fields* |
| Implementation Type: external |
| Topic: Cafeteria::orderItem |
| Cafeteria Items: Lemonade |
| Cafeteria Item Quantity: 1 |

4300

```
{
    "id": "7741bfda-5c62-4d63-a181-47c2b9eeac03",
    "name": "hvac_diagnostic",
    "description": "check if the hvac system is functioning correctly",
    "conditions": {          ←―― 4302
        "base": [
            "zone contains thermostat",
            "thermostat has temperature sensor",
            "thermostat has temperature setpoint"
        ],
        "diagnostic": [      ←―― 4304
            "temperature sensor at X when setpoint is at X",
            "damper opens when setpoint at X",
            "damper closes when setpoint at Y",
            "flow increases when setpoint at X",
            "flow decreases when setpoint at Y"
        ]
    },
    "actions": [             ←―― 4306
        "adjust setpoint"
    ],
    "diagnosis": [           ←―― 4308
        "base condition not met - no diagnostic run",
        "diagnostic condition 0 not met - sensor or setpoint failure",
        "diagnostic condition 1 and 2 not met - damper or setpoint failure"
    ]
}
```

```
{
    "id": "4bf3017d-8431-48f9-9960-a3090805bc1a",
    "name": "outdoor_sensor_diagnostic",
    "description": "check if the outdoor sensors are functioning correctly",
    "conditions": {          ←―― 4402
        "base": [
            "outdoor_temperature_sensor",
            "outdoor_humidity_sensor",
            "weather_service"
        ],
        "diagnostic": [      ←―― 4404
            "weather temperature matches outdoor temperature sensor",
            "weather humidity matches outdoor humidity sensor"
        ]
    },
    "actions": [],           ←―― 4406
    "diagnosis": [           ←―― 4408
        "base condition not met - no diagnostic run",
        "diagnostic condition 0 not met - sensor failure",
        "diagnostic condition 1 not met - sensor failure"
    ]
}
```

FIG. 44

```
{
    "id": "e34cbb1d-7d69-4b47-a663-e4a1978e1c50",
    "name": "light_camera_diagnostic"
    "description": "check if the lights and camera are functioning correctly",
    "conditions": {
        "base": [                    ← 4502
            "location contains camera",
            "location contains lights",
        ],
        "diagnostic": [              ← 4504
            "camera outputs video",
            "camera lumen value is X when light is off",
            "camera lumen value is Y when light is on"
        ]
    },
    "actions": [                     ← 4506
        "turn camera off",
        "turn camera on",
        "turn lights off",
        "turn lights on",
    ],
    "diagnosis": [                   ← 4508
        "base condition not met - no diagnostic run",
        "diagnostic condition 0 not met - camera failure",
        "diagnostic condition 2 not met - light failure"
    ]
}
```

FIG. 45

| Diagnostic Message | Diagnostic Responses |
|---|---|
| Lower temperature setpoint | Damper opens |
| | Flow measurement increases |
| | Temperature measurement decreases |
| Raise temperature setpoint | Damper closes |
| | Flow measurement decreases |
| | Temperature measurement increases |

BUILDING DATA PLATFORM WITH DIGITAL TWIN FUNCTIONALITY INDICATORS

BACKGROUND

This application relates generally to a building system of a building. This application relates more particularly to systems for managing and processing data of the building system.

A building system may aggregate and store building data received from building equipment and/or other data sources. The building data can be stored in a database. The building can include a building system that operates analytic and/or control algorithms against the data to detect issues with the operation of the building equipment. However, the development and/or deployment of the analytic and/or control algorithms may be time consuming and require a significant amount of software development. Furthermore, the analytic and/or control algorithms may lack flexibility to adapt to changing circumstances or deployment situations.

SUMMARY

Digital Twin Diagnostics

A building system including one or more memory devices storing instructions thereon that, when executed by one or more processors cause the one or more processors to store a digital twin for a piece of building equipment, the digital twin including a virtual representation of the piece of building equipment, wherein the digital twin communicates with the piece of building equipment to operate the piece of building equipment. The instructions cause the one or more processors to determine one or more diagnostic messages based on the virtual representation of the piece of building equipment and communicate the one or more diagnostic messages, by the digital twin, to the piece of building equipment causing the piece of building equipment to perform one or more operations, receive one or more diagnostic message responses from the piece of building equipment indicating the one or more operations of the piece of building equipment, and generate a diagnostics report for the piece of building equipment, the diagnostics report indicating a performance of the piece of building equipment based on the one or more diagnostic message responses.

In some embodiments, the instructions cause the one or more processors to compare the one or more operations of the piece of building equipment to one or more expected operations associated with the one or more diagnostic messages, determine a functionality of the piece of building equipment based on a result of comparing the one or more operations of the piece of building equipment to the one or more expected operations and cause the diagnostics report to include the functionality of the piece of building equipment.

In some embodiments, the diagnostics report indicates a state of the piece of building equipment and a confidence level that the state determined for the piece of building equipment is correct.

In some embodiments, the instructions cause the one or more processors to detect an absence of one or more particular diagnostic message responses that were expected to be received from the piece of building equipment responsive to the one or more diagnostics messages and generate the diagnostics report for the piece of building equipment based on an indication of the absence of the one or more particular diagnostic message responses.

In some embodiments, the piece of building equipment is provisioned with one or more software functions configured to test the piece of building equipment responsive to receiving a particular diagnostics message from the digital twin.

In some embodiments, the instructions cause the one or more processors to monitor data of one or more data points of the piece of building equipment and generate the one or more diagnostic message responses based on the data.

In some embodiments, the instructions cause the one or more processors to determine, based on the virtual representation of the piece of equipment, one or more operational capabilities of the piece of building equipment, the one or more operational capabilities indicating an ability of the piece of building equipment to perform the one or more operations and communicate the one or more diagnostic messages to the piece of building equipment based on the one or more operational capabilities of the piece of building equipment.

In some embodiments, the virtual representation of the piece of building equipment is a building graph including nodes and edges. In some embodiments, a first node of the nodes represents the piece of building equipment. In some embodiments, one or more second nodes of the nodes represent the one or more operational capabilities of the piece of building equipment. In some embodiments, one or more edges of the edges link the first node to the one or more second nodes. In some embodiments, the instructions cause the one or more processors to determine the one or more operational capabilities by identifying the one or more edges linking the first node to the one or more second nodes.

In some embodiments, the instructions cause the one or more processors to generate an overall functionality indicator for the piece of building equipment based on the one or more diagnostic message responses.

In some embodiments, the virtual representation of the piece of building equipment is a building graph including nodes and edges. In some embodiments, a first node of the nodes represents the piece of building equipment and a second node of the nodes represents the overall functionality indicator and is related to the first node via an edge of the edges.

In some embodiments, the instructions cause the one or more processors to generate a first functionality indicator for a first operational capability of the piece of building equipment and a second functionality indicator for a second operational capability of the piece of building equipment based on the one or more diagnostic message responses and generate the overall functionality indicator based on the first functionality indicator and the second functionality indicator.

In some embodiments, the virtual representation of the piece of building equipment is a building graph including nodes and edges. In some embodiments, a first node of the nodes represents the first operational capability and a second node of the nodes represents the first functionality indicator and is related to the first node by a first edge of the edges. In some embodiments, a third node of the nodes represents the second operational capability and a fourth node of the nodes represents the second functionality indicator and is related to the third node by a second edge of the edges.

Another implementation of the present disclosure is a method including storing, by a processing circuit, a digital twin for a piece of building equipment in one or more memory devices, the digital twin including a virtual representation of the piece of building equipment, wherein the digital twin communicates with the piece of building equipment to operate the piece of building equipment. The method includes determining, by the processing circuit, one or more diagnostic messages based on the virtual representation of the piece of building equipment and communicate the one or more diagnostic messages, by the digital twin, to the piece of building equipment causing the piece of building equipment to perform one or more operations, receiving, by the processing circuit, one or more diagnostic message responses from the piece of building equipment indicating the one or more operations of the piece of building equipment, and generating, by the processing circuit, a diagnostics report for the piece of building equipment, the diagnostics report indicating a performance of the piece of building equipment based on the one or more diagnostic message responses.

In some embodiments, the method includes comparing, by the processing circuit, the one or more operations of the piece of building equipment to one or more expected operations associated with the one or more diagnostic messages, determining, by the processing circuit, a functionality of the piece of building equipment based on a result of comparing the one or more operations of the piece of building equipment to the one or more expected operations, and causing, by the processing circuit, the diagnostics report to include the functionality of the piece of building equipment.

In some embodiments, the diagnostics report indicates a state of the piece of building equipment and a confidence level that the state determined for the piece of building equipment is correct.

In some embodiments, the method includes detecting, by the processing circuit, an absence of one or more particular diagnostic message responses that were expected to be received from the piece of building equipment responsive to the one or more diagnostic messages and generating, by the processing circuit, the diagnostics report for the piece of building equipment based on an indication of the absence of the one or more particular diagnostic message responses.

In some embodiments, the piece of building equipment is provisioned with one or more software functions configured to test the piece of building equipment responsive to receiving a particular diagnostics message from the digital twin.

In some embodiments, the method further includes determining, by the processing circuit, based on the virtual representation of the piece of equipment, one or more operational capabilities of the piece of building equipment, the one or more operational capabilities indicating an ability of the piece of building equipment to perform the one or more operations and communicating, by the processing circuit, the one or more diagnostic messages to the piece of building equipment based on the one or more operational capabilities of the piece of building equipment.

In some embodiments, the virtual representation of the piece of building equipment is a building graph including nodes and edges. In some embodiments, a first node of the nodes represents the piece of building equipment. In some embodiments, one or more second nodes of the nodes represent the one or more operational capabilities of the piece of building equipment. In some embodiments, one or more edges of the edges link the first node to the one or more second nodes. In some embodiments, determining, by the processing circuit, the one or more operational capabilities includes identifying the one or more edges linking the first node to the one or more second nodes.

In some embodiments, the method further includes generating, by the processing circuit, a first functionality indicator for a first operational capability of the piece of building equipment and a second functionality indicator for a second operational capability of the piece of building equipment based on the one or more diagnostic message responses and generating, by the processing circuit, an overall functionality indicator based on the first functionality indicator and the second functionality indicator.

Another implementation of the present disclosure is a building system including one or more memory devices storing instructions thereon that, when executed by one or more processors cause the one or more processors to store a digital twin for a piece of building equipment, the digital twin including a virtual representation of the piece of building equipment. The instructions cause the one or more processors to determine one or more diagnostic messages based on the virtual representation of the piece of building equipment and communicate the one or more diagnostic messages, by the digital twin, to the piece of building equipment causing the piece of building equipment to perform one or more operations, receive one or more diagnostic message responses from the piece of building equipment indicating the one or more operations of the piece of building equipment, and generate a diagnostics report for the piece of building equipment, the diagnostics report indicating a performance of the piece of building equipment based on the one or more diagnostic message responses.

Digital Twin Based Diagnostic Routines

A building system including one or more memory devices storing instructions thereon that, when executed by one or more processors, cause the one or more processors to store a plurality of digital twins, the plurality of digital twins comprising a virtual representation of a building, wherein a first digital twin communicates with a first piece of building equipment to operate the first piece of building equipment and a second digital twin of the plurality of digital twins communicates with a second piece of building equipment to operate the second piece of building equipment. The instructions cause the one or more processors to determine, based on the virtual representation of the building, that an operation of the first piece of building equipment is detectable by the second piece of building equipment, execute a diagnostics routine comprising causing, by the first digital twin, the first piece of building equipment to perform the operation and receiving, by the second digital twin, one or more detections of the operation by the second piece of building equipment, and generate a diagnostics report for the first piece of building equipment and the second piece of building equipment based on a result of the diagnostics routine.

In some embodiments, the diagnostics report indicates a first performance of the first piece of building equipment and a second performance of the second piece of building equipment.

In some embodiments, the instructions cause the one or more processors to store a plurality of diagnostics routines, each of the plurality of diagnostics routines testing a plurality of pieces of building equipment based on operational relationships between the plurality of pieces of building equipment and select the diagnostics routine from the plurality of diagnostics routines for testing the first piece of building equipment and the second piece of building equipment by determining, based on the virtual representation of the building, that the operation of the first piece of building equipment is detectable by the second piece of building equipment.

In some embodiments, the diagnostics report indicates a state of the first piece of building equipment and a confidence level that the state determined for the first piece of building equipment is correct.

In some embodiments, the instructions cause the one or more processors to detect an absence of one or more messages that were expected to be received from the second piece of building equipment responsive to operating the first piece of building equipment and generate the diagnostics report based on an indication of the absence of the one or more messages.

In some embodiments, the instructions cause the one or more processors to determine, based on the virtual representation of the building, one or more operational capabilities of the first piece of building equipment, the one or more operational capabilities indicating an ability of the first piece of building equipment to perform the operation and cause, by the first digital twin, the first piece of building equipment to perform the operation by communicating one or more messages to the first piece of building equipment based on the one or more operational capabilities of the first piece of building equipment.

In some embodiments, the virtual representation of building is a building graph comprising a plurality of nodes and a plurality of edges. In some embodiments, a first node of the plurality of nodes represents the first piece of building equipment. In some embodiments, one or more second nodes of the plurality of nodes represent the one or more operational capabilities of the first piece of building equipment. In some embodiments, one or more edges of the plurality of edges link the first node to the one or more second nodes. In some embodiments, the instructions cause the one or more processors to determine the one or more operational capabilities by identifying the one or more edges linking the first node to the one or more second nodes.

In some embodiments, the instructions cause the one or more processors to generate an overall functionality indicator for the first piece of building equipment based on the result of the diagnostics routine.

In some embodiments, the virtual representation of the building is a building graph comprising a plurality of nodes representing a plurality of entities of the building and a plurality of edges between the plurality of nodes representing relationships between the plurality of entities. In some embodiments, a first node of the plurality of nodes represents the first piece of building equipment and a second node of the plurality of nodes represents the overall functionality indicator and is related to the first node via an edge of the plurality of edges.

In some embodiments, the virtual representation of the building is a building graph comprising a plurality of nodes representing a plurality of entities of the building and a plurality of edges between the plurality of nodes representing relationships between the plurality of entities.

In some embodiments, a first node of the plurality of nodes represents the first piece of building equipment. In some embodiments, a second node of the plurality of nodes represents the second piece of building equipment. In some embodiments, one or more edges of the plurality of edges relate the first node to the second node indicating that the operation of the first piece of building equipment is detectable by the second piece of building equipment. In some embodiments, the instructions cause the one or more processors to determine that the operation of the first piece of building equipment is detectable by the second piece of building equipment by identifying the one or more edges of the plurality of edges relating the first node to the second node.

In some embodiments, a third node of the plurality of nodes indicates a space of the building. In some embodiments, a first edge of the one or more edges between the third node and the first node indicates that the first piece of building equipment is located in the space of the building. In some embodiments, a second edge of the one or more edges between the third node and the second node indicates that the second piece of building equipment is located in the space of the building.

Another implementation of the present disclosure is a method includes storing, by a processing circuit, a plurality of digital twins on a memory device, the plurality of digital twins comprising a virtual representation of a building, wherein a first digital twin communicates with a first piece of building equipment to operate the first piece of building equipment and a second digital twin of the plurality of digital twins communicates with a second piece of building equipment to operate the second piece of building equipment and determining, by the processing circuit, based on the virtual representation of the building, that an operation of the first piece of building equipment is detectable by the second piece of building equipment. The method further includes executing, by the processing circuit, a diagnostics routine comprising causing, by the first digital twin, the first piece of building equipment to perform the operation and receiving, by the second digital twin, one or more detections of the operation by the second piece of building equipment and generating, by the processing circuit, a diagnostics report for the first piece of building equipment and the second piece of building equipment based on a result of the diagnostics routine.

In some embodiments, the method further includes storing, by the processing circuit, a plurality of diagnostics routines on the memory device, each of the plurality of diagnostics routines testing a plurality of pieces of building equipment based on operational relationships between the plurality of pieces of building equipment and selecting, by the processing circuit, the diagnostics routine from the plurality of diagnostics routines for testing the first piece of building equipment and the second piece of building equipment by determining, based on the virtual representation of the building, that the operation of the first piece of building equipment is detectable by the second piece of building equipment.

In some embodiments, the method further includes generating, by the processing circuit, an overall functionality indicator for the first piece of building equipment based on the result of the diagnostics routine.

In some embodiments, the virtual representation of the building is a building graph comprising a plurality of nodes representing a plurality of entities of the building and a plurality of edges between the plurality of nodes representing relationships between the plurality of entities. In some embodiments, a first node of the plurality of nodes represents the first piece of building equipment and a second node of the plurality of nodes represents the overall functionality indicator and is related to the first node via an edge of the plurality of edges.

In some embodiments, the virtual representation of the building is a building graph comprising a plurality of nodes representing a plurality of entities of the building and a plurality of edges between the plurality of nodes representing relationships between the plurality of entities.

In some embodiments, a first node of the plurality of nodes represents the first piece of building equipment. In some embodiments, a second node of the plurality of nodes represents the second piece of building equipment. In some embodiments, one or more edges of the plurality of edges relate the first node to the second node indicating that the operation of the first piece of building equipment is detectable by the second piece of building equipment. In some embodiments, determining, by the processing circuit, that the operation of the first piece of building equipment is detectable by the second piece of building equipment by identifying the one or more edges of the plurality of edges relating the first node to the second node.

In some embodiments, a third node of the plurality of nodes indicates a space of the building. In some embodiments, a first edge of the one or more edges between the third node and the first node indicates that the first piece of building equipment is located in the space of the building. In some embodiments, a second edge of the one or more edges between the third node and the second node indicates that the second piece of building equipment is located in the space of the building.

Another implementation of the present disclosure is one or more storage medium storing instructions thereon that, when executed by one or more processors, cause the one or more processors to store a plurality of digital twins, the plurality of digital twins comprising a virtual representation of a building, wherein a first digital twin communicates with a first piece of building equipment to operate the first piece of building equipment and a second digital twin of the plurality of digital twins communicates with a second piece of building equipment to operate the second piece of building equipment. The instructions cause the one or more processors to determine, based on the virtual representation of the building, that an operation of the first piece of building equipment is detectable by the second piece of building equipment, execute a diagnostics routine comprising causing, by the first digital twin, the first piece of building equipment to perform the operation and receiving, by the second digital twin, one or more detections of the operation by the second piece of building equipment, and generate a diagnostics report for the first piece of building equipment and the second piece of building equipment based on a result of the diagnostics routine.

Digital Twin Functionality Indicators

A building system including one or more memory devices storing instructions thereon that, when executed by one or more processors, cause the one or more processors to store a digital twin comprising a building graph, the building graph comprising a plurality of nodes representing a plurality of entities of a building and a plurality of edges between the plurality of nodes representing relationships between the plurality of entities and determine a value for a functionality indicator for a piece of building equipment based on data received from the piece of building equipment. The instructions cause the one or more processors to identify a first node of the plurality of nodes representing the functionality indicator by identifying an edge of the plurality of edges relating a second node of the plurality of nodes representing the piece of building equipment to the first node and cause the first node to store the value for the functionality indicator, or a link to the value for the functionality indicator.

In some embodiments, the functionality indicator indicates a state of the piece of building equipment and a confidence level that the state determined for the piece of building equipment is correct.

In some embodiments, the instructions cause the one or more processors to generate a first functionality indicator for a first operational capability of the piece of building equipment and a second functionality indicator for a second operational capability of the piece of building equipment and generate the value for the functionality indicator based on the first functionality indicator and the second functionality indicator.

In some embodiments, a third node of the plurality of nodes represents the first operational capability and a fourth node of the plurality of nodes represents the first functionality indicator and is related to the third node by a second edge of the plurality of edges. In some embodiments, a fifth node of the plurality of nodes represents the second operational capability and a sixth node of the plurality of nodes represents the second functionality indicator and is related to the fifth node by a third edge of the plurality of edges. In some embodiments, a fourth edge of the plurality of edges relates the second node to the third node. In some embodiments, a fifth edge of the plurality of edges relates the second node to the fifth node.

In some embodiments, the instructions cause the one or more processors to determine one or more diagnostic messages based on the building graph and communicate the one or more diagnostic messages, by the digital twin, to the piece of building equipment causing the piece of building equipment to perform one or more operation, receive one or more diagnostic message responses from the piece of building equipment indicating the one or more operations of the piece of building equipment, and generate the value for the functionality indicator based on the one or more diagnostic message responses.

In some embodiments, the instructions cause the one or more processors to detect an absence of one or more particular diagnostic message responses that were expected to be received from the piece of building equipment responsive to the one or more diagnostic messages and generate the value for the functionality indicator based on an indication of the absence of the one or more particular diagnostic message responses.

In some embodiments, the instructions cause the one or more processors to compare the one or more operations of the piece of building equipment to one or more expected operations associated with the one or more diagnostic messages and determine the value for the functionality indicator of the piece of building equipment based on a result of comparing the one or more operations of the piece of building equipment to the one or more expected operations.

In some embodiments, the instructions cause the one or more processors to determine, based on the building graph, that an operation of the piece of building equipment is detectable by a second piece of building equipment, execute a diagnostics routine comprising causing, by a first digital twin, the piece of building equipment to perform the operation and receiving, by a second digital twin, one or more detections of the operation by the second piece of building equipment, and generate the value for the functionality indicator for the piece of building equipment based on a result of the diagnostics routine.

In some embodiments, a third node of the plurality of nodes represents the second piece of building equipment and one or more edges of the plurality of edges relate the second node to the third node indicating that the operation of the piece of building equipment is detectable by the second piece of building equipment. In some embodiments, the instructions cause the one or more processors to determine that the operation of the piece of building equipment is detectable by the second piece of building equipment by identifying the one or more edges of the plurality of edges relating the second node to the third node.

In some embodiments, a fourth node of the plurality of nodes indicates a space of the building, a first edge of the one or more edges between the third node and the second node indicates that the piece of building equipment is located in the space of the building, and a second edge of the one or more edges between the third node and the fourth node indicates that the second piece of building equipment is located in the space of the building.

Another implementation of the present disclosure is a method including storing, by a processing circuit, a digital twin comprising a representation of a plurality of entities of a building and a plurality of relationships between the plurality of entities and determining, by the processing circuit, a value for a functionality indicator for a piece of building equipment based on data received from the piece of building equipment. The method includes identifying, by the processing circuit, an entity of the digital twin representing the functionality indicator by identifying a relationship in the digital twin relating an entity representing the piece of building equipment to the entity representing the functionality indicator and causing, by the processing circuit, the entity of the digital twin representing the functionality indicator to store the value for the functionality indicator, or a link to the value for the functionality indicator.

In some embodiments, the functionality indicator indicates a state of the piece of building equipment and a confidence level that the state determined for the piece of building equipment is correct.

In some embodiments, the method includes comparing, by the processing circuit, one or more operations of the piece of building equipment to one or more expected and determining, by the processing circuit, the value for the functionality indicator of the piece of building equipment based on a result of comparing the one or more operations of the piece of building equipment to the one or more expected operations.

In some embodiments, the representation is a building graph comprising a plurality of nodes representing the plurality of entities and a plurality of edges between the plurality of nodes representing the plurality of relationships. In some embodiments, the method includes identifying, by the processing circuit, a first node of the plurality of nodes representing the functionality indicator by identifying an edge of the plurality of edges relating the first node to a second node of the plurality of nodes representing piece of building equipment.

In some embodiments, the method includes determining, by the processing circuit, one or more diagnostic messages based on the building graph and communicate the one or more diagnostic messages, by the digital twin, to the piece of building equipment causing the piece of building equipment to perform one or more operations, receiving, by the processing circuit, one or more diagnostic message responses from the piece of building equipment indicating the one or more operations of the piece of building equipment, and generating, by the processing circuit, the value for the functionality indicator based on the one or more diagnostic message responses.

In some embodiments, the method includes generating, by the processing circuit, a first functionality indicator for a first operational capability of the piece of building equipment and a second functionality indicator for a second operational capability of the piece of building equipment and generating, by the processing circuit, the value for the functionality indicator based on the first functionality indicator and the second functionality indicator.

In some embodiments, a third node of the plurality of nodes represents the first operational capability and a fourth node of the plurality of nodes represents the first functionality indicator and is related to the third node by a second edge of the plurality of edges. In some embodiments, a fifth node of the plurality of nodes represents the second operational capability and a sixth node of the plurality of nodes represents the second functionality indicator and is related to the third node by a third edge of the plurality of edges. In some embodiments, a fourth edge of the plurality of edges relates the second node to the third node. In some embodiments, a fifth edge of the plurality of edges relates the second node to the fifth node.

In some embodiments, the method includes determining, by the processing circuit, based on the building graph, that an operation of the piece of building equipment is detectable by a second piece of building equipment, executing, by the processing circuit, a diagnostics routine comprising causing, by a first digital twin, the piece of building equipment to perform the operation and receiving, by a second digital twin, one or more detections of the operation by the second piece of building equipment, and generating, by the processing circuit, the value for the functionality indicator for the piece of building equipment based on a result of the diagnostics routine.

In some embodiments, a third node of the plurality of nodes represents the second piece of building equipment and one or more edges of the plurality of edges relate the second node to the third node indicating that the operation of the piece of building equipment is detectable by the second piece of building equipment. In some embodiments, the method further includes determining, by the processing circuit, that the operation of the piece of building equipment is detectable by the second piece of building equipment by identifying the one or more edges of the plurality of edges relating the second node to the third node. In some embodiments, a fourth node of the plurality of nodes indicates a space of the building, a first edge of the one or more edges between the third node and the second node indicates that the piece of building equipment is located in the space of the building, and a second edge of the one or more edges between the third node and the fourth node indicates that the second piece of building equipment is located in the space of the building.

Another implementation of the present disclosure is one or more storage medium storing instructions thereon that, when executed by one or more processors, cause the one or more processors to store a digital twin comprising a building graph, the building graph comprising a plurality of nodes representing a plurality of entities of a building and a plurality of edges between the plurality of nodes representing relationships between the plurality of entities and determine a value for a functionality indicator for a piece of building equipment based on data received from the piece of building equipment. The instructions cause the one or more processors to identify a first node of the plurality of nodes representing the piece of building equipment, generate a second node representing the functionality indicator and an edge to connect the first node and the second node, and cause the building graph to include the second node and the edge connecting the first node and the second node.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 12 is a block diagram of a trigger rule of a thermostat digital twin where parameters of the trigger rule is trained, according to an exemplary embodiment.

FIG. 13 is a flow diagram of a process for identifying values for the parameters of the trigger rule of FIG. 12, according to an exemplary embodiment.

FIG. 14 is a minimization that can be performed to identify the values for the parameters of the trigger rule of FIGS. 12-13, according to an exemplary embodiment.

FIG. 17 is a block diagram of a trigger rule of a chemical reactor digital twin where parameters of the trigger rule are trained, according to an exemplary embodiment.

FIG. 18 is a flow diagram of a process for identifying values for the parameters of the trigger rule of FIG. 17, according to an exemplary embodiment.

FIG. 19 is a minimization that can be performed to identify the values for the parameters of the trigger rule of FIGS. 17-18, according to an exemplary embodiment.

FIG. 25B is a table indicating attributes, inherited attributes, triggers, and actions for the digital twins of the FIG. 25A, according to an exemplary embodiment.

FIG. 27B is a table indicating attributes, inherited attributes, triggers, and actions for the digital twins of FIG. 27A, according to an exemplary embodiment.

FIG. 29B is a table indicating attributes, inherited attributes, triggers, and actions for the digital twins of FIG. 29A, according to an exemplary embodiment.

Figures 31, 32:
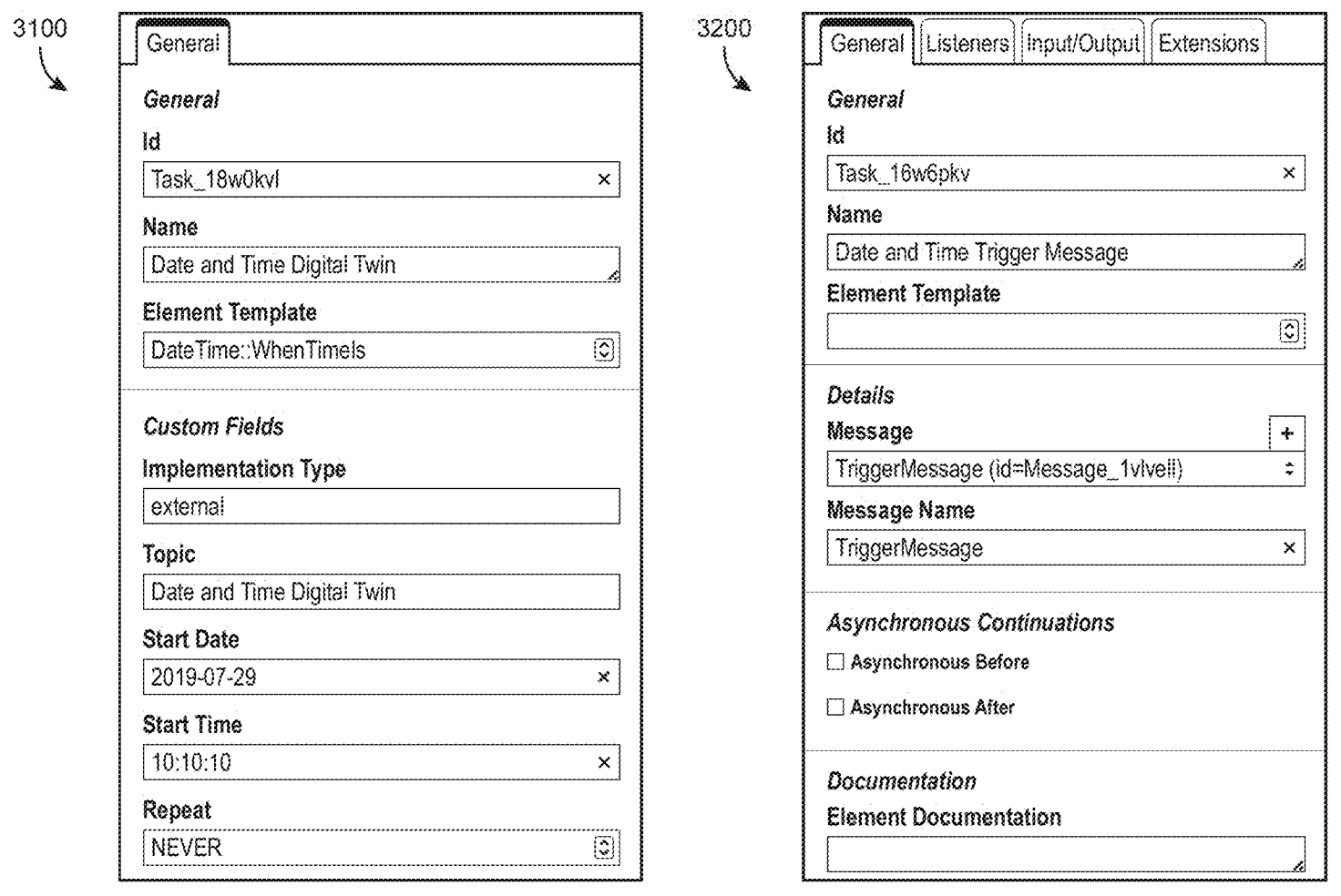

FIG. 31 is a user interface element for configuring a date and time digital twin of the high level digital twin of FIG. 30, according to an exemplary embodiment.

FIG. 32 is a user interface element for configuring a date and time trigger message of the high level digital twin of FIG. 30, according to an exemplary embodiment.

FIG. 33 is a user interface element for configuring an HVAC digital twin of the high level digital twin of FIG. 30, according to an exemplary embodiment.

FIG. 34 is a user interface element for configuring a cafeteria digital twin of the high level digital twin of FIG. 30, according to an exemplary embodiment.

FIG. 43 is a diagnostics routine for checking the functionality of an HVAC system that can be executed by the diagnostics engine and the digital twin of FIG. 42, according to an exemplary embodiment.

FIG. 44 is a diagnostics routine for checking the functionality of an outdoor sensor that can be executed by the diagnostics engine and the digital twin of FIG. 42, according to an exemplary embodiment.

FIG. 45 is a diagnostics routine for checking the functionality of a camera and a light that can be executed by the diagnostics engine and the digital twin of FIG. 42, according to an exemplary embodiment.

DETAILED DESCRIPTION

Overview

Figure 1:
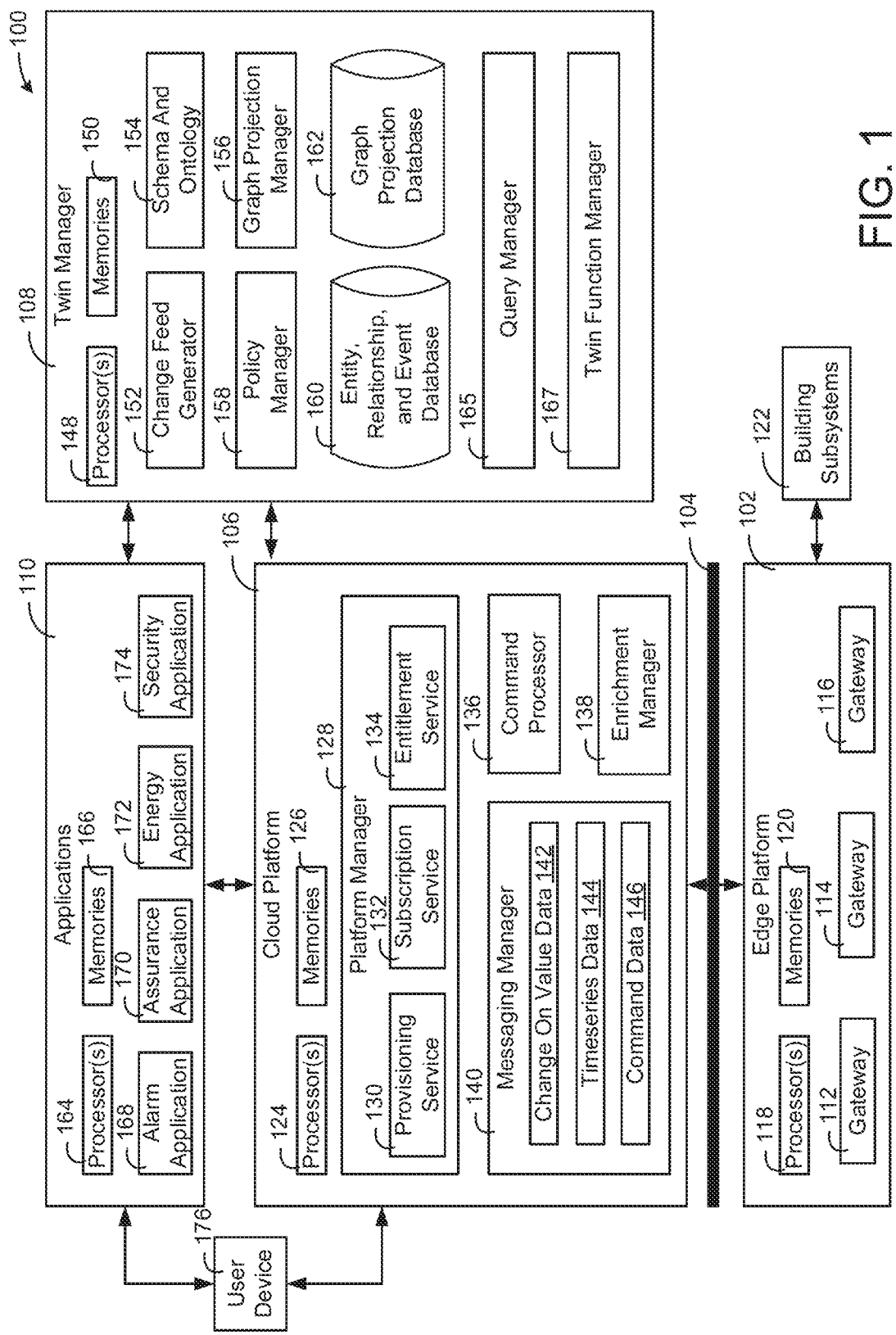
FIG. 1 is a block diagram of a building data platform including an edge platform, a cloud platform, and a twin manager, according to an exemplary embodiment.

Referring generally to the FIGURES, systems and methods for digital twins of a building implementing diagnostics are shown, according to various exemplary embodiments. A digital twin can be a virtual representation of a building and/or an entity of the building (e.g., space, piece of equipment, occupant, etc.). Furthermore, the digital twin can represent a service performed in a building, e.g., facility management, clean air optimization, energy prediction, equipment maintenance, diagnostics, etc. The digital twin can implement one or more functionalities, e.g., control functionality, diagnostics, analytics, etc.

In some embodiments, the digital twin can include an information data store and a connector. The information data store can store the information describing the entity that the digital twin operates for (e.g., attributes of the entity, measurements associated with the entity, control points or commands of the entity, etc.). In some embodiments, the data store can be a graph including various nodes and/or edges. The connector can be a software component that provides telemetry from the entity (e.g., physical device) to the information store. Furthermore, the digital twin can include artificial intelligence (AI), e.g., an AI agent. The AI can be one or more machine learning algorithms and/or models that operate based on information of the information data store and outputs information. The AI agent can run against a common data model, e.g., BRICK, and can be easily implemented in various different buildings, e.g., against various different building models. Running against BRICK can allow for the AI agent to be plug-and-play and reduce AI design and/or deployment time.

As used herein, when it is indicated that the digital twin can include artificial intelligence, machine learning, functionality, agents, etc. it should be understood that the digital twin may include such elements by incorporating the elements as an integrated part of the digital twin data (e.g., a twin graph including the functions/software or links to the functions/software) or may be provided as separate elements that work in concert with the virtual representation/data to perform the full functionality and features described herein as the digital twin. All such modifications are contemplated within the scope of the present disclosure. In some embodiments, the digital twin includes one or multiple different systems, software components, modules, and/or layers. These various parts may work in concert with one another. In some embodiments, the digital twin is included within a single component or system. In some embodiments, the digital twin is implemented across multiple components or systems that work together to implement the digital twin.

In some embodiments, the digital twin can run one or more diagnostics routines and/or send diagnostics messages to a piece of building equipment to determine that the building equipment is functioning properly. In some embodiments, a diagnostics message may be a single message sent by a digital twin to its building device to prompts the device to perform one or more operations and/or generate a response to the digital twin. The digital twin can use the response to determine the functionality of the building device. For example, a diagnostics message could cause a piece of building equipment to lower a temperature setpoint. A diagnostics response to the command might be a damper of the piece of building equipment opening, in some embodiments.

A diagnostics routine may be a routine of multiple operations, e.g., sending one or more diagnostics messages to a building device, to operate the building device and/or one or multiple related building devices. Resulting operational data can be used to verify that the building device is functioning properly. The diagnostics routines can test whether pieces of building equipment of a building are operating correcting. In some embodiments, the diagnostics routines run based on identities, spatial relationships, capabilities, etc. of building equipment represented in the information data store of the digital twin. The diagnostics routines can cause the digital twin to communicate diagnostics messages to the pieces of building equipment and/or monitor conditions of the pieces of building equipment.

In some embodiments, the digital twin uses the information data store to determine what pieces of building equipment to send the diagnostics messages to and what data points to monitor for responses. The information data store may represent a building virtually through multiple entities and relationships between the entities. In some embodiments, these entities and relationships may be represented through a building graph that includes nodes representing the entities and edges between the nodes representing the relationships. The entities of the information data store could be pieces of equipment, spaces, spatial relationships between pieces of equipment, operational capabilities of the pieces of equipment, etc. The digital twin can, in some embodiments, use the information data store to identify that a first piece of building equipment has a capability to control a temperature of a space while another piece of building equipment has the capability to measure the temperature of the same space. The digital twin might sent a diagnostics message to the first piece of building equipment controlling the temperature of the space and monitor measurements made by the second piece of building equipment to confirm that the control implement by the first piece of building equipment is operating correctly.

A digital twin can be a virtual representation of a building and/or an entity of the building (e.g., space, piece of equipment, occupant, etc.). A virtual representation of a building could be a graph data structure. The virtual representation could be a graphic model, e.g., a building information model (BIM). The virtual representation of the building could be a hierarchical model, in some embodiments. Furthermore, the digital twin can represent a service performed in a building, e.g., facility management, equipment maintenance, etc.

In some embodiments, the digital twin can determine a functionality of a piece of building equipment based on the diagnostics messaging. The digital twin can determine a functionality indicator which may indicate a level at which the piece of building equipment is functioning properly. The functionality indicator can be a score, a metric, a confidence level of the functionality of the piece of equipment, and/or any other value. In some embodiments, the digital twin can determine a functionality indicator for each capability of a piece of building equipment. The digital twin can in some embodiments, combine the functionality indicators of each capability of the piece of building equipment into an overall functionality indicator for the piece of building equipment.

Building Data Platform

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by $1/n$, where n is the number of consumers of this data feed.

By using this enrichment, a system can also have the ability to filter out undesired events. If there are 100 building in a campus that receive 100,000 events per building each hour, but only 1 building is actually commissioned, only $\frac{1}{10}$ of the events are enriched. By looking at what events are enriched and what events are not enriched, a system can do traffic shaping of forwarding of these events to reduce the cost of forwarding events that no consuming application wants or reads.

An Example of an Event Received by the Enrichment Manager 138 May be:

```
{
"id": "someguid",
"eventType": "Device_Heartbeat",
"eventTime": "2018-01-27T00:00:00+00:00"
"event Value": 1,
"deviceID": "someguid"
}
```

An example of an enriched event generated by the enrichment manager 138 may be:

```
{
"id": "someguid",
"eventType": "Device Heartbeat",
"eventTime": "2018-01-27T00:00:00+00:00"
"event Value": 1,
"deviceID": "someguid",
"buildingName": "Building-48",
"buildingID": "SomeGuid",
"panelID": "SomeGuid",
"panelName": "Building-48-Panel-13",
"cityID": 371,
"city Name": "Milwaukee",
"stateID": 48,
"stateName": "Wisconsin (WI)",
"country ID": 1,
"country Name": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

Figure 11:
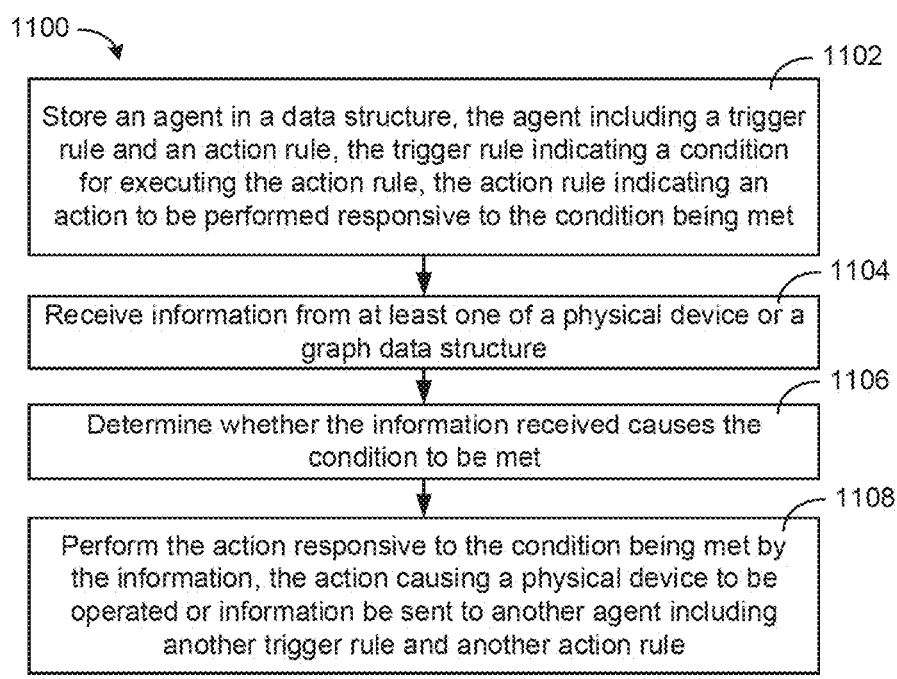
FIG. 11 is a flow diagram an agent of a digital twin executing a trigger rule and an action rule, according to an exemplary embodiment.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region ←→ Building ←→ Floor ←→ Space ←→ Asset

For the ontology of a subscription of "Customer B," the graph projection manager 156 can create relationships based on the rule:

Building ←→ Floor ←→ Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
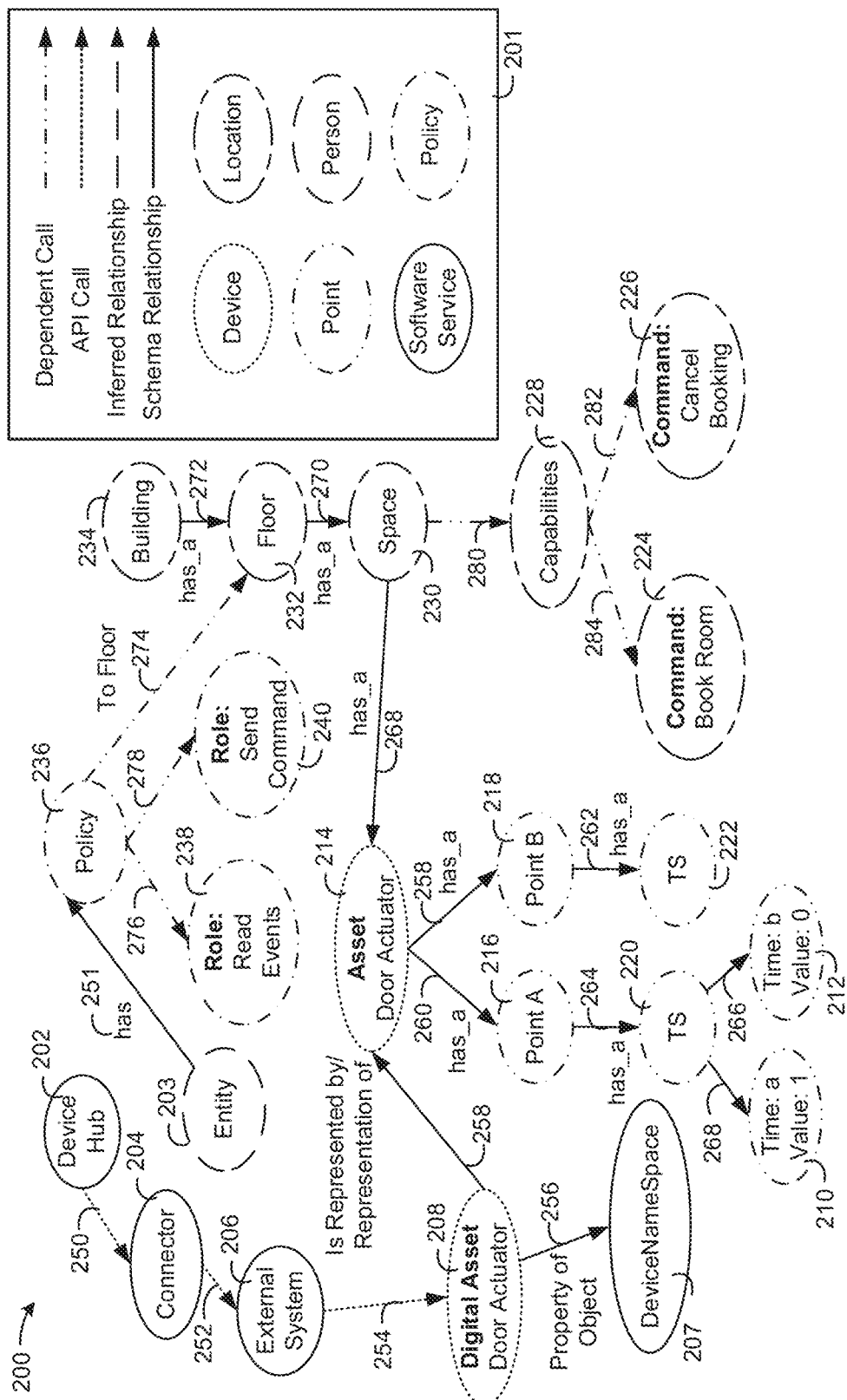
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
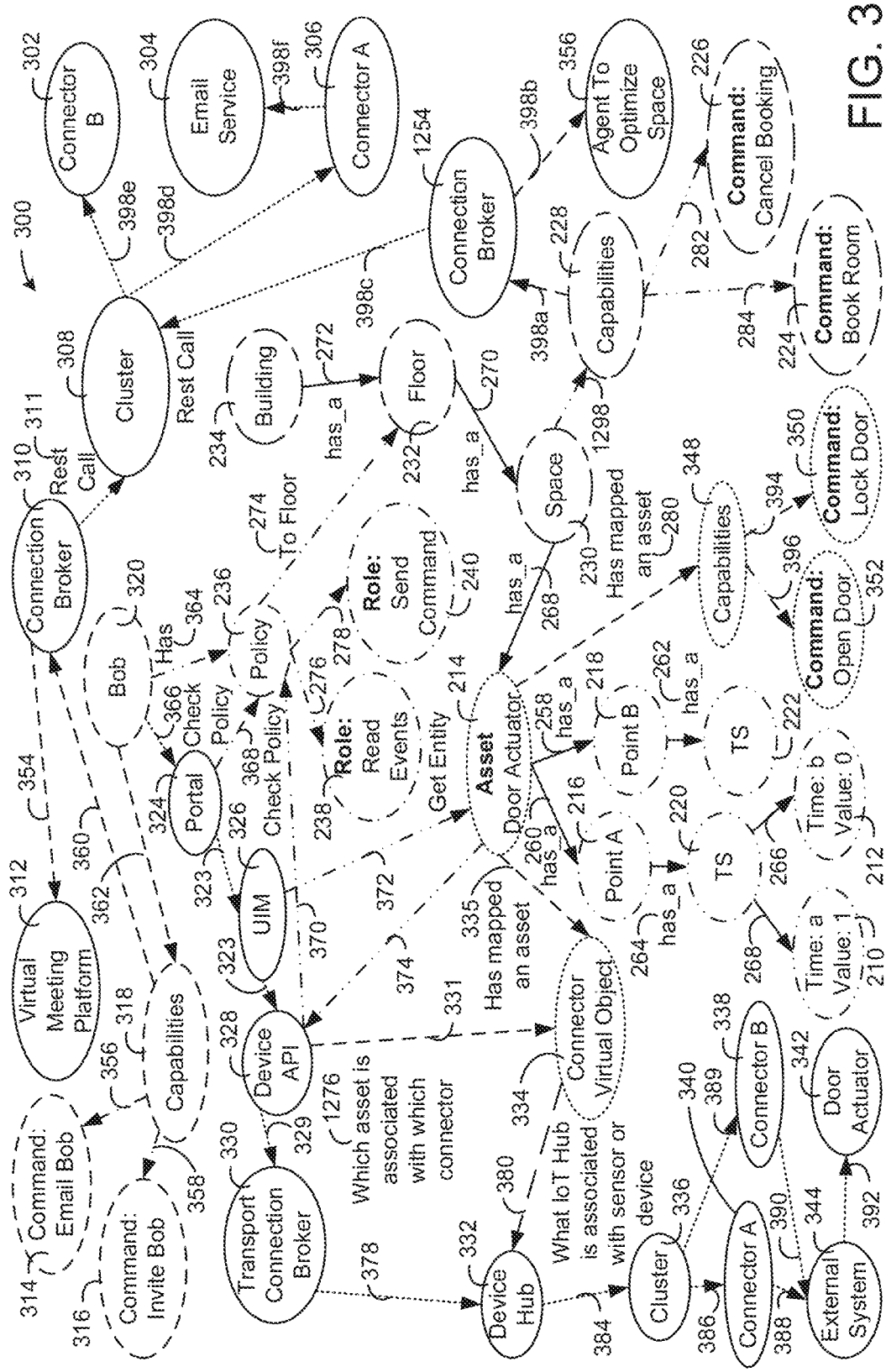
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 354 related to capabilities 228 by edge 398*a*. The connection broker 354 can be a node representing a software application configured to facilitate a connection with another software application. In some embodiments, the cloud platform 106 can identify the system that implements the capabilities 228 by identifying the edge 398*a* between the capabilities 228 and the connection broker 354.

The connection broker 354 is related to an agent that optimizes a space 356 via edge 398*b*. The agent represented by the node 356 can book and cancel bookings for the space represented by the node 230 based on the edge 398*b* between the connection broker 354 and the node 356 and the edge 398*a* between the capabilities 228 and the connection broker 354.

The connection broker 354 is related to a cluster 308 by edge 398*c*. Cluster 308 is related to connector B 302 via edge 398*e* and connector A 306 via edge 398*d*. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398*f*. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 308 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
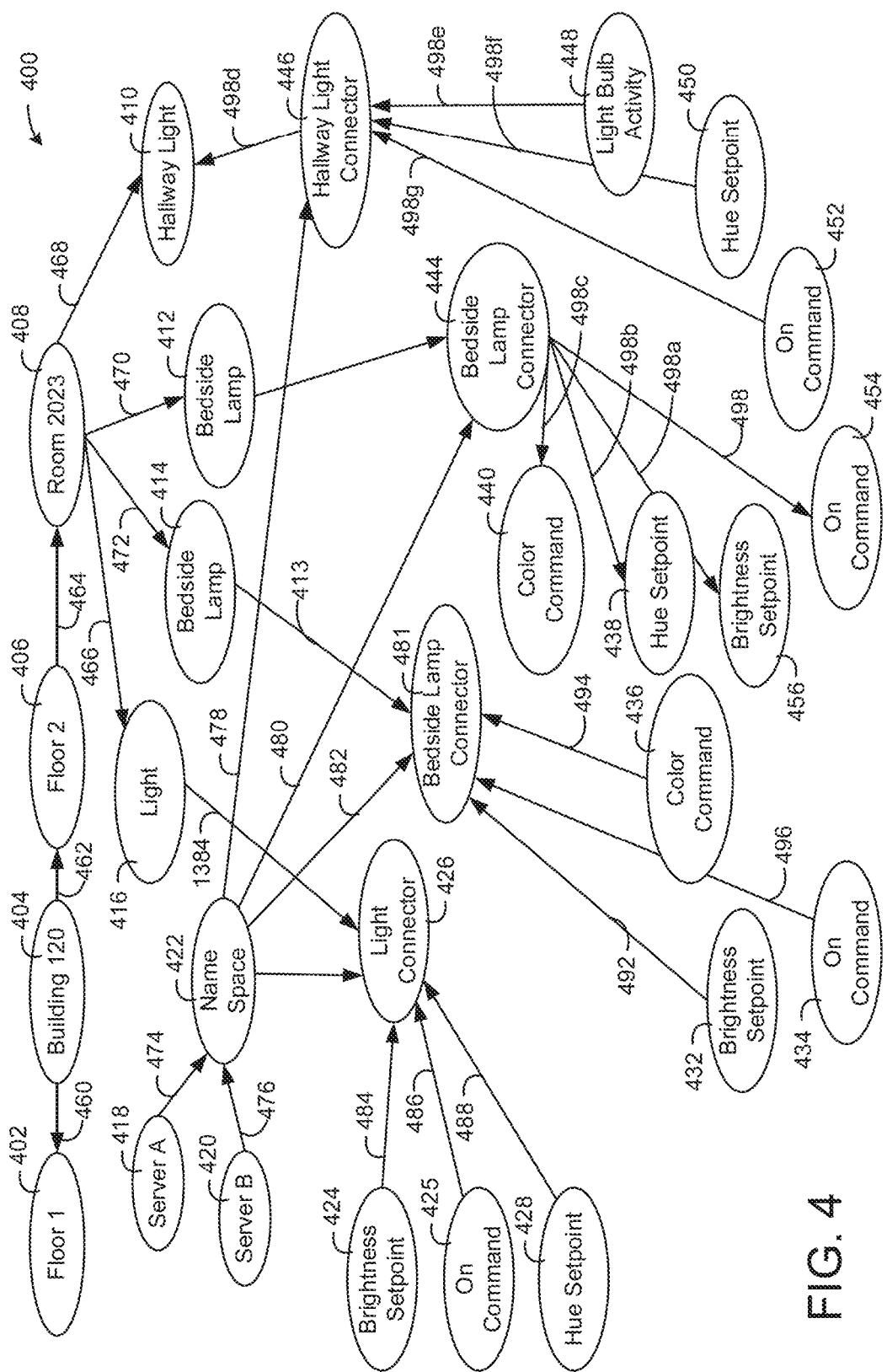
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498f. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498d. The hallway light connector 446 is linked to multiple commands for the hallway light node 410 via edges 498g, 498f, and 498e. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498c, 498b, 498a, and 498.

Digital Twin

Figure 5:
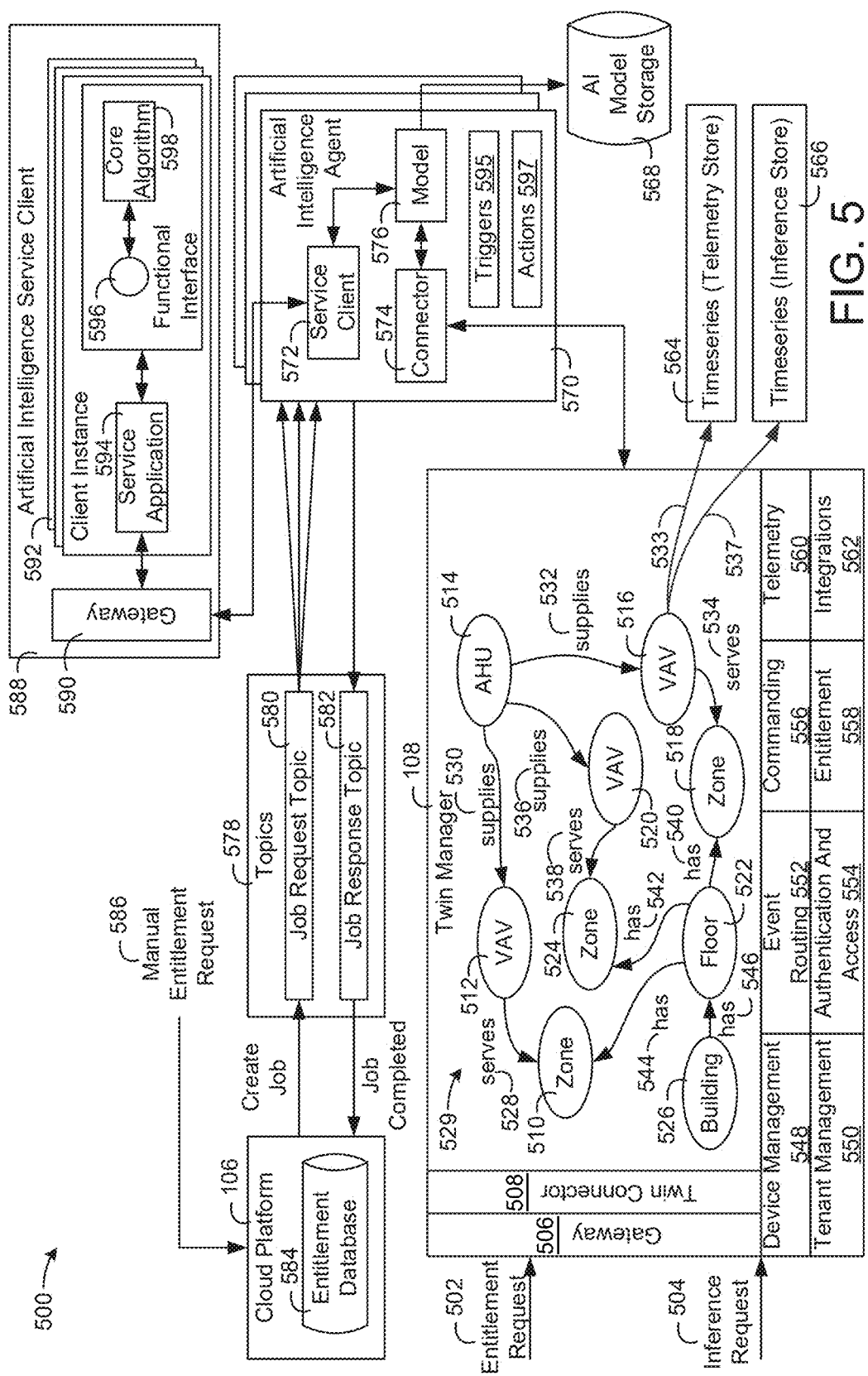
FIG. 5 is a block diagram of a system for managing a digital twin where an artificial intelligence agent can be executed to infer information for an entity of a graph, according to an exemplary embodiment.

Referring now to FIG. 5, a system 500 for managing a digital twin where an artificial intelligence agent can be executed to infer and/or predict information for an entity of a graph is shown, according to an exemplary embodiment. The system 500 can be components of the building data platform 100, e.g., components run on the processors and memories of the edge platform 102, the cloud platform 106, the twin manager 108, and/or the applications 110. The system 500 can, in some implementations, implement a digital twin with artificial intelligence.

A digital twin (or a shadow) may be a computing entity that describes a physical thing (e.g., a building, spaces of a building, devices of a building, people of the building, equipment of a building, etc.) through modeling the physical thing through a set of attributes that define the physical thing. A digital twin can refer to a digital replica of physical assets (a physical device twin) and can be extended to store processes, people, places, systems that can be used for various purposes. The digital twin can include both the ingestion of information and actions learned and executed through artificial intelligence agents.

In FIG. 5, the digital twin can be a graph 529 managed by the twin manager 108 and/or artificial intelligence agents 570. In some embodiments, the digital twin is the combination of the graph 529 with the artificial intelligence agents 570. In some embodiments, the digital twin enables the creation of a chronological time-series database of telemetry events for analytical purposes. In some embodiments, the graph 529 uses the BRICK schema.

The twin manager 108 stores the graph 529 which may be a graph data structure including various nodes and edges interrelating the nodes. The graph 529 may be the same as, or similar to, the graph projections described herein with reference to FIGS. 1-4. The graph 529 includes nodes 510-526 and edges 528-546. The graph 529 includes a building node 526 representing a building that has a floor indicated by the "has" edge 546 to the floor node 522. The floor node 522 is relate to a zone node 510 via a "has" edge 544 indicating that the floor represented by the node 522 has a zone represented by the zone 510.

The floor node 522 is related to the zone node 518 by the "has" edge 540 indicating that the floor represented by the floor node 522 has another zone represented by the zone node 518. The floor node 522 is related to another zone node 524 via a "has" edge 542 representing that the floor represented by the floor node 522 has a third zone represented by the zone node 524.

The graph 529 includes an AHU node 514 representing an AHU of the building represented by the building node 526. The AHU node 514 is related by a "supplies" edge 530 to the VAV node 512 to represent that the AHU represented by the AHU node 514 supplies air to the VAV represented by the VAV node 512. The AHU node 514 is related by a "supplies" edge 536 to the VAV node 520 to represent that the AHU represented by the AHU node 514 supplies air to the VAV represented by the VAV node 520. The AHU node 514 is related by a "supplies" edge 532 to the VAV node 516 to represent that the AHU represented by the AHU node 514 supplies air to the VAV represented by the VAV node 516.

The VAV node 516 is related to the zone node 518 via the "serves" edge 534 to represent that the VAV represented by the VAV node 516 serves (e.g., heats or cools) the zone represented by the zone node 518. The VAV node 520 is related to the zone node 524 via the "serves" edge 538 to represent that the VAV represented by the VAV node 520 serves (e.g., heats or cools) the zone represented by the zone node 524. The VAV node 512 is related to the zone node 510 via the "serves" edge 528 to represent that the VAV represented by the VAV node 512 serves (e.g., heats or cools) the zone represented by the zone node 510.

Furthermore, the graph 529 includes an edge 533 related to a timeseries node 564. The timeseries node 564 can be information stored within the graph 529 and/or can be information stored outside the graph 529 in a different database (e.g., a timeseries database). In some embodiments, the timeseries node 564 stores timeseries data (or any other type of data) for a data point of the VAV represented by the VAV node 516. The data of the timeseries node 564 can be aggregated and/or collected telemetry data of the timeseries node 564.

Furthermore, the graph 529 includes an edge 537 related to a timeseries node 566. The timeseries node 566 can be information stored within the graph 529 and/or can be information stored outside the graph 529 in a different database (e.g., a timeseries database). In some embodiments, the timeseries node 566 stores timeseries data (or any other type of data) for a data point of the VAV represented by the VAV node 516. The data of the timeseries node 564 can be inferred information, e.g., data inferred by one of the artificial intelligence agents 570 and written into the timeseries node 564 by the artificial intelligence agent 570. In some embodiments, the timeseries 546 and/or 566 are stored in the graph 529 but are stored as references to timeseries data stored in a timeseries database.

The twin manager 108 includes various software components. For example, the twin manager 108 includes a device management component 548 for managing devices of a building. The twin manager 108 includes a tenant management component 550 for managing various tenant subscriptions. The twin manager 108 includes an event routing component 552 for routing various events. The twin manager 108 includes an authentication and access component 554 for performing user and/or system authentication and grating the user and/or system access to various spaces, pieces of software, devices, etc. The twin manager 108 includes a commanding component 556 allowing a software application and/or user to send commands to physical devices. The twin manager 108 includes an entitlement component 558 that analyzes the entitlements of a user and/or system and grants the user and/or system abilities based on the entitlements. The twin manager 108 includes a telemetry component 560 that can receive telemetry data from physical systems and/or devices and ingest the telemetry data into the graph 529. Furthermore, the twin manager 108 includes an integrations component 562 allowing the twin manager 108 to integrate with other applications.

The twin manager 108 includes a gateway 506 and a twin connector 508. The gateway 506 can be configured to integrate with other systems and the twin connector 508 can be configured to allow the gateway 506 to integrate with the twin manager 108. The gateway 506 and/or the twin connector 508 can receive an entitlement request 502 and/or an inference request 504. The entitlement request 502 can be a request received from a system and/or a user requesting that an AI agent action be taken by the AI agent 570. The entitlement request 502 can be checked against entitlements for the system and/or user to verify that the action requested by the system and/or user is allowed for the user and/or system. The inference request 504 can be a request that the AI agent 570 generates an inference, e.g., a projection of information, a prediction of a future data measurement, an extrapolated data value, etc.

The cloud platform 106 is shown to receive a manual entitlement request 586. The request 586 can be received from a system, application, and/or user device (e.g., from the applications 110, the building subsystems 122, and/or the user device 176). The manual entitlement request 586 may be a request for the AI agent 570 to perform an action, e.g., an action that the requesting system and/or user has an entitlement for. The cloud platform 106 can receive the manual entitlement request 586 and check the manual entitlement request 586 against an entitlement database 584 storing a set of entitlements to verify that the requesting system has access to the user and/or system. The cloud platform 106, responsive to the manual entitlement request 586 being approved, can create a job for the AI agent 570 to perform. The created job can be added to a job request topic 580 of a set of topics 578.

The job request topic 580 can be fed to AI agents 570. For example, the topics 580 can be fanned out to various AI agents 570 based on the AI agent that each of the topics 580 pertains to (e.g., based on an identifier that identifies an agent and is included in each job of the topic 580). The AI agents 570 include a service client 572, a connector 574, and a model 576. The model 576 can be loaded into the AI agent 570 from a set of AI models stored in the AI model storage 568. The AI model storage 568 can store models for making energy load predictions for a building, weather forecasting models for predicting a weather forecast, action/decision models to take certain actions responsive to certain conditions being met, an occupancy model for predicting occupancy of a space and/or a building, etc. The models of the AI model storage 568 can be neural networks (e.g., convolutional neural networks, recurrent neural networks, deep learning networks, etc.), decision trees, support vector machines, and/or any other type of artificial intelligence, machine learning, and/or deep learning category. In some embodiments, the models are rule based triggers and actions that include various parameters for setting a condition and defining an action.

The AI agent 570 can include triggers 595 and actions 597. The triggers 595 can be conditional rules that, when met, cause one or more of the actions 597. The triggers 595 can be executed based on information stored in the graph 529 and/or data received from the building subsystems 122. The actions 597 can be executed to determine commands, actions, and/or outputs. The output of the actions 597 can be stored in the graph 529 and/or communicated to the building subsystems 122.

The AI agent 570 can include a service client 572 that causes an instance of an AI agent to run. The instance can be hosted by the artificial intelligence service client 588. The client 588 can cause a client instance 592 to run and communicate with the AI agent 570 via a gateway 590. The client instance 592 can include a service application 594 that interfaces with a core algorithm 598 via a functional interface 596. The core algorithm 598 can run the model 576, e.g., train the model 576 and/or use the model 576 to make inferences and/or predictions.

In some embodiments, the core algorithm 598 can be configured to perform learning based on the graph 529. In some embodiments, the core algorithm 598 can read and/or analyze the nodes and relationships of the graph 529 to make decisions. In some embodiments, the core algorithm 598 can be configured to use telemetry data (e.g., the timeseries data 564) from the graph 529 to make inferences on and/or perform model learning. In some embodiments, the result of the inferences can be the timeseries 566. In some embodiments, the timeseries 564 is an input into the model 576 that predicts the timeseries 566.

In some embodiments, the core algorithm 598 can generate the timeseries 566 as an inference for a data point, e.g., a prediction of values for the data point at future times. The timeseries 564 may be actual data for the data point. In this regard, the core algorithm 598 can learn and train by comparing the inferred data values against the true data values. In this regard, the model 576 can be trained by the core algorithm 598 to improve the inferences made by the model 576.

Figure 6:
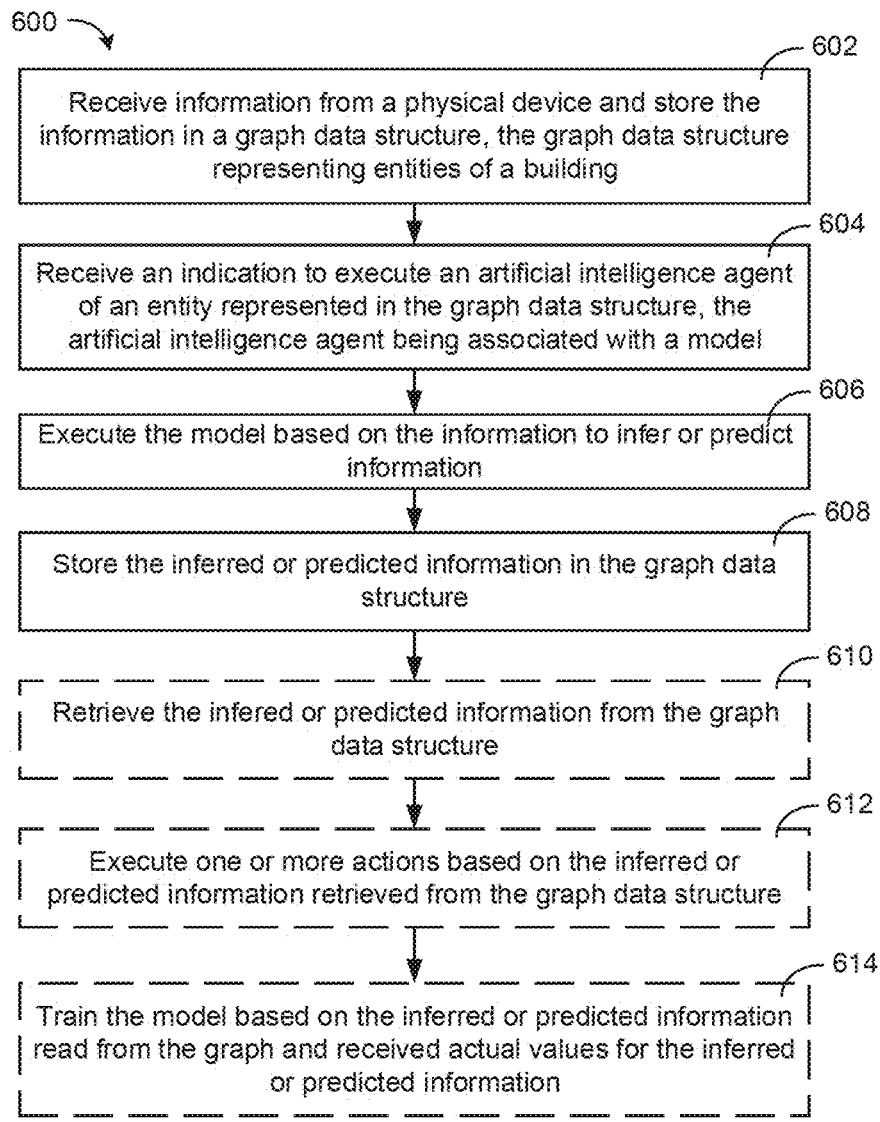
FIG. 6 is a flow diagram of a process for executing an artificial intelligence agent to infer and/or predict information, according to an exemplary embodiment.

Referring now to FIG. 6, a process 600 for executing an artificial intelligence agent to infer and/or predict information is shown, according to an exemplary embodiment. The process 600 can be performed by the system 500 and/or components of the system 500. The process 600 can be performed by the building data platform 100. Furthermore, the process 600 can be performed by any computing device described herein.

In step 602, the twin manager 108 receives information from a physical device and stores the information, or a link to the information, in the graph 529. For example, the telemetry component 560 can receive telemetry data from physical devices, e.g., the building subsystems 122. The telemetry can be measured data values, a log of historical equipment commands, etc. The telemetry component 560 can store the received information in the graph 529 by relating a node storing the information to a node representing the physical device. For example, the telemetry component 560 can store timeseries data as the timeseries 566 along by identifying that the physical device is a VAV represented by the VAV node 516 and that an edge 537 relates the VAV node 516 to the timeseries node 566.

In step 604, the twin manager 108 and/or the cloud platform 106 receives an indication to execute an artificial intelligence agent of an entity represented in the graph 529, the AI agent being associated with a model. In some embodiments, the indication is created by a user and provided via the user device 176. In some embodiments, the indication is created by an application, e.g., one of the applications 110. In some embodiments, the indication is a triggering event that triggers the agent and is received from the building subsystems 122 and/or another agent (e.g., an output of one agent fed into another agent).

In some embodiments, the AI agent is an agent for a specific entity represented in the graph 529. For example, the agent could be a VAV maintenance agent configured to identify whether a VAV (e.g., a VAV represented by the nodes 512, 530, and/or 516) should have maintenance performed at a specific time. Another agent could be a floor occupant prediction agent that is configure to predict the occupancy of a particular floor of a building, e.g., the floor represented by the floor node 522.

Responsive to receiving the indication, in step 606, the AI agent 570 causes a client instance 592 to run the model 576 based on the information received in step 602. In some embodiments, the information received in step 602 is provided directly to the AI agent 570. In some embodiments, the information is read from the graph 529 by the AI agent 570.

In step 608, the AI agent 570 stores the inferred and/or predicted information in the graph 529 (or stores the inferred and/or predicted information in a separate data structure with a link to the graph 529). In some embodiments, the AI agent 570 identifies that the node that represents the physical entity that the AI agent 570 inferred and/or predicted information for, e.g., the VAV represented by the VAV 516. The AI agent 570 can identify that the timeseries node 566 stores the inferred and/or predicted information by identifying the edge 537 between the VAV node 516 and the timeseries node 566.

In step 610, the AI agent 570 can retrieve the inferred or predicted information from the graph 529 responsive to receiving an indication to execute the model of the AI agent 570 of the inferred or predicted information, e.g., similar to the step 604. In step 612, the AI agent 570 can execute one or more actions based on the inferred and/or predicted information of the step 610 based the inferred and/or predicted information retrieved from the graph 529. In some embodiments, the AI agent 570 executes the model 576 based on the inferred and/or predicted information.

In step 614, the AI agent 570 can train the model 576 based on the inferred or predicted information read from the graph 529 and received actual values for the inferred or predicted information. In some embodiments, the AI agent 570 can train and update parameters of the model 576. For example, the timeseries 564 may represent actual values for a data point of the VAV represented by the VAV node 516. The timeseries 566 can be the inferred and/or predicted information. The AI agent 570 can compare the timeseries 564 and the timeseries 566 to determine an error in the inferences and/or predictions of the model 576. The error can be used by the model 576 to update and train the model 576.

Figure 7:
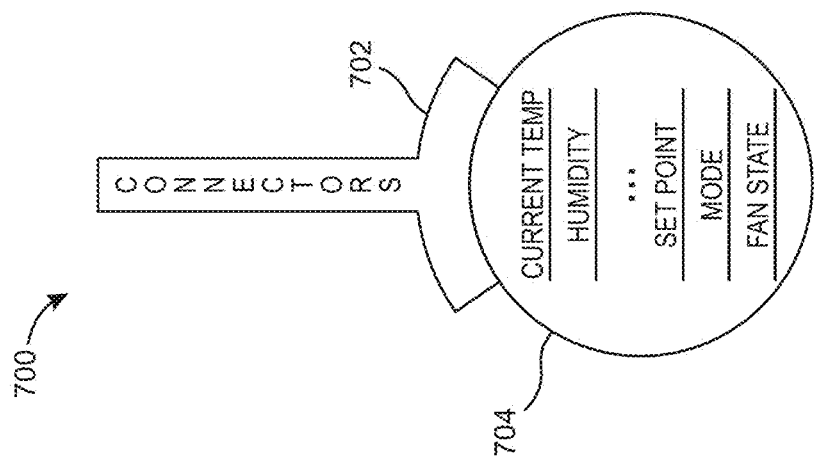
FIG. 7 is a diagram of a digital twin including a connector and a database, according to an exemplary embodiment.

Referring now to FIG. 7, a digital twin 700 including a connector and a database is shown, according to an exemplary embodiment. The digital twin 700 can be a software component stored and/or managed by the building data platform 100. The building data platform 100 includes connectors 702 and a database 704. The database 704 can store data attributes for a physical entity, e.g., a building, a VAV, etc. that describe the current state and/or operation of the physical entity. The connector 702 can be a software component that receives data from the physical device represented by the digital twin 700 and updates the attributes of the database 704. For example, the connector 702 can ingest device telemetry data into the database 704 to update the attributes of the digital twin 700.

Figure 8:
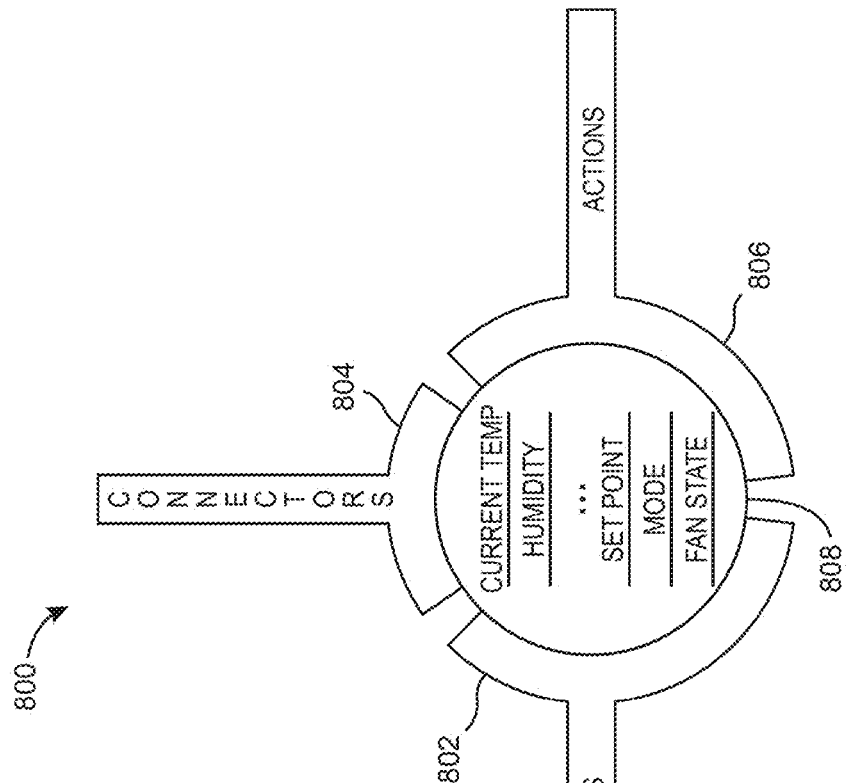
FIG. 8 is a block diagram of a digital twin including triggers, connectors, actions, and a graph, according to an exemplary embodiment.

Referring now to FIG. 8, a digital twin 800 including triggers 802, connectors 804, actions 806, and a graph 808 is shown, according to an exemplary embodiment. The digital twin 800 can be a digital replica of physical assets (e.g., a physical device twin, sensor twin, actuator twin, building device twin, etc.) and can be used to store processes, people, places, systems that can be used for various purposes. The digital twins can be created, managed, stored, and/or operated on by the building data platform 100.

In some cases, the devices can also be actuated on (told to perform an action). For example, a thermostat has sensors to measure temperature and humidity. A thermostat can also be asked to perform an action of setting the setpoint for a HVAC system. In this regard, the digital twin 800 can be configured so that information that the digital twin 800 can be made aware of can be stored by the digital twin 800 and there are also actions that the digital twin 800 can take.

The digital twin 800 can include a connector 804 that ingests device telemetry into the graph 808 and/or update the digital twin attributes stored in the graph 808. In some embodiments, the connectors 804 can ingest external data received from external data sources into the graph 808. The external data could be weather data, calendar data, etc. In some embodiments, the connectors 804 can send commands back to the devices, e.g., the actions determined by the actions 806.

The digital twin 800 includes triggers 802 which can set conditional logic for triggering the actions 706. The digital twin 800 can apply the attributes stored in the graph 808 against a rule of the triggers 802. When a particular condition of the rule of the triggers 802 involving that attribute is met, the actions 706 can execute. One example of a trigger could be a conditional question, "when the temperature of the zone managed by the thermostat reaches x degrees Fahrenheit." When the question is met by the attributes stored in the graph 808, a rule of the actions 706 can execute.

The digital twin 800 can, when executing the actions 806, update an attribute of the graph 808, e.g., a setpoint, an operating setting, etc. These attributes can be translated into commands that the building data platform 100 can send to physical devices that operate based on the setpoint, the operating setting, etc. An example of an action rule for the actions 806 could be the statement, "update the setpoint of the HVAC system for a zone to x Degrees Fahrenheit."

In some embodiments, the triggers 802 and/or the actions 806 are predefined and/or manually defined through user input of the user device 176. In some cases, it may be difficult for a user to determine what the parameter values of the trigger rule should be (e.g., what values maximize a particular reward or minimize a particular penalty). Similarly, it may be difficult for a user to determine what the parameter values of the action rule should be (e.g., what values maximize the particular reward or minimize the particular penalty). Furthermore, even if the user is able to identify the ideal parameter values for the triggers 802 and the actions 806, the ideal values for the parameters may not be constant and may instead change over time. Therefore, it would be desirable if the values of the attributes for the triggers 802 and the actions 806 are tuned optimally and automatically by the building data platform 100 by observing the responses from other related digital twins.

Causal patterns between one or more digital twins having their triggering conditions satisfied and one or more digital twins (including the triggering digital twin) actuating by sending specific commands to their physical counterparts could be learned and defined by the building data platform 100. Automated learning can be used by the building data platform 100 during real operations, by running simulations using digital twins, or using predicted inference within the digital twin. There may not even be the need for all standard operating procedures in building systems to be defined upfront by a user since patterns of interaction between digital twins can be learned by the building data platform 100 to define and recommend those to building and facility owners.

Figure 9:
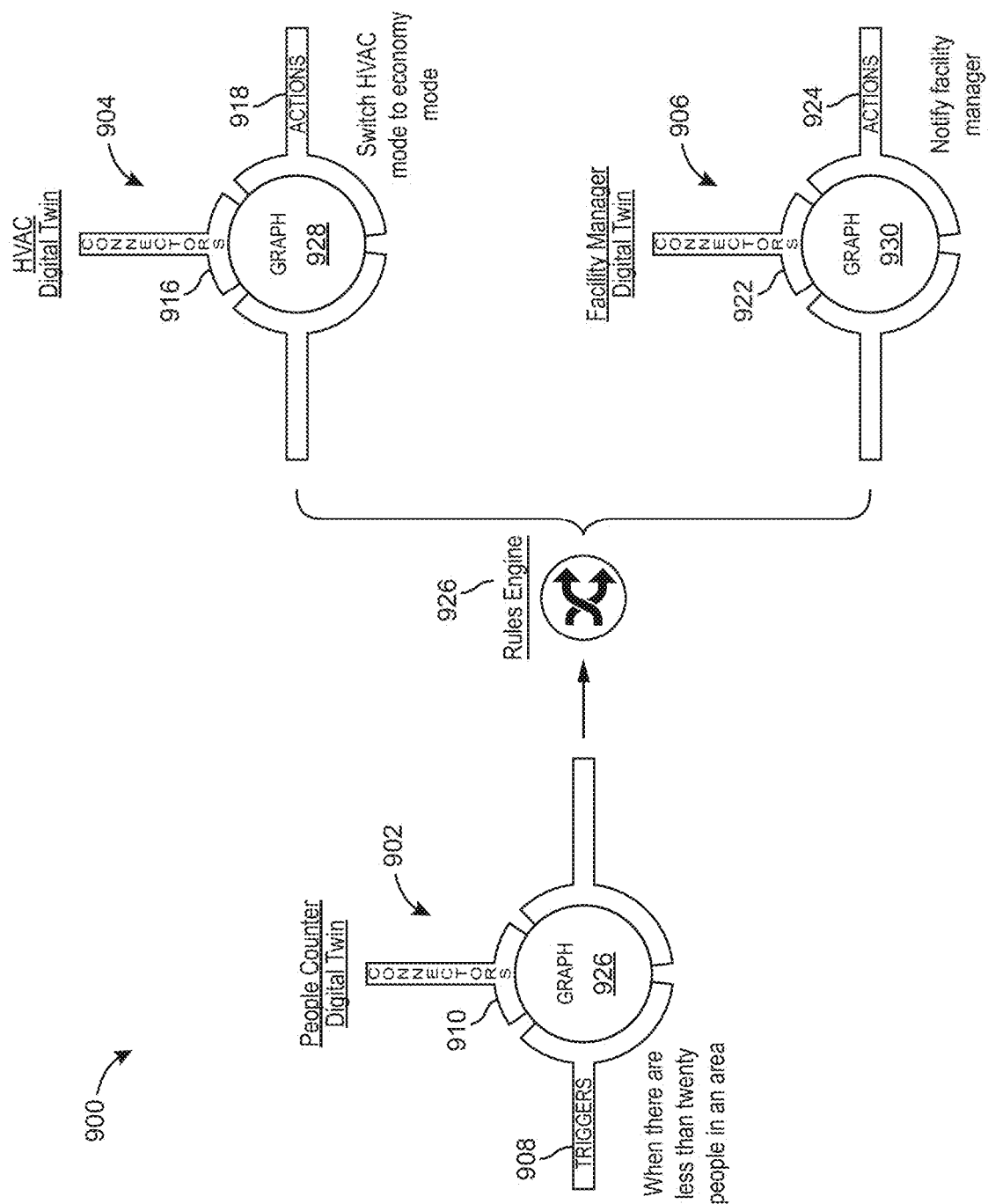
FIG. 9 is a block diagram of a people counter digital twin, an HVAC digital twin, and a facility manager digital twin that have triggers and actions that are interconnected, according to an exemplary embodiment.

Referring now to FIG. 9, a system 900 of digital twins including a people counter digital twin 902, an HVAC digital twin 904, and a facility manager digital twin 906 that have triggers and actions that are interconnected is shown, according to an exemplary embodiment. In FIG. 9, the people counter digital twin 902 is shown including triggers 908, connectors 910, actions 912, and the graph 926.

The system 900 further includes an HVAC digital twin 904 that includes triggers 914, connectors 916, and actions 918. The system further includes the facility manager 906 that includes triggers 920, connectors 922, and actions 924. In some embodiments, the graph 926, the graph 928, and the graph 930 are the same graph or different graphs. In some embodiments, the graphs 926-930 are the graph 529.

In the system 900, the actions 912 are connected to the triggers 914 and the triggers 920. In this regard, whatever action is taken by the people counter digital twin 902, the result of the action will be provided to the HVAC digital twin 904 and the facility manager digital twin 906. The people counter digital twin 902 can output a "low occupancy" attribute which can be stored in the graph 926 and/or provided to the HVAC digital twin 904 and/or the facility manager digital twin 906. In some embodiments, if all of the digital twins use and/or have access to the same graph, if the people counter digital twin 902 stores the low occupancy indicator in the graph, the HVAC digital twin 904 and the facility manager digital twin 906 can read the attribute from the graph.

In some embodiments, the trigger 908 is the logical condition, "when there are less than twenty people in a particular area." Responsive to an occupancy count of the particular area is less than twenty, which the people counter digital twin 902 can determine from models and/or information of the graph 926, a low occupancy indication can be generated by the actions 912. The low occupancy indication can be provided to the HVAC digital twin 904.

In some embodiments, the trigger 914 of the HVAC digital twin 904 can be the logical condition, "if there is low occupancy." Similarly, the trigger 920 of the facility manager digital twin 906 can be the logical condition, "if there is low occupancy." Responsive to the trigger 914 being triggered, the actions 918 can execute to switch an HVAC mode to an economy mode. The economy mode status for an HVAC system can be stored in the graph 928 and/or communicated to an HVAC controller to execute on. Responsive to the trigger 920 being triggered, the actions 924 can execute to notify a facility manager of the low occupancy status, e.g., send a notification to a user device of the facility manager.

In some embodiments, the digital twins of the system 900 can be solution twins, e.g., the people counter twin 902, the HVAC digital twin 904, the facility manager twin 906, etc. The digital twin can be a solution twin because it represents a particular software solutions for the building. For example, in some embodiments, an occupancy sensor digital twin of a zone could be triggered with under-utilized criteria (e.g., the triggering of the people counter digital twin 902 shown in FIG. 9). The people counter digital twin 902 could be configured to identify what AHU is serving the zone that it has made an occupancy detection for based on the nodes and/or edges of the graph 926 relating a zone node for the zone and an AHU node for the AHU. In some embodiments, the AHU digital twin can evaluate the desired setting for the zone through running a simulation with one or more models. In some embodiments, an FM digital twin can evaluate space arrangement and/or purposing.

Figure 10:
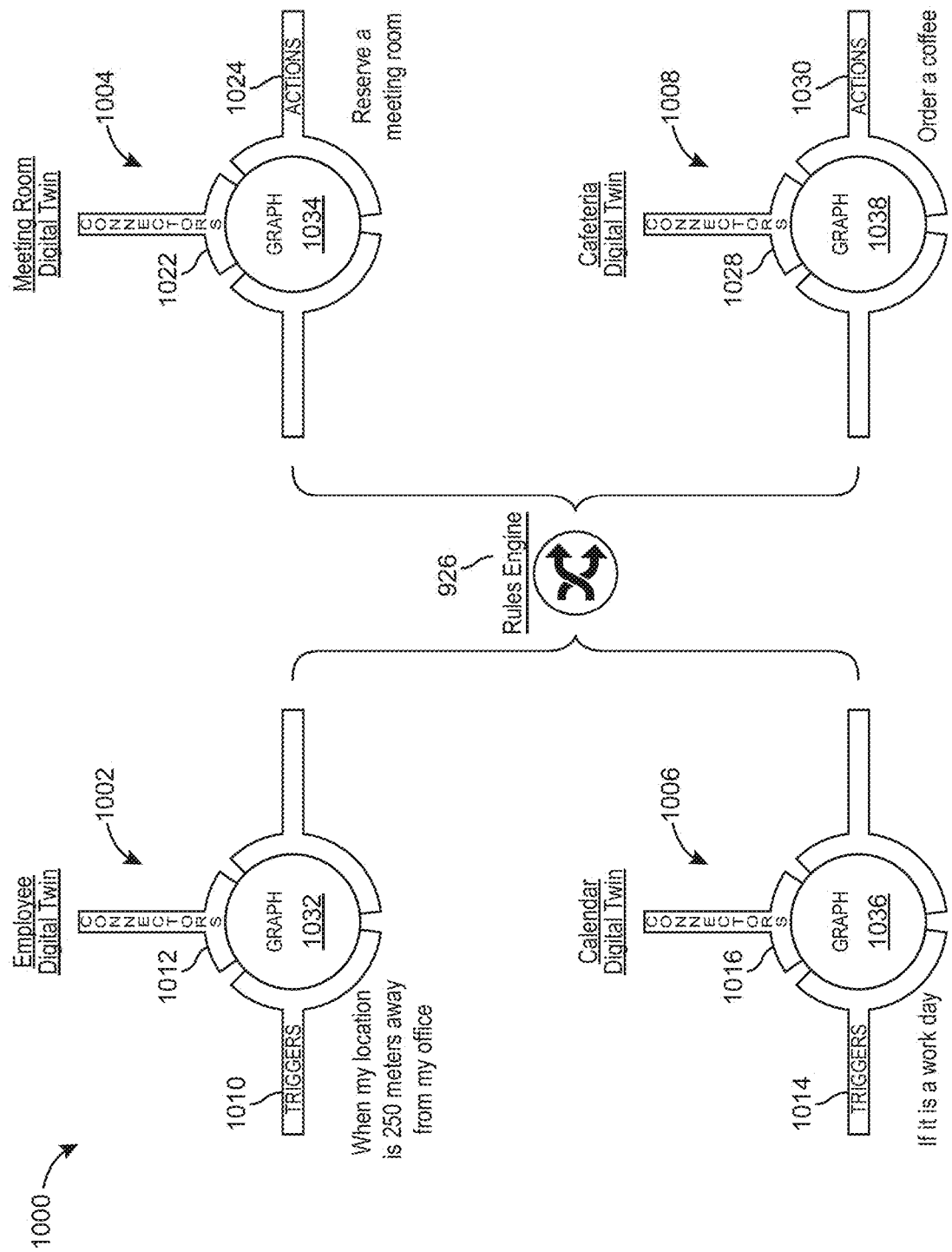
FIG. 10 is a block diagram of an employee digital twin, a calendar digital twin, a meeting room digital twin, and a cafeteria digital twin that have triggers and actions that are interconnected, according to an exemplary embodiment.

Referring now to FIG. 10, a system 1000 including an employee digital twin 1002, a calendar digital twin 1006, a meeting room digital twin 1004, and a cafeteria digital twin 1008 that have triggers and actions that are interconnected is shown, according to an exemplary embodiment. The system 1000 includes a solution digital twin for an employee, a meeting room, a cafeteria, and a calendar. In the system 1000, an employee digital twin 1002 and a calendar digital twin 1006 cause one or more associated digital twins, a meeting room digital twin 1004 and a cafeteria digital twin 1008 to execute. In FIG. 10, the state of the digital twins 1002 and 1006 are provided to the digital twins 1004 and 1008 as conditions for the triggers 1020 and 1026. The calendar digital twin 1006 can include a connector 1016, the meeting room digital twin can include a connector 1022, and the cafeteria digital twin 1008 can include a connector 1028 for ingesting information into the graphs 1034-1038.

In FIG. 10, the employee digital twin 1002 includes a graph 1032, the calendar digital twin 1006 includes a graph 1036, the meeting room digital twin 1004 includes a graph 1034, and the cafeteria digital twin 1008 includes a graph 1038. The graphs 1032-1038 can be the same graphs and/or different graphs and can be the same as, or similar to, the graph 529.

The employee digital twin 1002 can generate an "occupant near office" indication via the actions 1012 responsive to the trigger 1010 triggering when a particular occupant is a particular instance (e.g., 250 meters) from their office. The digital twin 1002 can identify the occupant, the occupant's office, and the location of the office through analyzing the nodes and/or edge of the graph 1032. The calendar digital twin 1006 determines, based on calendar data (e.g., calendar data stored in the graph 1036), whether it is a work day via the trigger 1014 (e.g., is a day Monday through Friday). Responsive to determining that it is a work day, the calendar digital twin 1006 generates an indication that it is a work day via the actions 1018.

The meeting room digital twin 1004 can receive the work day indication from the calendar digital twin 1006 and can receive the occupant near office indication from the employee digital twin 1002. The meeting room digital twin 1004 can take actions to reserve a meeting room via the actions 1024 responsive to the trigger 1020 indicating that the occupant is near their office and it is a work day. The cafeteria digital twin 1008 can receive the "occupant near office" indication from the employee digital twin 1002 and can receive the "it is a work day" indication from the calendar digital twin 1006. The cafeteria digital twin 1008 can trigger the ordering of a coffee for the occupant via the trigger 1030 responsive to the trigger 1026 being triggered.

Referring now to FIG. 11, a process 1100 of an agent executing a trigger rule and an action rule is shown, according to an exemplary embodiment. The process 1100 can be performed by the system 500 and/or components of the system 500. In some embodiments, the building data platform 100 can perform the process 1100. Furthermore, the process 1100 can be performed by any computing device described herein.

In step 1102, the building data platform can store an agent 570 in a data structure. The agent 570 can include a trigger rule indicating a condition for executing an action rule and an action rule indicating an action to be performed responsive to the condition being met. In some embodiments, the model 576 includes, or can be replaced with, the trigger rule and the action rule. The trigger rule and the action rule can be logical statements and/or conditions that include parameter values and/or create an output action. The parameter values can, in some embodiments, be identified through a learning process, e.g., as described through FIGS. 12-22.

In step 1104, the agent 570 can receive information from at least one of a physical device and/or from the graph 529. The information can be generated by a physical device, e.g., the building subsystems 122. The building data platform 100 can, in some embodiments, receive the information from the physical device, ingest the information into the graph 529, and the agent 570 can read the information from the graph 529. In some embodiments, the agent 570 can check the information of the graph 529 against a trigger rule at a set period.

In step 1106, the agent 570 determines whether the information received in the step 1104 causes the condition to be met. The agent 570 can apply the information to the trigger rule to determine whether the trigger rule is triggered, i.e., the condition of the trigger rule being met.

In step 1108, the agent 570 can perform the action responsive to the condition being met by the information determined in step 1106. The action may cause a physical device to be operated or information be sent to another agent including another trigger rule and another action rule. In some embodiments, the action can be performed by executing the action rule of the agent 570. The action rule can perform an action based on one or more parameter value of the action rule. In some embodiments, the action output of the action rule can be sent directly to the physical device, e.g., the building subsystems 122. In some embodiments, the action output can be stored into the graph 529. Another operating component of the building data platform 100, e.g., the command processor 136, can read the action from the graph 529 can communicate a corresponding command to the building subsystems 122.

Referring generally to FIGS. 12-23, systems and methods for using artificial intelligence to determine triggers and actions for an agent is shown. The triggers can trigger autonomously based on received data and cause an action to occur. In some embodiments, multiple digital twins can interact with each other by identifying interrelationships between each other via the graph 529, e.g., a VAV digital twin could interact with an AHU digital twin responsive to identifying that a VAV represented by the VAV digital twin is related to an AHU represented by the AHU digital twin via the graph 529. The digital twins can in some embodiments, simulate the impact of triggers and/or actions to validate and learn triggers and/or actions.

In some embodiments, the building data platform 100 can perform q-learning (Reinforcement Learning) to train and/or retrain the triggers and/or actions of the agents. In some embodiments, the data used to train and/or retrain the triggers and/or actions can be simulated data determined by another digital twin.

One digital twin may have trigger conditions such as, "when the outside temperature is $x_0$," "when the inside humidity is x %," "when an AI-driven algorithm's threshold is reached," and "when it is a certain day of the week." In responsive to one or multiple triggers being met, the digital twin can perform actions (e.g., capabilities of a device either inherent and/or digital twin enhanced). The actions can include setting a setpoint to a value $x_0$. The actions can be to run a fan for x minutes. The actions can be to start an AI-driven energy saving schedule. The actions can be to change a mode status to an away status. In some embodiments, the building data platform 100 can user other digital twins to simulate a reward for various values of the triggers and/or actions. The reward can be optimized to determine values for the parameters of the triggers and/or actions.

In some embodiments, allowing the digital twin to learn and adjust the parameters of the triggers and/or rules allows the digital twin to optimize responses to internal and/or external events in real-time. In some embodiments, the digital twin performs operations with the correlation of contextual relationships to provide spatial intelligence. In some embodiments, the digital twin allows for AI-based self-learning solutions to operate on top of the digital twin.

The digital twin can capture comprehensive data that drives rich analytics for security, compliance, etc. In some embodiments, the digital twin can enable and perform simulations.

In some embodiments, the building data platform 100 can identify events and/or event patterns if the building data platform 100 identifies a pattern that suggests a trigger and/or action should be updated. For example, if the building data platform 100 identifies a pattern occurring in a building, the building data platform 100 can set triggers and/or actions in digital twins to allow the pattern to occur automatically. For example, if a user closes their blinds at 5:00 P.M. regularly on weekdays, this could indicate that the user desires the blinds to be closed at 5:00 P.M. each day. The building data platform 100 can set a blind control digital twin to trigger a blind closing action at 5:00 P.M. each day.

In some embodiments, an agent of a digital twin can predict an inference in the future indicating that some action should be performed in the future. The building data platform 100 can identify that the action should be performed in the future and can set up a flow so that a prediction of one digital twin can be fed into another digital twin that can perform the action.

Referring now to FIG. 12, a system 1200 of a trigger rule 1202 of a thermostat digital twin where parameters of the trigger rule 1202 are trained is shown, according to an exemplary embodiment. In some embodiments, the system 1200 can implement a model that rewards triggers and/or actions of the thermostat digital twin using a neural network that is trained from data aggregated from a related digital twin of the thermostat digital twin, an air handler unit digital twin.

The building data platform 100 can perturb parameters, $\varepsilon_1$ and $\varepsilon_2$ of the trigger rule 1202 of the thermostat digital twin. The trigger rule 1202 may be that if a number of occupants is greater than $\varepsilon_1$ and a zone temperature is less than $\varepsilon_2°$ C. the rule is triggered and a corresponding action be performed. The corresponding action can be to increase a supply air temperature setpoint of an AHU to 22° C. The perturbation of the parameters can be increasing or decreasing the parameters in set amounts from existing values. The perturbation of the parameters can be selecting a space of values for the parameters and/or randomizing the parameters and/or parameter space.

With the perturbed values for $\varepsilon_1$ and $\varepsilon_2$, the AHU digital twin 1204 can simulate the state of the AHU via the AHU digital twin 1204 for various conditions of occupant number and zone temperature. The result of the various states of the AHU digital twin 1204. The simulation can be performed by the AI agent 570 via the model 576. The output of the model 576 can be the simulated states, e.g., timeseries 566.

The building data platform 100 can analyze the states produced by the AHU digital twin 1204 to determine energy and comfort results from the states of the AHU digital twin 1204. For example, an energy score can be generated for each state. For example, a power consumption level can be determined for each state. Similarly, a comfort violation score can be determined for each state. The comfort violation can indicate whether or not a temperature, humidity, or other condition of a physical space controlled by the AHU would be uncomfortable for a user (e.g., go below or above certain levels).

The building data platform 100 can generate accumulated training data. The accumulated training data can include the values of the parameters $\varepsilon_1$ and $\varepsilon_2$, the state of the AHU digital twin 1204 for each value of the parameters, and the energy score and comfort violation score for each state. In some embodiments, the triggers and/or actions that can be recommended for the thermostat digital twin can be determined by observing the responses of other digital twins on perturbed thresholds of existing triggers and/or actions.

The building data platform 100 can generate neural networks 1210 for predicting an energy score based on the parameters $\varepsilon_1$ and $\varepsilon_2$. Furthermore, the neural networks 1210 can indicate a comfort violation score for the parameters $\varepsilon_1$ and $\varepsilon_2$. The neural networks 1210 can be trained by the building data platform 100 based on the accumulated training data 1208.

Based on the trained neural network models 1210, the building data platform 100 can determine optimal values for the parameters $\varepsilon_1$ and $\varepsilon_2$. The building data platform 100 can search a space of potential values for $\varepsilon_1$ and $\varepsilon_2$ that consider predicted energy scores and/or comfort violation scores predicted by the trained neural network models 1210. The optimization can be the relation 1400 shown in FIG. 14. The optimization 1212 performed by the building data platform 100 can be a method of computing the optimal threshold of a trigger conditions using the neural network models 1210 of rewards (e.g., energy and comfort) and solving constrained optimization model. Similarly, the optimization 1212 performed by the building data platform 100 to determine the optimal threshold of action commands using the neural network models 1210 of rewards and solving constrained optimization.

In some embodiments, the optimal values for the parameters found by the building data platform 100 can be presented to a user for review and/or approval via a user interface, e.g., via the user device 176. In some embodiments, the recommendations produced by the building data platform 100 through the components 1202-1212 can be restricted by only looking at state/value changes of digital twins that are nearest neighbors in the graph 529, e.g., two nodes are directed related by one edge, e.g., a thermostat node for the thermostat digital twin is directed to an AHU node for the AHU digital twin 1204. In some embodiments, the building data platform 100 can use spatial correlation to assume contextual relationship between assets that can affect each other's attribute states/values.

Referring now to FIG. 13, a process 1300 for identifying values for the parameters of the trigger rule 1202 of FIG. 12 is shown, according to an exemplary embodiment. The process 1300 can be performed by the building data platform 100 and/or any component of the building data platform 100. The process 1300 can be performed by the system 500 and/or components of the system 500. Furthermore, the process 1300 can be performed by any computing device described herein.

In step 1302, the building data platform 100 can perturb a thermostat digital twin (e.g., the thermostat digital twin rule 1202) with various value for thresholds and/or other parameters, E. The result of the perturbed parameters can result in various states, s. The states can be states predicted by the thermostat digital twin or another digital twin that operates based on the thresholds and/or parameters E, e.g., the AHU digital twin 1204. The perturbations and simulated states can result in pairs (S, ε). The pairs can be used to determine feedback for energy and/or comfort, e.g., (E, C).

In step 1304, the building data platform 100 can building neural network models, e.g., the neural networks 1210 based on the data determined in step 1302. The neural networks 1210 can predict energy rewards as a function of the state and the parameters, e.g., E=f(s, ε). Furthermore, the neural networks 1210 can predict comfort rewards as a function of the state and the parameters, e.g., C=f(s, ε).

In step 1306, the building data platform 100 can determine a value for the parameter, E that minimizes a relation, $(\alpha_1 \cdot E + \alpha_2 \cdot C)$. The minimization is shown in relation 1400 of FIG. 14. The values of $\alpha_1$ and $\alpha_2$ can weigh the various rewards in the relation that is minimized, e.g., the energy reward and/or the comfort reward. In step 1308, the building data platform 100 can periodically repeat the steps 1302-1306. For example. For example, the building data platform 100 can repeat the steps at a defined time period. In some embodiments, the building data platform 100 can compute rewards for the actions of the thermostat digital twin. If the rewards indicate that the thermostat digital twin need retraining, the building data platform 100 can repeat the steps 1302-1308.

Figure 15:
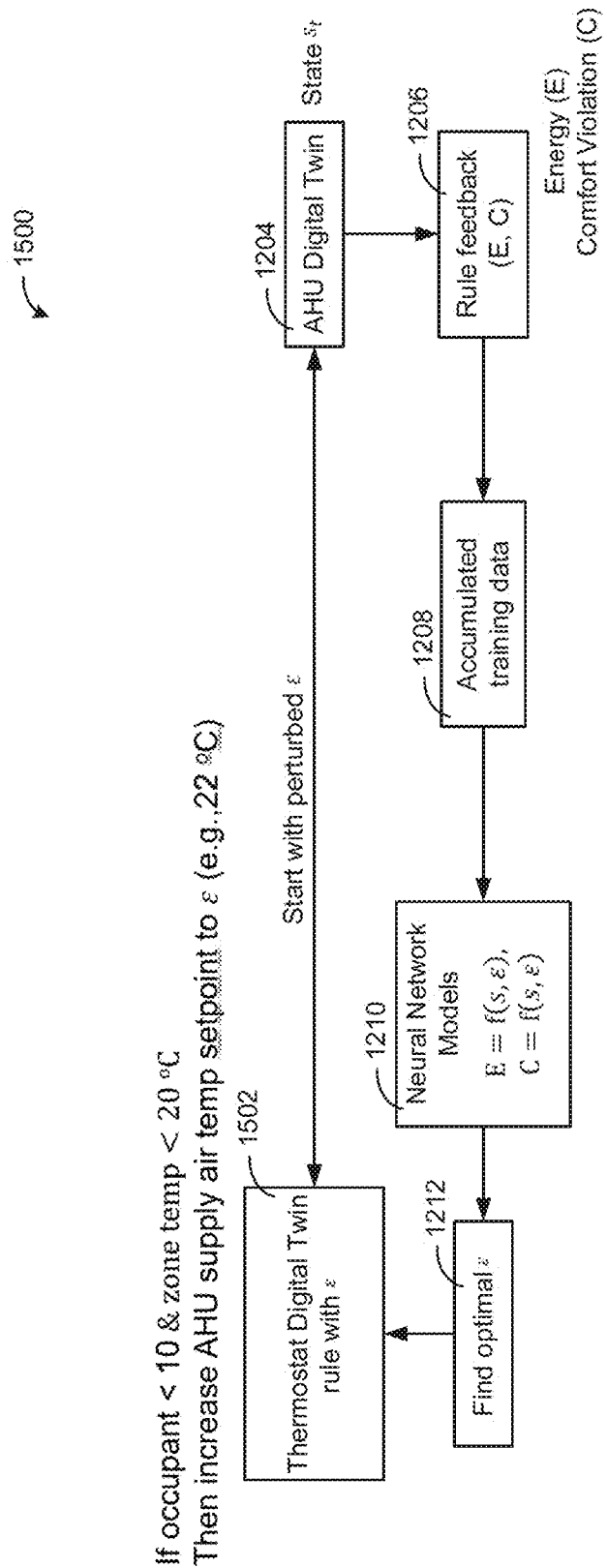
FIG. 15 is a block diagram of an action rule of a thermostat digital twin where parameters of the action rule is trained, according to an exemplary embodiment.

Referring now to FIG. 15, a system 1500 of components where an action rule 1502 of a thermostat digital twin is shown where parameters of the action rule 1502 are trained, according to an exemplary embodiment. The system 1500 can include similar and/or the same components of FIG. 14. The process 1300 of FIG. 13 can be applied to the action rule 1502 to train the parameters of the action rule 1502.

The thermostat digital twin rule 1502 can be an action rule that if a trigger is met (e.g., the trigger 1402), the action rule 1502 executes to command the AHU digital twin 1204. The trigger rule may be to execute the action rule if an occupant count is greater than ten and a zone temperature is less than twenty degrees Celsius. The action rule 1502 may be to increase an AHU supply air temperature setpoint to a value, e.g., E. The value can, in some embodiments, be 22 degrees Celsius.

The building data platform 100 can predict states resulting from perturbed values of ε by executing the AHU digital twin 1204 to simulate the states. The building data platform 100 can collect rule feedback 1206 to construct accumulated training data 1208. Furthermore, the building data platform 100 can train neural network models 1210 based on the accumulated training data 1208 and find optimal values for the parameter E based on the trained neural network models 1210

Figure 16:
FIG. 16 is lists of states of a zone and of an air handler unit that can be used to train the parameters of the trigger rule and the action rule of the thermostat digital twins of FIGS. 12-15, according to an exemplary embodiment.

Referring now to FIG. 16, a list 1600 and a list 1602 of states of a zone and of an air handler unit that can be used to train the parameters of the trigger rule and the action rule of the thermostat digital twins of FIGS. 12-15 is shown, according to an exemplary embodiment. The list 1600 includes states for a zone. The states can be zone temperature, zone humidity, outdoor air temperature, outdoor air humidity, zone occupancy, etc. These states can be predicted and/or determined based on a digital twin for a space based on perturbed parameter values for a trigger rule, an action rule, weather forecasts, etc. In this regard, the rule feedback 1206, in some embodiments, can be generated based on the digital twin for the space and used to tune the values of the parameters for the trigger rule 1402 and/or the action rule 1502.

The list 1602 includes states for an AHU. The states can be supply air temperature, supply air flow rate, return air temperature, return air flow rate, outdoor air flow rate, etc. These states can be predicted and/or determined based on a digital twin for an AHU (e.g., the AHU digital twin 1204) based on perturbed parameter values for a trigger rule, an action rule, etc. In this regard, the rule feedback 1206 in some embodiments, can be generated based on the digital twin for the AHU and used to tune the values of the parameters for the trigger rule 1402 and/or the action rule 1502.

Referring now to FIG. 17, a system 1700 of a trigger rule of a chemical reactor digital twin where parameters of a trigger rule are trained is shown, according to an exemplary embodiment. A reactor feed digital twin which may model the feed of a chemical reactor can include various trigger rules and/or action rules, e.g., the trigger rule 1702. The trigger rule 1702 can be that if a chemical concentration of a first chemical A is less than $\varepsilon_1$ (e.g., 10 g/l) and a chemical concentration of a second chemical B is less than $\varepsilon_2$ (e.g., 20 g/l) then an action rule is triggered. The action rule may be increase a catalyst C feed amount to 300 g/s.

The building data platform 100 can perturb the values for the parameters $\varepsilon_1$ and $\varepsilon_2$ of the reactor feed digital twin trigger rule 1702 (e.g., pseudo-randomly, increasing and/or decreasing in a particular number of predefined increments, etc.). A chemical reactor digital twin 1704 can simulate a state of the chemical reactor for the various perturbed parameters $\varepsilon_1$ and $\varepsilon_2$. The building data platform 100 can determine a rule feedback 1706 for the state simulate by the chemical reactor digital twin 1704. The rule feedback 1706 can identify scores for production throughput (P) and chemical property (C).

The building data platform 100 can accumulate training data 1708. The accumulated training data 1708 can include the feedback 1706, the state simulated by the chemical reactor digital twin 1704, and/or the parameter values for $\varepsilon_1$ and $\varepsilon_2$. The building data platform 100 can train neural network models 1710 to predict production throughput and/or chemical property for the various parameter and/or state pairs, e.g., the state resulting from the parameters of the trigger rule 1702. The building data platform 100 can use the trained neural network models 1710 to identify optimal values for $\varepsilon_1$ and $\varepsilon_2$. In element 1712, the building data platform 100 can identify values for $\varepsilon_1$ and $\varepsilon_2$ that minimize the relation 1900 shown in FIG. 19. In some embodiment, the optimization can optimize production throughput and/or chemical property.

Referring now to FIG. 18, a process 1800 for identifying values for the parameters of the trigger rule of FIG. 17 is shown, according to an exemplary embodiment. The process 1800 can be performed by the building data platform 100 and/or any component of the building data platform 100. The process 1900 can be performed by the system 500 and/or components of the system 500. Furthermore, the process 1800 can be performed by any computing device described herein. The steps 1802-1808 can be the same as or similar to the steps 1302-1308. However, the steps 1802-1808 can be executed for a reactor digital twin and the reward for training the neural networks and be production throughput and chemical property.

In step 1802, the building data platform 100 can perturb a reactor digital twin 1704 with various values of a threshold E of a trigger rule 1702 with various values which cause the reactor digital twin to determine resulting states for the various values of the threshold, E. The states and the values for the threshold E can create state threshold pairs. The pairs can be used to determine feedback, e.g., production throughput and chemical property.

In step 1804, after some accumulation of feedback data, the building data platform 100 can build neural network models 1710 based on the pairs that predict production throughput and chemical property based on the values for the threshold E. In step 1806, the building data platform 100 can determine a value for the threshold E that maximizes a reward and/or minimizes a penalty. The building data platform 100 can minimize the relation 1900 of FIG. 19. In step 1808, the building data platform 100 can periodically retrain the values for the threshold E for the trigger rule 1702.

Figure 20:
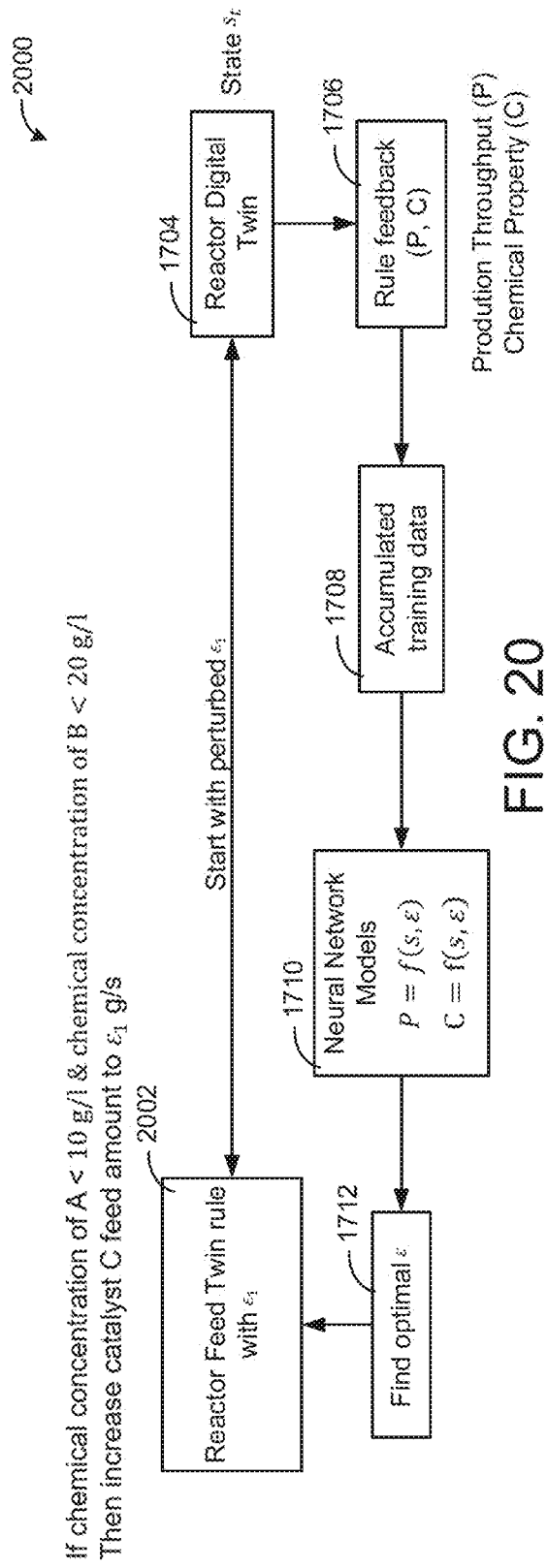
FIG. 20 is a block diagram of an action rule of a chemical reactor digital twin where parameters of the action rule are trained, according to an exemplary embodiment.

Referring now to FIG. 20, a system 2000 including an action rule 2002 of a chemical reactor digital twin where parameters of the action rule 2002 are trained is shown, according to an exemplary embodiment. The reactor feed twin rule 2002 can be an action rule to increase a catalyst C feed amount to $\varepsilon_1$ g/s in response to an trigger rule being triggered, e.g., the trigger rule 1702. The building data platform 100 can perturb the values of the parameter $\varepsilon_1$ and the reactor digital twin 1704 can predict states resulting from the perturbed parameter. The building data platform 100 can determine rule feedback 1706 and generate accumulated training data 1708 based on the rule feedback 1706. The building data platform 100 can train the neural network models 1710. Based on the neural network models 1710, the building data platform 100 can find optimal values for the parameter $\varepsilon_1$.

Figure 21:
FIG. 21 is lists of states of a reactor and a feed of a reactor that can be included in the trigger rule and the action rule of FIGS. 12-15, according to an exemplary embodiment.

Referring now to FIG. 21, a list 2100 and a list 2102 of states of a feed of a reactor and a reactor that can be included in the trigger rule and the action rule of FIGS. 12-15 are shown, according to an exemplary embodiment. The list 2100 includes states for a feed of a chemical reactor. The states can be reactants feed amount, catalysts feed amount, feed stream temperature, etc. These states can be predicted and/or determined based on a digital twin for a space based on perturbed parameter values for a trigger rule, an action rule, etc. In this regard, the rule feedback 1706 in some embodiments, can be generated based on the digital twin for the space and used to tune the values of the parameters for the trigger rule 1702 and/or the action rule 2002.

The list 2102 includes states for a chemical reactor. The states can be product concentration, cooling coil temperature, product temperature, etc. These states can be predicted and/or determined based on a digital twin for a chemical reactor (e.g., the reactor digital twin 1704) based on perturbed parameter values for a trigger rule, an action rule, etc. In this regard, the rule feedback 1706 in some embodiments, can be generated based on the digital twin for the chemical reactor and used to tune the values of the parameters for the trigger rule 1702 and/or the action rule 2002.

Figure 22:
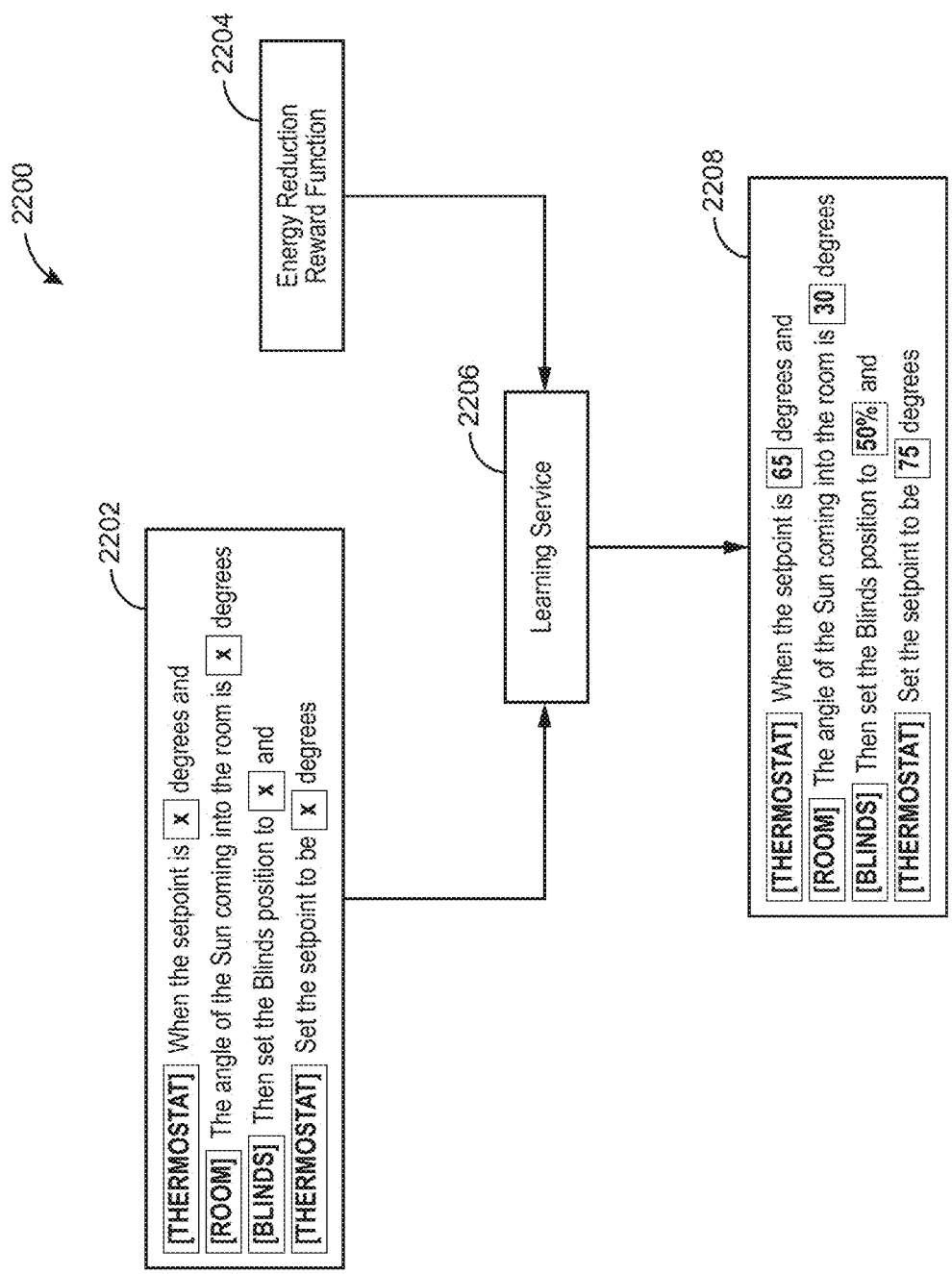
FIG. 22 is a block diagram of triggers and actions that can be constructed and learned for a digital twin, according to an exemplary embodiment.

Referring now to FIG. 22, a system 2200 where triggers and actions that can be constructed and learned for a digital twin is shown, according to an exemplary embodiment. Considering a building where a room in the building has a thermostat, the building data platform 100 can construct triggers and/or actions of an agent of a digital twin or the room. The triggers and/or actions can be determined with an energy reduction reward function 2204 by a learning service 2206. The energy reduction reward function 2204 can produce triggers and/or actions that have values that minimize energy usage.

In some embodiments, the building data platform 100 can search the graph 529 to identify information related to the space, e.g., related pieces of equipment, spaces, people, etc. For example, the building data platform 100 can identify which entities of the graph 529 are related and operate to affect each other. The building data platform 100 can identify which actions each entity can perform and/or what measurements each entity can make, e.g., by identifying related data nodes for each entity. The identified entities, measurements, and/or commands can be combined into the rule 2202 by the building data platform 100.

In some embodiments, the learning service 2206, which may be a component of the building data platform 100, can run a learning process with the rule 2202 and/or one or more reward functions (e.g., comfort reward function, carbon footprint reduction reward function, the energy reduction reward function 2204, etc.). The learning service 2206 can learn the rule 2208 from the rule 2202 and/or the energy reduction reward function 2204.

The learning service 2206 can run an optimization to determine combinations between measurements and actions triggered based on the measurements. The learning service 2206 can determine values for each measurement and/or action. Furthermore, the learning service 2206 can identify the relational operations for causing a trigger, e.g., equals to, greater than, less than, not equal to, etc. Furthermore, the learning service 2206 can identify action operations, e.g., increase by a particular amount, decrease by a particular amount, set an output equal to a value, run a particular algorithm, etc.

Figure 23:
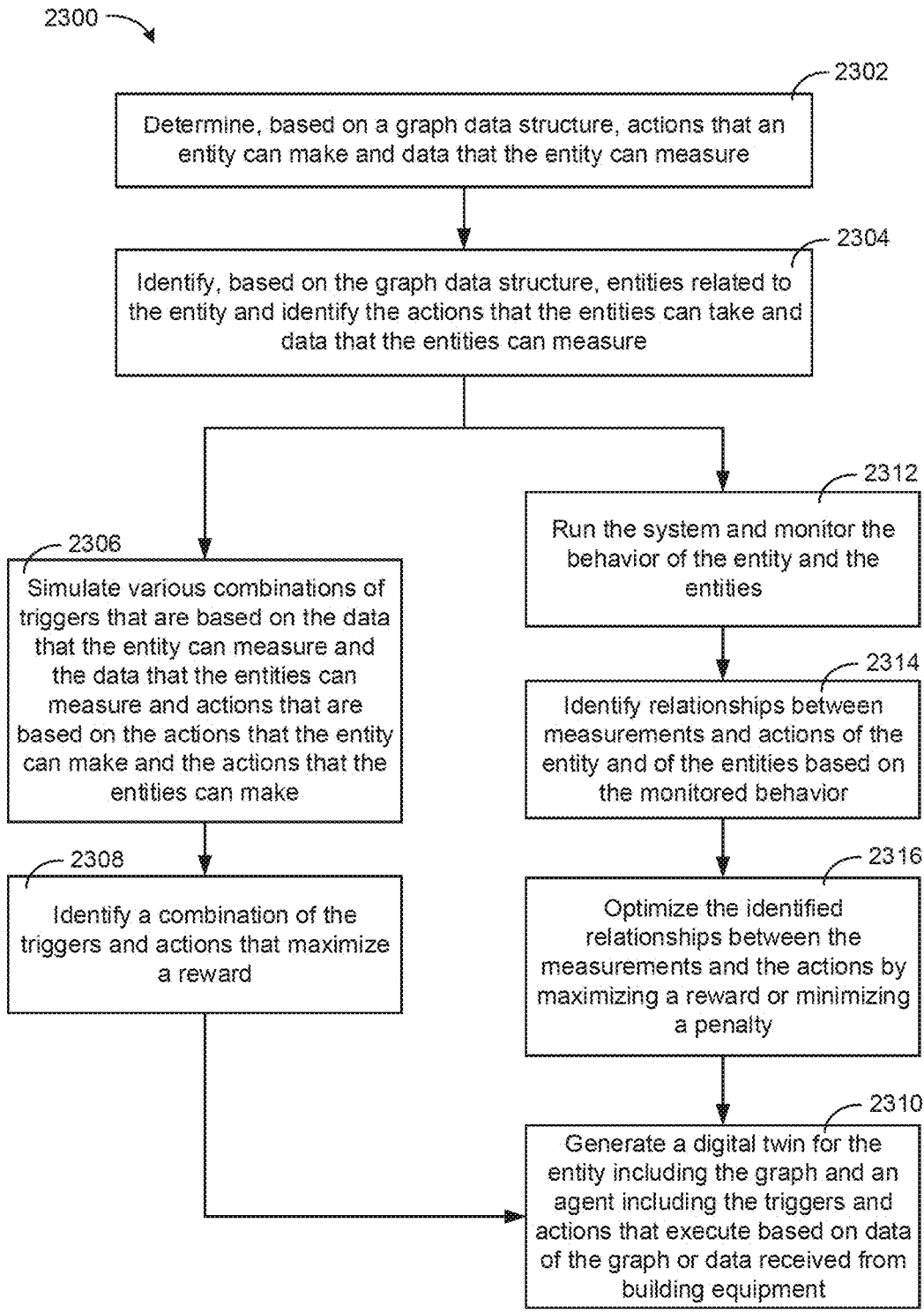
FIG. 23 is a flow diagram of a process for constructing triggers and actions for a digital twin, according to an exemplary embodiment.

Referring now to FIG. 23, a process 2300 for constructing triggers and actions for a digital twin is shown, according to an exemplary embodiment. In some embodiments, the process 2300 can be performed by the building data platform 100. In some embodiments, the process 2300 can be performed by the learning service 2206.

In step 2302, the building data platform 100 can determine actions that a particular entity can take and data that the entity can measure by analyzing a graph 529. The entity can be a thermostat, an air handler unit, a zone of a building, a person, a VAV unit, and/or any other entity. For example, if the entity is a thermostat the building data platform 100 could identify room temperature measurements for a thermostat and/or a cooling stage command, a heating stage command, a fan command, etc. that the thermostat can perform. Responsive to identifying data that the entity can measure, the building data platform 100 can generate a trigger condition based on the data type, e.g., when the temperature is equal to, less than, greater than, and/or not equal to some parameter value, trigger an action.

In step 2304, the building data platform 100 identifies, based on the graph 529, entities related to the entity and actions that the entities can take and data that the entities can measure. For example, if the entity is for a thermostat for a zone, the building data platform 100, could identify a shade control system for controlling a shade of the zone, an air handler unit that serves the zone, a VAV that serves the zone, etc. For example, the building data platform 100 can identify, based on the building graph 529, that a binds node is associated with a zone node that the thermostat node is related to. The building data platform 100 can identify a list of actions that the entities can perform, e.g., setting blind position from 0% (fully open) to 100% (fully closed).

In some 2306, the building data platform 100 can simulate various combinations of triggers that tare based on the data that the entity and/or entities can measure and actions that are based on the actions that the entity and/or entities can make. The building data platform 100 can simulate various combinations, trigger operations, action operations, and/or parameters.

In step 2308, the building data platform 100 can identify a combination of triggers and actions that maximizes a reward. The building data platform 100 can search the simulated combinations of triggers and/or actions to identify a trigger and/or action that maximizes a reward and/or minimizes a reward. In some embodiments, the building data platform 100 uses a policy gradient and value function instead of brute force to try out combinations of the triggers and/or actions in the steps 2306-2308.

In some embodiments, the building data platform 100 can identify the operations for the triggers and/or actions. For example, the operation could be comparing a measurement to a threshold, determining whether a measurement is less than a threshold, determining whether a measurement is greater than the threshold, determining whether the measurement is not equal to the threshold, etc.

In step 2310, the building data platform 100 can generate a digital twin for the entity. The entity can include (or reference) the graph 529 and include an agent that operates the triggers and/or actions. The triggers and/or actions can operate based on the graph 529 and/or based on data received building equipment, e.g., the building subsystems 122.

In step 2312, the building data platform 100 can run a building system of a building and monitor the behavior of the entity and entities of the building. In some embodiments, the building system can be the building subsystems 122. In step 2314, the building data platform 100 can identify relationships between the measurements and actions of the entity and/or the entities based on the monitored behavior. The building data platform 100 can discover existing relationships by identifying how the measurements are currently affecting actions based on the monitored behavior. In step 2316, the building data platform 100 can optimize the identified relationships between the measurements and the actions by maximizing a reward or minimizing a penalty.

High Level Digital Twin

Referring generally to FIGS. 24-35, systems and methods for a high level digital twin are shown and described. The high level digital twin can be a digital twin formed from multiple lower level digital twins. In some embodiments, each digital twin can include operational capabilities, e.g., triggers and/or actions (e.g., the triggers 595 and the actions 597) and/or various other operational functions, e.g., a model (e.g., the model 576), machine learning models, artificial intelligence, computer applications, etc. In some embodiments, the capabilities of digital twins can be combined together into a higher level digital twin.

In some embodiments, the digital twins can be ordered in terms of a hierarchy, e.g., higher to lower level digital twins. The higher level digital twins can inherit the capabilities of the lower level digital twins. This form of inheritance may be a "reverse inheritance" where parent twins inherit the capabilities of children twins. The various high level digital twins can be formed based on similarities or relationships between digital twins or in an unrelated manner, e.g., unrelated digital twins grouped together to form a solution twin that operates to perform some action that provides a building solution.

Figure 24:
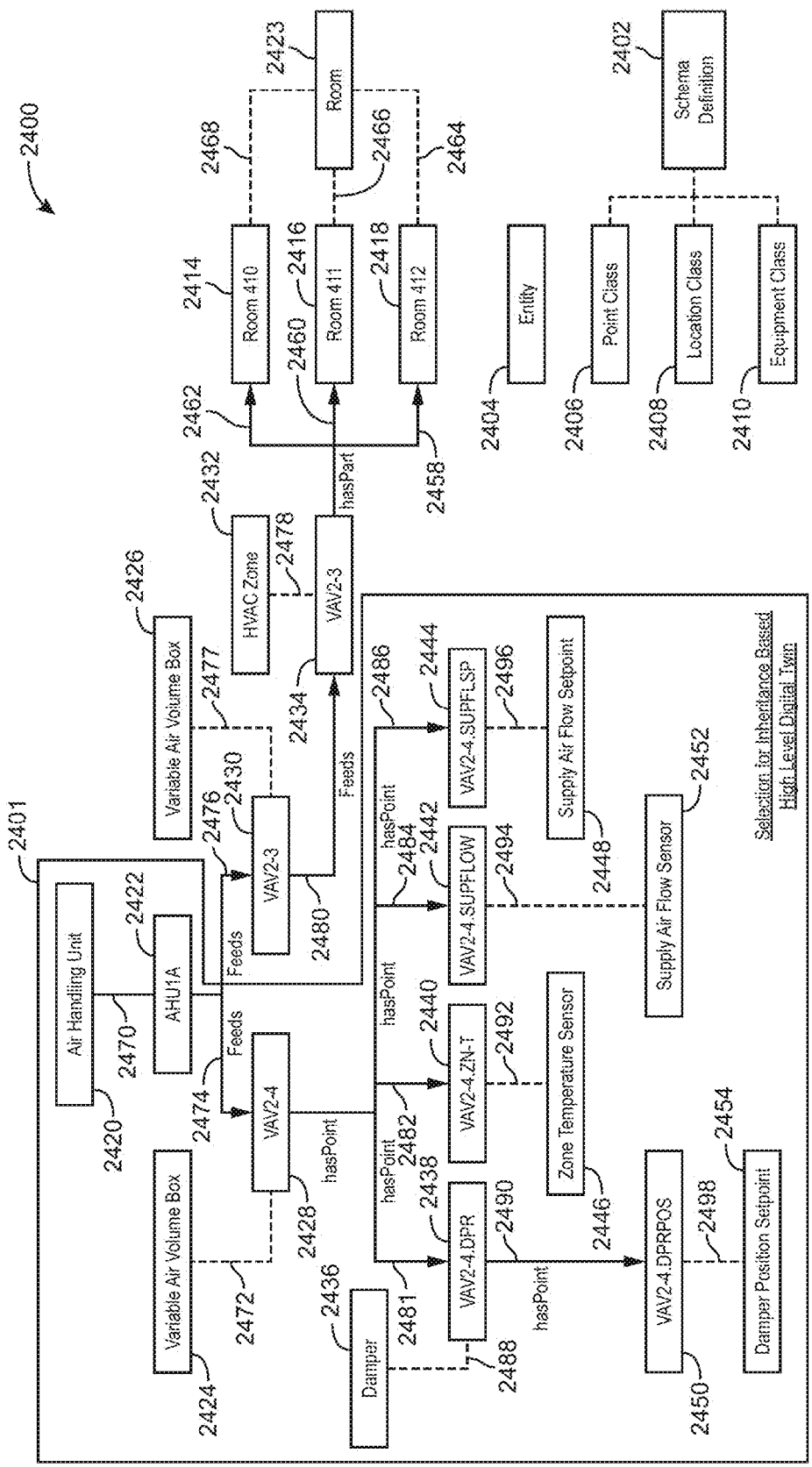
FIG. 24 is a block diagram of a building graph with a selection of nodes and edges that the twin manager of FIG. 5 analyzes to generate an inheritance based high level digital twin, according to an exemplary embodiment.

Referring now to FIG. 24, a block diagram of a building graph 2400 with a selection 2401 from nodes 2412-2450 and edges 2458-2490 that the twin manager 108 of FIG. 5 analyzes to generate an inheritance based high level digital twin is shown, according to an exemplary embodiment. The twin manager 108 can, in some embodiments, store the building graph 2400. The building graph 2400 can be the same as, or similar to, the building graphs described with reference to FIGS. 1-5 and elsewhere herein. The twin manager 108 can analyze at least some of the nodes 2412-2450 and edges 2458-2490 to identify a group of entities, and corresponding digital twins, that form a hierarchy. The hierarchy can be identified through the edges 2458-2490, e.g., the direction of the edges if the edges are unidirectional or based on a direction of a particular relationship type of a bidirectional relationship, e.g., identify a "feeds" and "fed by" bidirectional edge indicating that one node (that is being fed) depends from another node (that performs the feeding).

The building graph 2400 can be defined with nodes and edges of a particular schema, e.g., defined by schema definition 2402. The schema definition 2402 can be stored by the twin manager 108, in some embodiments. The schema definition 2402 can be the BRICK schema, in some embodiments. BRICK is described in *Brick: Towards a Unified Metadata Schema For Buildings* by Balaji et al., which is incorporated by reference herein. In some embodiments, the schema definition 2402 is a customized and/or extended schema. For example, an extended version of BRICK. Schema extensibility for digital twins is described in U.S. patent application Ser. No. 17/528,026 filed Nov. 16, 2021 and U.S. patent application Ser. No. 17/528,038 filed Nov. 16, 2021, the entireties of which are incorporated by reference herein. The digital twins described herein may be the same as, or similar to, the digital twin discussed in U.S. patent application Ser. No. 17/529,118 filed Nov. 17, 2021, U.S. patent application Ser. No. 17/537,046 filed Nov. 29, 2021, and U.S. patent application Ser. No. 17/529,120 filed Nov. 17, 2021, the entireties of which are incorporated by reference herein.

The schema definition 2402 can define classes 2406-2410 that the entities (e.g., entity 2404) can be an entity of. The classes can be a point class 2406 which can define the various types of available points, e.g., a zone temperature point, a zone humidity point, a temperature setpoint, a pressure setpoint, etc. The location class 2408 can define various types of available locations, e.g., rooms, conference rooms, hallways, floors, buildings, campuses, etc. The equipment class 2410 can indicate various different pieces of equipment AHUs, VAVs, thermostats, sensors, dampers, actuators, etc. The various classes 2405-2410 can define information such as the connections available between entities of different or the same class and/or whether entities should exist. For example, if a thermostat entity of a thermostat class of the equipment class 2410 is created, the thermostat class can indicate that the thermostat should have a "hasA" edge between the thermostat and a temperature setpoint of a temperature setpoint class of the point class 2406. The schema definition 2402 may further define various available semantic relationships (e.g., "hasA," "feeds," "includes," "isAPartOf," etc.). Furthermore, the schema definition can define what relationship types can be made between what entities of particular entity classes.

The building graph 2400 includes an AHU1A node 2422 representing an AHU of a building. The AHU1A node 2422 can be of a particular air handling unit class indicated by the edge 2470 between the node 2422 and the air handling unit class node 2420. The AHU represented by the AHU1A node 2422 can feed air to two VAVs. This is indicated by the feeds edge 2474 between the AHU1A node 2422 and the VAV2-4 node 2428 and the feeds edge 2476 between the AHU1A node 2422 and the VAV2-3 node 2430. The VAV2-4 and the VAV2-3 can each be a variable air volume box class indicated by the edge 2472 between the VAV 2-4 and the variable air volume box class node 2424 and the edge 2476 between the VAV 2-3 and the variable air volume box class 2426.

The VAV represented by the VAV2-3 node 2430 can feed air into a particular zone, e.g., a zone represented by the VAV2-3Zone node 2434 and the feeds edge 2480 between the VAV2-3 node 2430 and the VAV2-3Zone node 2434. The zone represented by the VAV2-3Zone can include multiple rooms indicated by the room 410 node 2414, the room 411 node 2416, and the room 412 node 2418 being related by the VAV2-3Zone 2434 via "hasPart" edges 2458-2462. Each of the room nodes 2414-2418 can be of a room class indicated by the edges 2464-2468 between the nodes 2414-2418 and the room class node 2412.

The VAV2-4 can include various points, e.g., point nodes 2438-2444, representing zone temperature, supply air flow, and a supply air flow setpoint respectively. The zone temperature and supply air flow can represent sensor measurements while the supply air flow setpoint represents a control point. The VAV2-4.ZNT node 2440, representing a zone temperature sensor, can be related to the VAV2-4 node 2428 via a "hasPoint" edge 2482 between the VAV2-4 node 2428 and the VAV2-4.ZN-T node 2440. The VAV2-4.ZN-T node 2440 can be of a zone temperature sensor class node 2446 indicated by the edge 2492 between the node 2440 and the node 2446. The VAV2-4.SUPFLOW node 2442, representing a supply air flow sensor, can be related to the VAV2-4 node 2428 via a "hasPoint" edge 2484 between the VAV2-4 node 2428 and the SUPFLOW node 2442. The VAV2-4.SUPFLOW node 2442 can be of a supply air flow sensor class node 2452 indicated by the edge 2494 between the node 2443 and the node 2452. The VAV2-4.SUPFLSP node 2444, representing a supply air flow setpoint, can be related to the VAV2-4 node 2428 via a "hasPoint" edge 2486 between the VAV2-4 node 2428 and the VAV2-4.SUPFFLSP node 2444. The VAV2-4.SUPFFLSP node 2444 can be of a supply air flow sensor class node 2448 indicated by the edge 2496 between the node 2444 and the node 2448.

The damper represented by the VAV2-4.DPR node 2438 can include a damper position setpoint indicated by the VAV2-4.DPRO node 2450. The damper node 2438 can be related to the damper position setpoint node 2450 via the edge 2490. The damper setpoint can be of a particular damper position setpoint class indicated by the edge 2498 between the node 2450 and the node 2454.

Figure 25A:
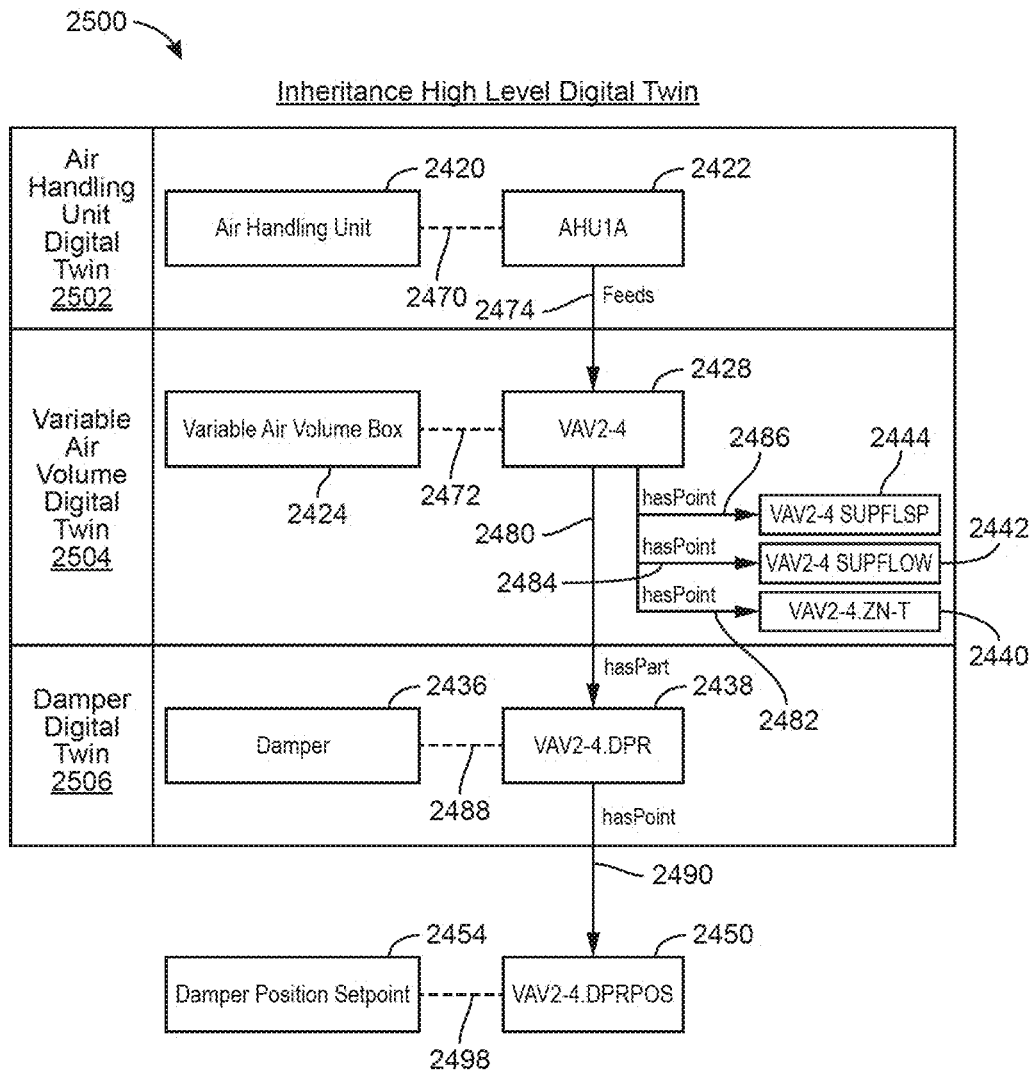
FIG. 25A is a chart of an air handling unit digital twin generated from lower level digital twins by the twin manager of FIG. 1, the air handling unit digital twin forming the inheritance based high level digital twin, according to an exemplary embodiment.

Referring now to FIG. 25A, a chart 2500 of an air handling unit digital twin 2502 generated from lower level digital twins 2504 and 2506 by the twin manager 108, the air handling unit digital twin 2502 forming the inheritance based high level digital twin, according to an exemplary embodiment. In some embodiments, the twin manager 108 separately generates the twins 2502-2506 and then combines the twins 2502-2506 together to form one high level inheritance digital twin. In some embodiments, the twin manager 108 separately generates the twins 2502-2506 and then combines the twins 2504 and 2506 into the twin 2502 to form a high level inheritance digital twin. In some embodiments, the twins 2502-2506 are already generated and the twin manager 108 generates the high level digital twin by selecting and/or combining the various digital twins 2502-2506 together.

In some embodiments, the twin manager 108 can analyze the building graph 2400 and make the selection 2401 based on identified dependencies between the various entities of the building graph 2400. The selection 2401 could indicate that a damper depends from a VAV and the VAV depends from an AHU. This is indicated by the node 2438 depending from the node 2428 via the edge 2480 and the node 2428 depending from the node 2422 via the edge 2474. In some embodiments, the twin manager 108 can identify a hierarchy of equipment via the class nodes 2420, 2424, and 2436. In some embodiments, the twin manager 108 can generate a digital twin, e.g., capabilities, for each equipment entity in the hierarchy. For example, the twin manager 108 can generate the air handling unit digital twin 2502, the variable air volume digital twin 2504, and the damper digital twin 2506. In some embodiments, the digital twins already exist for the various pieces of equipment and the twin manager 108 selects and/or groups existing digital twins based on the hierarchy.

In some embodiments, the high level digital twin can be an inheritance based high level digital twin. The inheritance digital twin can inherit the capabilities of child digital twins as indicated by the building graph 2400 (or the portion shown in FIG. 25A identified by the twin manager 108). Since the higher level digital twins inherit capabilities of the lower level digital twins, the inheritance may be a reverse inheritance.

In some embodiments, after the hierarchy shown in the chart 2500 is identified by the twin manager 108, the twin manager 108 can define a high level digital twin. The high level digital twin may be the air handling unit digital twin 2502 or a digital twin that includes the air handling unit digital twin 2502. The capabilities of the various lower level digital twins can be pushed up to the higher level digital twin and exposed through the higher level digital twins based on the various types relationships between the entities of the building graph 2400, e.g., the edges shown in the chart 2500 connecting the various entities.

The damper digital twin 2506 could be related to the damper represented by the node 2438 and the capabilities of the damper digital twin 2506 could be related to the points for the node 2438, e.g., the damper position setpoint represented by the VAV2-4.DPRP node 2438. The twin manager 108 could identify that the damper digital twin 2506 has capabilities by identifying what points are related to the damper node 2438, e.g., identify the "hasPoint" edge 2490 between the node 2438 and the node 2450. The capabilities can be triggers, e.g., determining whether to change some piece of information based on the setpoint, determine whether to change the setpoint, etc. The capabilities can be actions, determining to change the damper setpoint to a particular value. The capabilities of the damper digital twin 2506 could be pushed up to the higher level variable air volume digital twin 2504 based on the damper node 2438 depending via the edge 2480 from the VAV node 2428 that the variable air volume digital twin 2504 is generated for.

For example, the variable air volume digital twin 2504 could be related to the VAV represented by the node 2428 and the capabilities of the variable air volume digital twin 2504 could be related to the points for the node 2428, e.g., a zone temperature sensor, a supply air flow sensor, and/or a supply air flow setpoint. The twin manager 108 could identify that the variable air volume digital twin 2504 has capabilities by identifying what points are related to the VAV2-4 node 2438, e.g., identify the "hasPoint" edges 2482-2486 between the node 2428 and the nodes 2440-2444. The capabilities can be triggers, e.g., determining whether to change the supply air flow setpoint and can be based on various sensor measurements, e.g., the zone temperature and/or the supply air flow. The capabilities can be actions, determining to change the supply air flow setpoint. The capabilities of the variable air volume digital twin 2504 (including the inherited capabilities from the damper digital twin 2506) could be pushed up to the higher level air handling unit digital twin 2504 based on the VAV2-4 node 2438 depending via the edge 2474 from the AHU1A node 2422 that the air handling unit digital twin 2502 is generated for.

The air handling unit 2502 can include various capabilities. The capabilities can be triggers or actions associated with points of the AHU. The capabilities could be triggers and actions. The triggers and actions could determine whether to run a fan, to heat air, to cool air, to humidify air, to dehumidify air, to increase or decrease an outdoor air mixture, etc. Furthermore, the capabilities of the air handling unit digital twin 2502 could be the inherited capabilities inherited from the variable air volume digital twin 2504 and the damper digital twin 2506. In some embodiments, the twin manager 108 can combine multiple capabilities of the air handling unit digital twin 2502 together. For example, a trigger of the air handling unit digital twin 2502 could be combined with an action of the damper digital twin 2506 inherited by the air handling unit digital twin 2502. In some embodiments, the twin manager 108 can run one or more machine learning algorithms to identify patterns to connect the capabilities. In some embodiments, a user can provide manual input to combine the various capabilities together.

In some embodiments, the capabilities of the higher level digital twin, e.g., the air handling unit digital twin 2502, can get run at the air handling unit digital twin 2502 or alternatively pushed down to the lower level digital twins as appropriate. For example, if a capability of the higher level digital twin is inherited from the lower level digital twin, the higher level digital twin could communicate to the lower level digital twin causing the capability to be implemented by the lower level digital twin. For example, the air handling unit digital twin 2502 could have a capability to operate the damper associated with the damper digital twin 2506. If the air handling unit digital twin 2502 determines to implement the capability of the damper, the air handling unit digital twin 2502 could cause the damper digital twin 2506 to implement the capability. In some embodiments, triggers and/or actions can be run at a variety of levels of the digital twin.

Referring now to FIG. 25B, a table 2550 indicating attributes 2552, inherited attributes 2554, triggers 2556, and actions 2558 for the digital twins 2502-2506 is shown, according to an exemplary embodiment. The triggers 2556 and the actions 2558 can be the same as, or similar to, the triggers and actions described with respect to FIGS. 5-23. Furthermore, the triggers 2556 and the actions 2558 can be learned by the twin manager 108, e.g., as described in FIGS. 12-23.

The damper digital twin 2506 can include a damper position setpoint. The twin manager 108 can identify that the damper digital twin 2506 includes the damper position setpoint by identifying that the node representing the damper, node 2438, is related to the node 2450 representing the damper position setpoint. In some embodiments, the twin manager 108 can query the building graph 2400 for all entities of a point class connected to the node 2450 to identify all attributes for the damper digital twin 2506.

The damper digital twin 2506 may have various triggers based on the damper position setpoint. The triggers may be performing some action responsive to a logical determination made with the damper position. The logical determination can use an equality comparison, a greater than comparison, a less than comparison, and/or a not equal to comparison. The logical determination can include various variables and/or constants.

The damper digital twin 2506 can further includes an action that can be performed based on the damper position setpoint. The action may be to set the damper position setpoint to a particular value. The action can, in some embodiments, be a logical command, a control algorithm (e.g., a PID algorithm, a PI algorithm, etc.) that uses some received feedback to generate a new value the damper position, etc.

The variable air volume digital twin 2504 can include various attributes including a zone temperature measurements of a sensor, supply air flow measurements of a sensor, and/or supply air flow setpoint. The twin manager 108 can identify that the variable air volume digital twin 2504 includes the zone temperature measurements of a sensor, the supply air flow measurements of a sensor, and/or the supply air flow setpoint by identifying that the node representing the VAV, node 2428, is related to the nodes 2440, 2442, and 2444 representing the zone temperature measurements of a sensor, the supply air flow measurements of a sensor, and the supply air flow setpoint respectively. In some embodiments, the twin manager 108 can query the building graph 2400 for all entities of a point class connected to the node 2428 to identify all attributes for the variable air volume digital twin 2504.

The variable air volume digital twin 2504 may have various triggers based on the zone temperature measurements of a sensor, the supply air flow measurements of a sensor, and/or the supply air flow setpoint. The triggers may be performing some action responsive to a logical determination made with one of, or a combination of, the zone temperature measurements of a sensor, the supply air flow measurements of a sensor, and/or the supply air flow setpoint. The logical determination can use an equality comparison, a greater than comparison, a less than comparison, and/or a not equal to comparison. The logical determination can include various variables and/or constants.

The variable air volume digital twin 2504 can further include an action that can be performed based on the zone temperature measurements of a sensor, the supply air flow measurements of a sensor, and/or the supply air flow setpoint. The action can, in some embodiments, be a logical command, a control algorithm (e.g., a PID algorithm, a PI algorithm, etc.) that uses some received feedback to generate a new values, etc. The zone temperature could be set to a particular value responsive to a trigger occurring. In some embodiments, the trigger could identify that a particular value of the zone temperature or the supply air flow is out of a particular range. The action could cause a measurement to be replaced with an inferred value (e.g., a historical average) responsive to detecting the particular value is out of the range. The supply air flow setpoint could be adjusted based on zone temperature and/or supply air flow, e.g., to change to a value that the VAV is capable of meeting under certain zone temperature and/or supply air flow conditions. The action could be to change the supply air flow setpoint based on other triggers, e.g., a change in occupancy, a change in time of day, based on outdoor weather conditions, etc.

The variable air volume digital twin 2504 may inherit attributes from the damper digital twin 2506. For example, the variable air volume digital twin 2504 can inherit the damper position setpoint from the damper digital twin 2506. Furthermore, the variable air volume digital twin 2504 can inherit the triggers and actions of the damper digital twin. The inherited triggers and actions can be inherited based on the hierarchy, e.g., the variable air volume digital twin 2504 being above the damper digital twin 2506. In some embodiments, the inherited triggers and actions may identify the digital twin from which the trigger or action originated. For example, the trigger or action could be "{DAMPER_ID}.DPRPOS." The "DAMPER_ID" could be an identifier that uniquely identities the damper digital twin 2506 and/or the physical damper that the damper digital twin 2506 is linked to. In some embodiments, in a system with only a single damper, the damper identifier might be assumed by the twin manager 108 and may not be included.

The air handling unit digital twin 2502 can include various attributes including a fan speed, a static pressure, and/or an outdoor air mix. The twin manager 108 can identify that the air handling unit digital twin 2502 includes the fan speed, the static pressure, and/or the outdoor air mix by identifying that the node representing the AHU, node 2422, is related to the nodes representing the fan speed, the static pressure, and/or the outdoor air mix respectively. In some embodiments, the twin manager 108 can query the building graph 2400 for all entities of a point class connected to the node 2422 to identify all attributes for the air handling digital twin 2502.

The air handling unit digital twin 2502 may have various triggers based on the fan speed, the static pressure, and/or the outdoor air mix. The triggers may be performing some action responsive to a logical determination made with one of, or a combination of, the fan speed, the static pressure, and/or the outdoor air mix. The logical determination can use an equality comparison, a greater than comparison, a less than comparison, and/or a not equal to comparison. The logical determination can include various variables and/or constants.

The air handling unit digital twin 2502 can further include an action that can be performed based on the fan speed, the static pressure, and/or the outdoor air mix. The action can, in some embodiments, be a logical command, a control algorithm (e.g., a PID algorithm, a PI algorithm, etc.) that uses some received feedback to generate a new values, etc. The actions could be increasing or decreasing the fan speed, in some embodiments. The actions could be increasing or decreasing the mixture of outdoor air and return air to provide as supply air to the VAV, in some embodiments. The static pressure setpoint can further be set based on various factors to ensure that proper air flow through the air system is achieved. In some embodiments, the static pressure setpoint could be set based on airflow at various VAVs of a building, e.g., identify that there is low or no air flow at various VAVs of the building, indicating that a setpoint should be increased. Increasing the setpoint may further cause the air handling unit digital twin 2502 to increase the fan speed to meet the static pressure setpoint.

The air handling unit digital twin 2502 may inherit attributes from the damper digital twin 2506 and/or the damper digital twin 2506. For example, the air handling unit digital twin 2502 can inherit the triggers of the VAV, e.g., the triggers for zone temperature, supply air flow, and/or supply air flow setpoint. Similarly, the air handling unit digital 2502 can inherit actions from the variable air volume digital twin 2504, e.g., actions that set the zone temperature, supply air flow, and/or supply air flow setpoint. Each of the triggers and actions inherited from the variable air volume digital twin 2504 can include an identifier in each trigger or action, e.g., "{VAV_ID}." This can indicate which VAV the trigger or action is for and/or where the trigger or action originated. The "VAV_ID" could be an identifier that uniquely identities the VAV digital twin 2504 and/or the physical damper that the damper digital twin 2506 is linked to. In some embodiments, in a system with only a single VAV, the VAV identifier might be assumed by the twin manager 108 and may not be included.

The air handling unit digital twin 2502 can inherit triggers and/or actions of the variable air volume digital twin 2504 that were in turn inherited by the variable air volume digital twin 2504 from the damper digital twin 2506. For example, the air handling unit digital twin 2502 could inherit the damper position setpoint triggers and/or actions from the variable air volume digital twin 2504 and the damper digital twin 2506. These inherited triggers and actions can identify both the variable air volume and the damper, e.g., could include two identifiers. For example, the triggers and/or actions could indicate "{VAV_ID}.{DAMPER_ID}" to indicate that the trigger and/or action is inherited two times.

In some embodiments, the air handling unit digital twin 2502 can combine the various triggers and/or actions it includes (e.g., both inherited and/or original triggers and/or actions). In some embodiments, the triggers and/or actions can be combined by rules engine 926. For example, the rules engine 926 can be configured to cause a trigger of the air handling unit digital twin 2502 could trigger an action of the damper digital twin 2506. In some embodiments, complex combinations of the triggers and/or actions can be combined to perform a particular operation. For example, the air handling unit digital twin 2502 could indicate a trigger to perform an air flush of a building. The air handling unit digital twin 2502 could identify to perform a flush of all air in the building. To perform the flush, the outdoor air mix could be set to fully outdoor air, the fan could be set to full, and the camper could be set to completely open.

In some embodiments, the air handling unit digital twin 2502 may use a supply air flow sensor to operate. However, if the sensor stops functioning, the air handling unit digital twin 2502 could use an inherited air flow sensor from the variable air volume digital twin 2504 to replace the supply air flow sensor of the air handling unit digital twin 2502. In some embodiments, the air handling unit digital twin 2502 could run simulations to identify fail over points, some of which may be triggers, actions, or attributes inherited from lower level digital twins.

Figure 26:
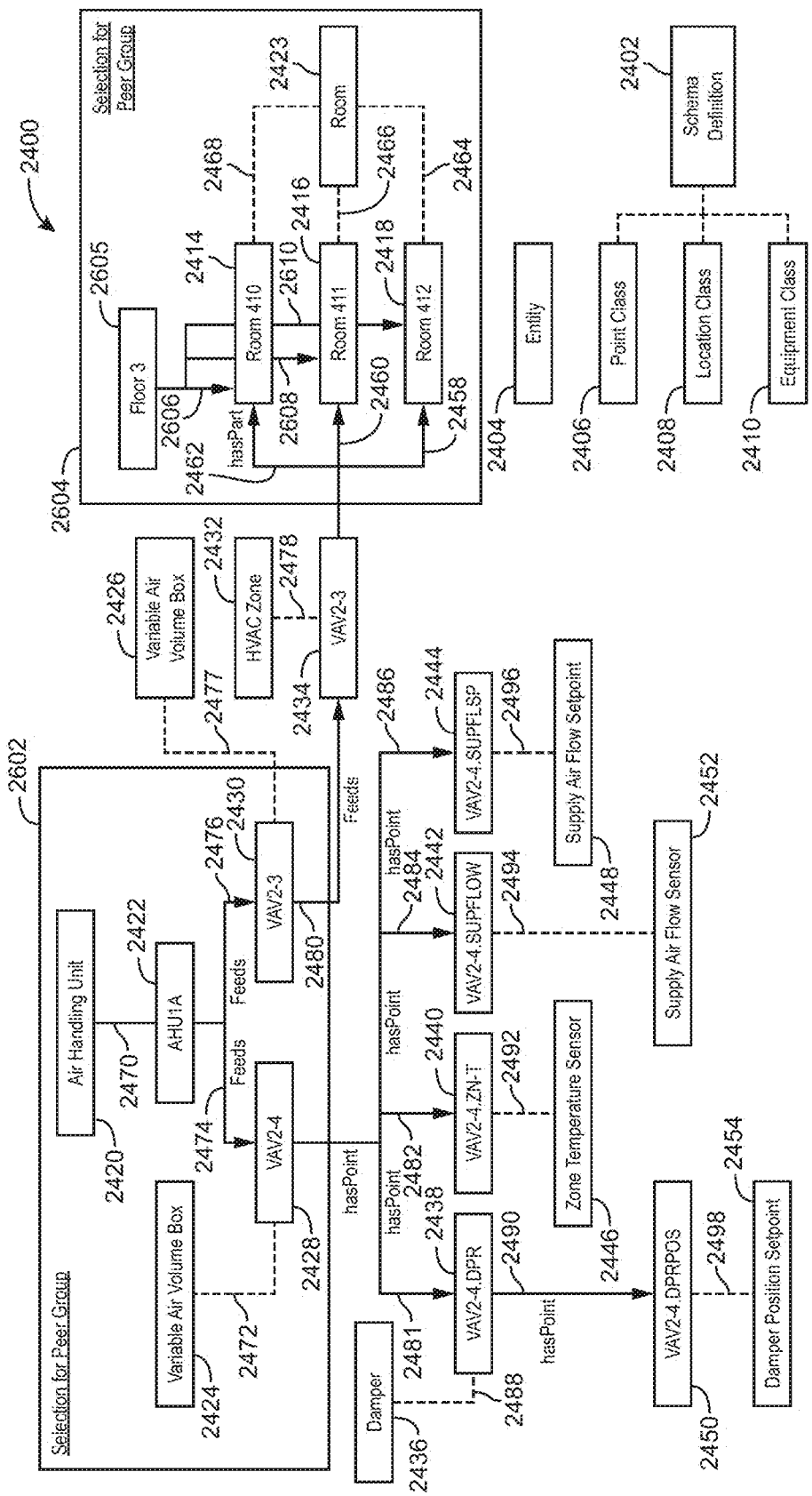
FIG. 26 is a block diagram of a building graph with a selection of nodes and edges that the twin manager of FIG. 1 analyzes to generate a peer grouped digital twin, according to an exemplary embodiment.

Referring now to FIG. 26, the building graph 2400 is shown with a selection 2602 of nodes and edges that the twin manager 108 analyzes to generate a peer grouped high level digital twin, according to an exemplary embodiment. In some embodiments, the twin manager 108 can analyze the building graph 2400 to identify that multiple entities of the building graph 2400 all relate to the same group, e.g., are all of the same type (e.g., are all VAV digital twins). The peer grouped digital twin can be a grouping of digital twins that are for the same entity type (person, space, piece of equipment, etc.). The grouping of digital twins can be set up to work together and can be rolled up to the same parent digital twin.

For example, the entities may all be linked to a particular system. For example, the twin manager 108 could identify that a set of devices all relate to controlling operation for a particular space and generate a group of high level digital twin based on the set of devices. The twin manager 108 could identify that a set of devices are all associated with a particular user and generate a group of high level digital twin based on the set of devices. In some embodiments, the twin manager 108 could identity that devices all make up a particular subsystem of a building and that a high level digital twin could be generated for.

In some embodiments, the twin manager 108 can identify that the AHU represented by the AHU node 2422, the VAV represented by the VAV node 2428, and the VAV represented by the VAV node 2430 all operate together to control air flow to a zone of a building, e.g., a floor 3. The floor 3 is represented by a node 2605, that includes the various rooms indicated by the edges 2606, 2608, and 2610 between the node 2605 and the nodes 24414-2418. The twin manager 108 can identify edges that relate the VAVs of the AHU to the particular zone, e.g., the edge 2480 between the VAV2-3 node 2430 and the VAV2-3Zone 2434 which is related to rooms of the floor 3 via edges 2462, 2460, and/or 2458 to the nodes 2414-2418.

In some embodiments, the twin manager 108 can periodically search the building graph 2400 to identify whether any new peer grouped digital twins can be generated. In some embodiments, a user and/or other system may provide an indication of an entity type for a peer group digital twin to be generated for, e.g., identify VAVs of an air system (the selection 2602), identify rooms of a floor (selection 2604), etc. The twin manager 108 can query the building graph 2400 based on the entity type, identify entities of the entity type, generate or select digital twins for the entities, and/or combine the digital twins into a peer grouped digital twin that can be added into a higher level digital twin. For example, digital twins of the nodes 2428 and 2430 can be rolled into the digital twin for the AHU represented by the node 2422. Similarly, digital twins of the floors represented by the nodes 2414-2418 can be rolled into the digital twin for the floor represented by the node 2605.

Figure 27A:
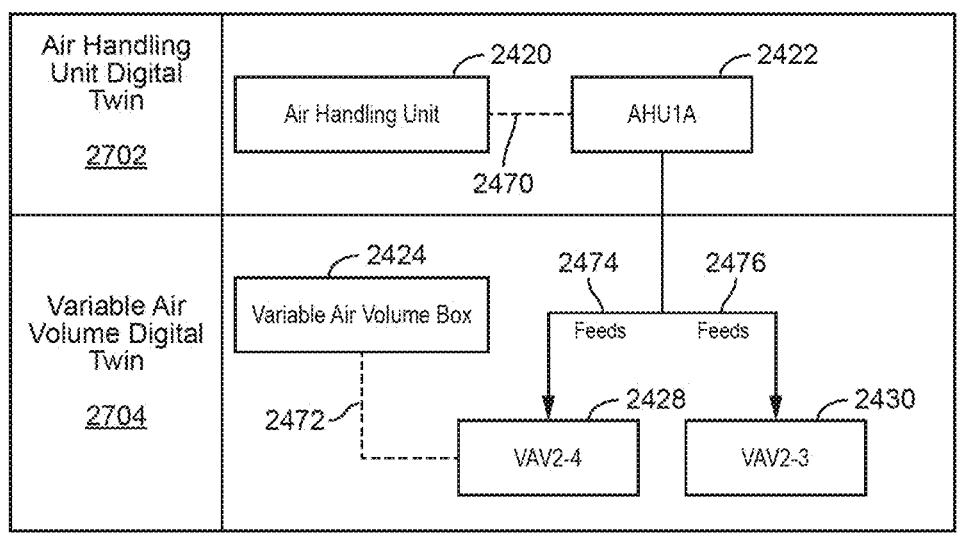
FIG. 27A is a block diagram of an air handling unit digital twin generated from lower level digital twins that are peer grouped by the twin manager of FIG. 1, according to an exemplary embodiment.

Referring now to FIG. 27A, a chart 2700 of an air handling unit digital twin 2702 generated from a lower level digital twin 2704 that is a peer grouped digital twin generated by the twin manager 108 is shown, according to an exemplary embodiment. Based on the selection 2602, the twin manager 108 can generate and/or select a digital twin for each entity identified in the selection 2602. For example, the twin manager 108 can generate a variable air volume digital twin 2704 for the VAV2-4 and/or VAV2-3. In some embodiments, a single digital twin is generated (and/or selected) to represent both of the VAVs. In some embodiments, two digital twins are generated (and/or selected), one for the VAV2-4 and a second for the VAV2-3. These two digital twins can be grouped together as a peer grouped digital twin.

The twin manager 108 can identify that the air handling unit digital twin 2702 is a higher level digital twin than the variable air volume digital twin 2704 based on dependencies between the AHU and the VAV in the building graph 2400. For example, the twin manager 108 can identify that the node 2428 representing the VAV2-4 depends from the AHU node 2422 via the "Feeds" edge 2474 and identify that the node 2430 representing the VAV2-3 depends from the AHU node 2422 via the "Feeds" edge 2476. Based on this dependency, the twin manager 108 can organize the digital twins 2702-2704 in a hierarchy such that the air handling unit digital twin 2702 is above the variable air volume digital twin 2704.

In some embodiments, the twin manager 108 can combine the twins 2702 and 2704 into a single digital twin. The digital twin may, in some embodiments, be a new digital twin. In some embodiments, the variable air volume digital twin 2704 is a peer grouped digital twin that is rolled up into the air handling unit digital twin 2702 to form a high level digital twin.

Referring now to FIG. 27B, a table 2750 indicating attributes 2752, inherited attributes 2754, triggers 2756, and actions 2758 for the digital twins 2702 and 2704 is shown, according to an exemplary embodiment. The variable air volume digital twin 2704 may be similar to, or the same as, the variable air volume digital twin 2504 and can include various of the same attributes, e.g., zone temperature, supply air flow, supply air flow setpoint, etc. However, the variable air volume digital twin 2704 may include attributes for both of the VAVs represented by the nodes 2428 and 2430 and thus may include two sets of the attributes. Similar to the variable air volume digital twin 2504, the variable air volume digital twin 2704 can inherit a damper position setpoint or setpoints from dampers that the VAVs represented by the nodes 2428 and 2430 include, e.g., the damper represented by the damper node 2438.

The variable air volume digital twin 2704 can include triggers and actions based on the attributes. The triggers and actions may be triggering on or setting the various attributes, e.g., zone temperature, supply air flow, supply air flow setpoint. The variable air volume digital twin 2704 can indicate triggers and/or actions for one or both of the VAVs represented by the nodes 2428 and 2430. The variable air volume digital twin 2704 can further include inherited triggers and/or actions for the dampers of the VAVs represented by the nodes 2428 and 2430 respectively.

In some embodiments, the triggers of the air handling unit digital twin 2702 can include a trigger that is based on a total value of an inherited attribute. For example, a total supply air flow of the VAVs could trigger a particular action, e.g., changing a fan speed, changing a static pressure, etc. Furthermore, in some embodiments, a trigger may change based on either or both of a particular attribute of the VAVs represented by nodes 2428 and 2430 and/or the dampers of the VAVs meets particular conditions, e.g., if either one or both zone temperatures meet a condition, perform an operational action, e.g., changing zone temperatures, changing fan speed, changing damper position etc. Furthermore, in some embodiments, an action can change one or multiple attributes. For example, one action may be to change one supply air flow setpoint of one VAV while another action might be to change all supply air flow setpoints of all VAVs. In some embodiments, the peer grouped digital twin could operate the VAVs in parallel (e.g., the same) or separately. In some embodiments, if one entity (e.g., chiller) of a chiller peer grouped digital twin fails or encounters an error, a rebalancing twin could cause the chillers to update operation to rebalance operation to account for the failing chiller.

Figure 28:
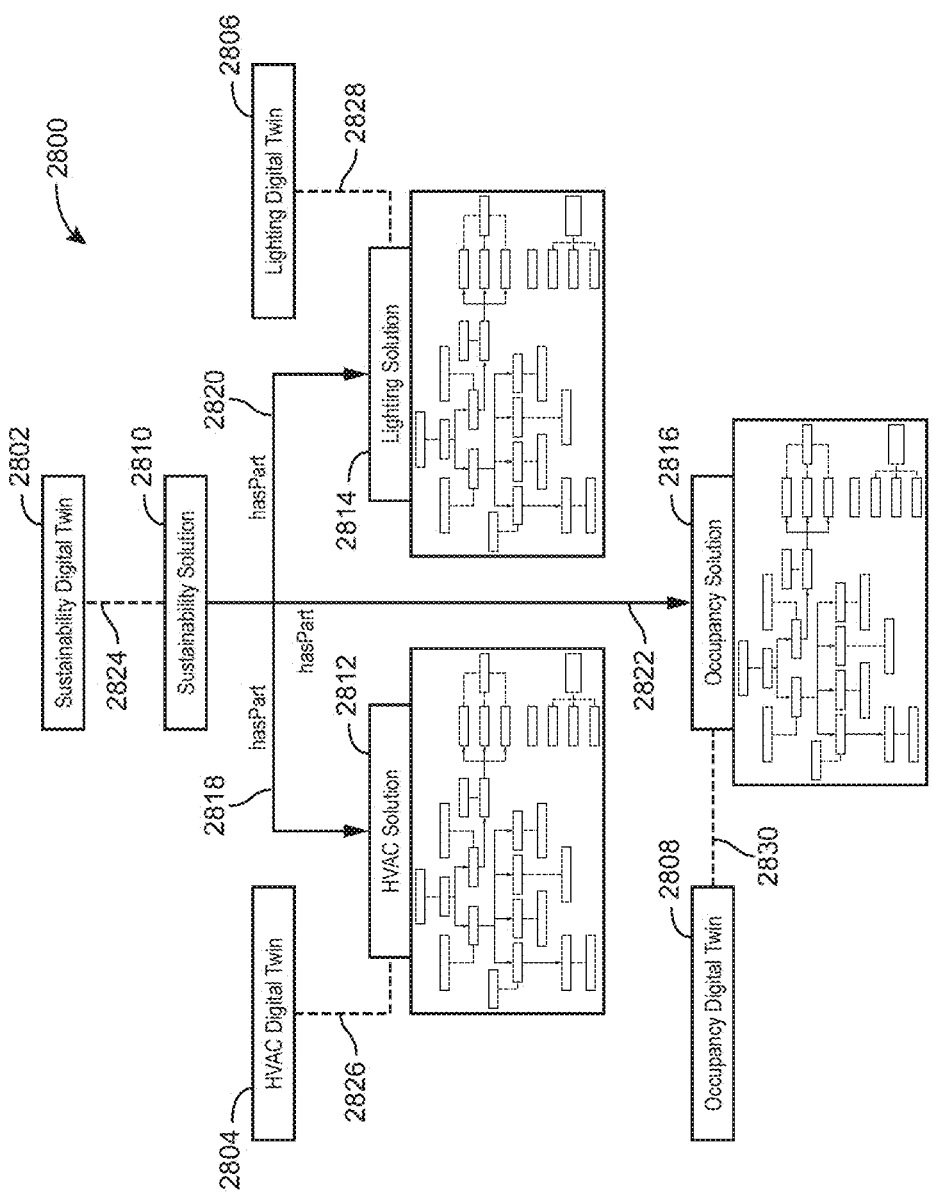
FIG. 28 is a block diagram of solution digital twins, according to an exemplary embodiment.

Referring now to FIG. 28, a block diagram 2800 of solution digital twins 2810-2816 is shown, according to an exemplary embodiment. In some embodiments, digital twins can be combined in an ad-hoc manner to form a digital twin that provides actions that meet a goal of a particular building solution. The digital twins can be combined in an ad hoc manner where related and/or unrelated digital twins (e.g., where there may be various degrees of separation away from each other in the building graph 2400) can be collectively defined as a solution twin serving a purpose or providing a business value. The solution may be an occupancy solution 2816 for tracking occupancy, a lighting solution 2814 for operating light systems of a building, an HVAC solution 2812 for operating HVAC equipment, a sustainability solution 2810 for building sustainability, etc. The solution could be facility management, in some embodiments. In some embodiments, a solution twin could be an economizer digital twin that users underlying digital twins for sensors, actuators, etc. to implement an economizer solution.

The solution twin could be an asset tracking twin, geolocation twin, occupancy tracking twin, infectious disease contact tracing twin, etc. In some embodiments, contact tracing could be performed by a contact tracing digital twin. The contact tracing digital twin could make contact tracing inferences based on asset tracking determinations of an asset tracking digital twin, occupancy tracking of an occupancy tracking digital twin, etc. Contact tracing is described in U.S. patent application Ser. No. 17/220,795 filed Apr. 1, 2021, the entirety of which is incorporated by reference herein. In some embodiments, a geolocation tracking digital twin could perform occupant tracking for a particular geolocation of a building. In some embodiments, an occupant tracing digital twin could receive data from various tracking systems, e.g., a Wi-Fi tracking system, a Bluetooth beacon system, a 5G tracking system, etc. The twin could identify which tracking system is most reliable for each scenario and select between the data of the various tracking systems to make occupant tracking determinations. The occupant tracking twin could identify unexpected occupant changes. For example, the speed at which occupancy is changing.

In some embodiments, the solution twin is an outside environment twin that collects data from various systems within a building, outside a building, ambient light, weather prediction systems, outdoor sensors, etc. to determine outdoor environments. Determinations from the outside environment twin can be fed to other twins, in some embodiments. The twin can, in some embodiments, identify whether weather conditions or normal or should be an alarm, e.g., whether it is normal for a particular side of the building to have high temperature based on sunlight. In some embodiments, the twin can select between conflicting temperature measurements, e.g., one temperature sensor that light is shining on might be extremely high and conflict with another temperature sensor not in direct sunlight.

In some embodiments, each solution includes a solution digital twin formed from lower level digital twins. For example, the occupancy solution 2816 can include an occupancy digital twin 2808. In response to identifying that a digital twin for the occupancy solution 2816 should be generated, the twin manager 108 can identify all entities of the building graph 2400 that generate occupancy related data and combine the digital twins for the entities (e.g., either new generated digital twins or existing digital twins) into a single occupancy digital twin 2808, e.g., with inheritance as described in FIGS. 24-27B. Similarly, in response to identifying that a digital twin for the HVAC solution 2812 should be generated, the twin manager 108 can identify all entities of the building graph 2400 that manage HVAC systems and combine the digital twins for the entities (e.g., either new generated digital twins or existing digital twins) into a single HVAC digital twin 2804, e.g., with inheritance as described in FIGS. 24-27B. Furthermore, in response to identifying that a digital twin for the lighting solution 2814 should be generated, the twin manager 108 can identify all entities of the building graph 2400 that manage lighting systems and combine the digital twins for the entities (e.g., either new generated digital twins or existing digital twins) into a single lighting digital twin 2806, e.g., with inheritance as described in FIGS. 24-27B.

In some embodiments, one solution may be a higher level solution than other solutions. For example, one solution may combine multiple different solutions together. For example, the sustainability solution 2810 may include the HVAC solution 2826, the occupancy solution 2816, and the lighting solution 2814. In some embodiments, each of the solutions 2810-2814 may be nodes within a graph, e.g., the building graph 2400. Edges may relate the various solutions 2810-2814, e.g., the "hasPart" edges 2818-2822. These edges may, in some embodiments, be inferred by the twin manager 108 and/or input by a user via the user device 176.

In some embodiments, based on the dependencies between the solutions, the twin manager 108 can identify that the twins 2804-2808 should be ordered in a hierarchy similar to the hierarchy of the solutions. Based on the hierarchical ordering of the twins 2804-2808, the twin manager 108 can generate a high level solution twin that inherits lower level attributes, triggers, and/or actions, in some embodiments.

Figure 29A:
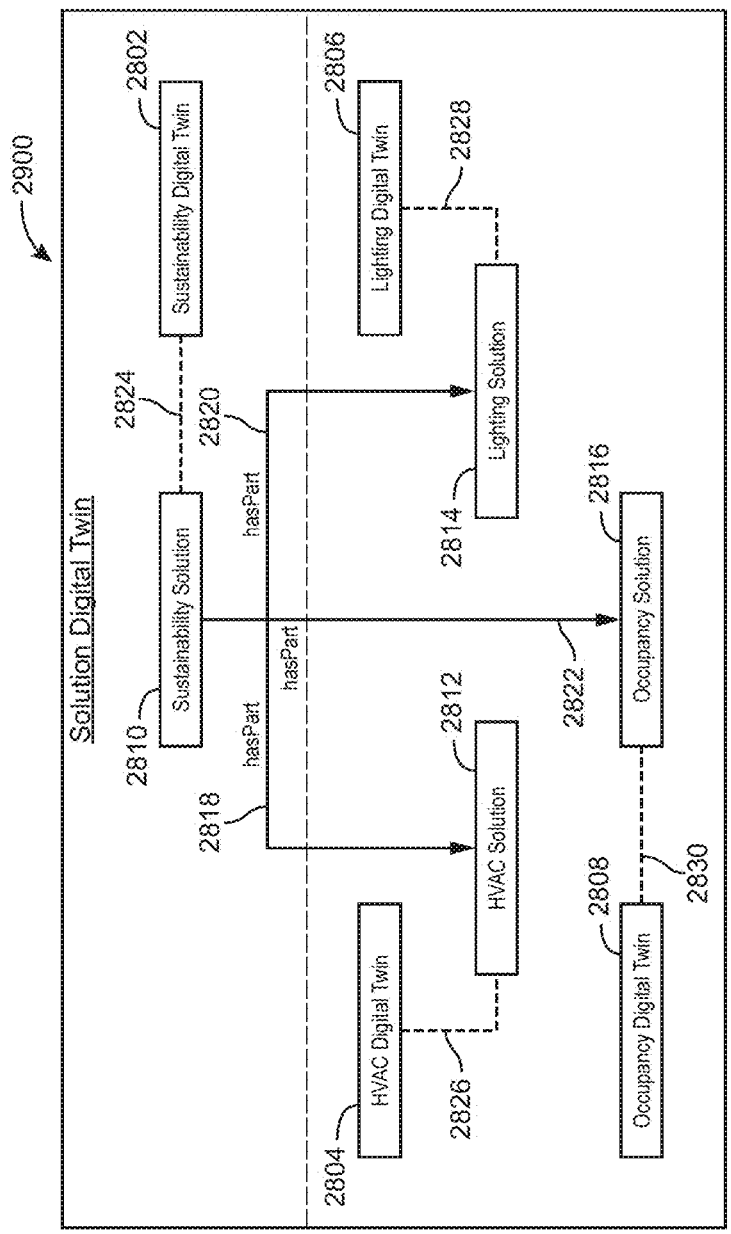
FIG. 29A is table indicating a hierarchy of the digital twins of FIG. 28, according to an exemplary embodiment.

Referring now to FIG. 29A, a table 2900 indicating a hierarchy of the digital twins 2802-2808 of FIG. 28 is shown, according to an exemplary embodiment. The table 2900 organizes the digital twins 2802-2808 in a hierarchy of dependencies, e.g., the sustainability digital twin 2802 is a higher level digital twin while the HVAC digital twin 2804, the occupancy digital twin 2808, and the lighting digital twin 2806 are lower level digital twins. The twin manager 108 can identify, that the sustainability solution 2810 is a particular objective aimed at reducing carbon emissions for a building, improving a sustainability score, driving the building towards net zero emissions production, etc.

The twin manager 108 can identify (or generate) other digital twins that generate information for other solutions that handle lower level objectives that are needed to accomplish the sustainability objective. For example, the twin manager 108 can identify that for the sustainability digital twin 2802 to meet a sustainability objective, the sustainability digital twin needs to be aware of occupancy data and have control over HVAC and lighting systems. Therefore, the twin manager 108 can group the HVAC solution 2812, the lighting solution 2814, and the occupancy solution 2816 (and the corresponding digital twins 2804, 2808, and 2806) under the sustainability solution 2810 (and the corresponding sustainability digital twin 2802).

Referring now to FIG. 29B, a table 2950 indicating attributes, inherited attributes, triggers, and actions for the digital twins 2802-2808 is shown, according to an exemplary embodiment. The table 2950 indicates attributes 2952, inherited attributes 2954, triggers 2956, and actions 2958, for the sustainability digital twin 2802, the HVAC digital twin 2804, the lighting digital twin 2806, and the occupancy digital twin 2808.

The HVAC digital twin 2804 can include various HVAC mode attributes. The HVAC mode could be a weekend mode, a weekday mode, a cooling mode, a heating mode, an energy reduction mode, etc. The lighting digital twin 2806 can include various lighting mode attributes. The mode could be lighting on or off (or at a particular level) in various lighting zones. The occupancy digital twin 2808 could include various occupancy mode attributes. The attributes could be a weekend mode, a weekday mode, an inside work hours mode, an outside work hours mode, a predicted occupancy level for a future time, a current occupancy level, etc. Furthermore, each of the digital twins 2804-2808 can include attributes inherited from underlying digital twins. For example, the HVAC digital twin 2804 could inherit various setpoints and/or sensor measurements of underlying VAV digital twins and/or damper digital twins. The lighting digital twin 2806 could include control points of various lighting digital twins, each for a particular light system, to control various lights on or off, hue points to control the hue of various lights, intensity points to control the intensity of various lights, etc. Furthermore the occupancy digital twin 2808 can include various inherited attributes such as passive infrared (PIR) sensor measurements of a PIR sensor digital twin, building entry counts of an access control digital twin for an access control system, occupant counts of a surveillance system digital twin of a surveillance system, etc.

The digital twins 2804-2808 can include various triggers and actions. For example, the HVAC digital twin 2804 can include an HVAC trigger indicating to trigger a setpoint change action responsive to detecting changes in occupancy level, outdoor air temperature, calendar day, day of week, etc. The lighting digital twin 2806 can include various triggers and actions. For example, a trigger could be receiving a command event from an application for light control and performing an action to control a lighting system based on the command event. The trigger could be a particular time of day and responsive to the time of day being reached, an action occurring that turns lighting on or off. In some embodiments, the trigger could be based on schedule data of a schedule system. In some embodiments, a trigger may cause an action to turn lights on ten minutes before a scheduled meeting or turn lights off ten minutes after the scheduled meeting.

The sustainability digital twin 2802 can include attributes including a sustainability score and a sustainability mode. The score could be a value indicating carbon emissions, energy consumption, level of carbon neutrality, etc. In some embodiments, the score could be a value combining one or multiple sustainability factors. The sustainability digital twin 2802 includes a sustainability mode. The mode can indicate to consume energy from a particular source, e.g., an electricity grid, solar panels, a battery reserve system, a hydroelectric system, operate with reduced environmental heating or cooling, etc. The sustainability digital twin 2802 can further inherit the attributes of the digital twins 2804-2808 based on the hierarchy of the sustainability digital twin 2802 being a higher level twin than the digital twins 2804-2808, in some embodiments. In some embodiments, the sustainability digital twin 2802 could run an emissions model based on HVAC operations, lighting operations, occupancy levels, etc. indicated by the twins 2804-2808.

In some embodiments, the trigger(s) of the sustainability digital twin 2802 can indicate a trigger based on the sustainability score and/or the sustainability mode. If the sustainability score is greater than, less than, equal to, or not equal to a particular value, a particular action could be triggered (e.g., reducing lighting intensity to reduce energy consumption, precooling a building to save energy, increasing heating to increase occupant comfort, etc.). Various logical comparisons and/or functions can be included by the sustainability digital twin 2802 that include the sustainability score, the sustainability mode, the various attributes of the twins 2804-2808, various constants, etc. Furthermore, the sustainability digital twin 2802 can inherit the triggers of the various digital twins 2804-2808.

In some embodiments, the triggers of the sustainability digital twin 2802 can cause an action to occur, e.g., changing the sustainability mode. In some embodiments, other actions could be inherited, e.g., actions of the digital twins 2804-2808. For example, if a sustainability score is below a particular value, to improve the sustainability score, an energy reduction sustainability more could be entered which causes an HVAC action that reduces energy consumption to be triggered.

Figure 30:
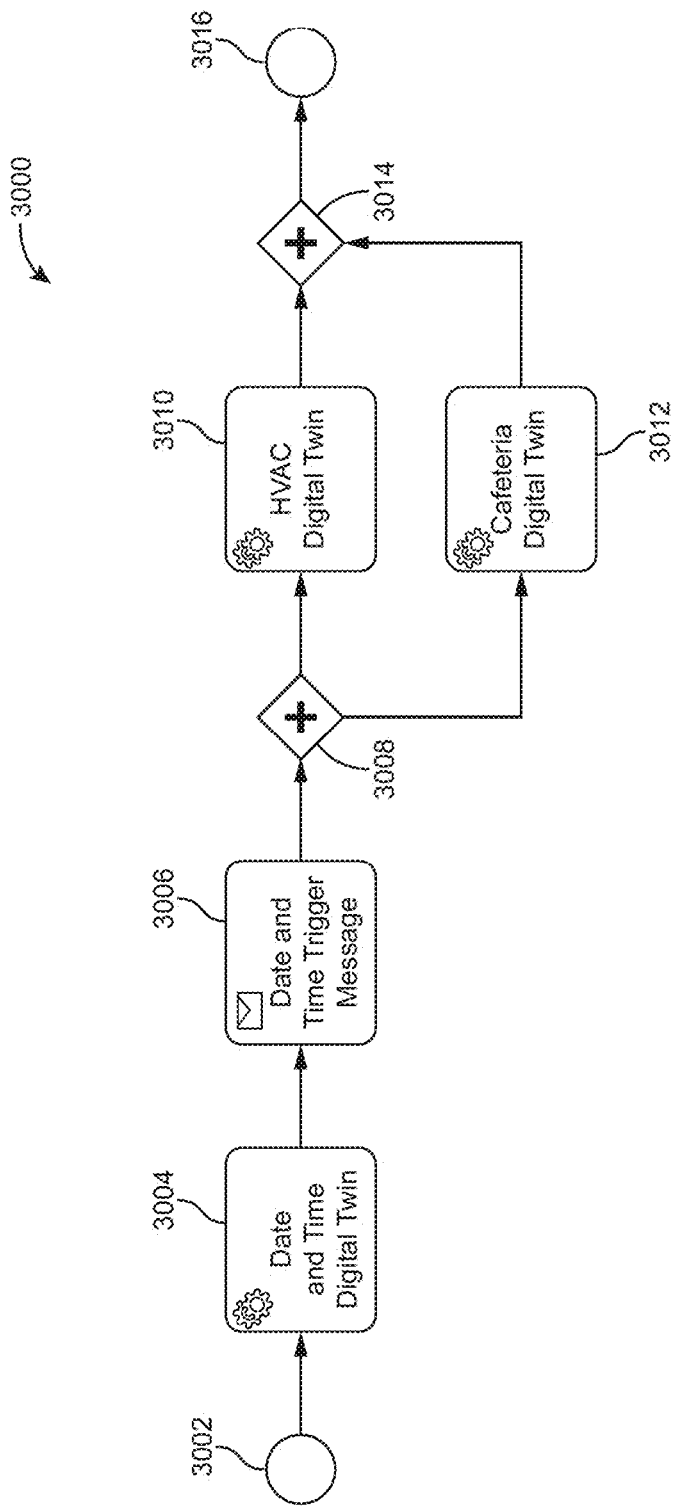
FIG. 30 is a schematic diagram of user interface elements of a user interface for constructing a high level digital twin based on user input, according to an exemplary embodiment.

Referring now to FIG. 30, user interface elements 3002-3012 of a user interface 3000 for constructing a high level digital twin based on user input is shown, according to an exemplary embodiment. The user interface 3000 can be a user interface displayed on the user device 176. The user interface 3000 can allow a user to interact with the various elements of the user interface 3000. For example, a user can add, delete, move, order, etc. the various elements of the user interface 3000. The user input can, in some cases, define digital twins, define the triggers and/or actions of the digital twins, and/or define how the twins are interrelated (e.g., how one trigger of one twin causes an action in a different twin).

In the user interface 3000, a start element 3002 defines a logical start to the flow of the user interface 3000. The start could be a trigger of a date and time digital twin 3004, in some embodiments. The trigger could be a date or time changing, e.g., the start of a new hour, the start of a new date, a particular date and/or time occurring, etc. The date and time digital twin 3004 can be configured by the user based on the user interface 3100 shown in FIG. 31. In some embodiments, the date and time digital twin can be set for a particular start date and time and, in some cases, can repeat. The result of the date and time digital twin triggering can be a date and time trigger message 3006. The message 3006 can be configured in the user interface 3200 shown in FIG. 32. The user interface 3200 can allow a user to define a name for the message, a template, asynchronous continuations, etc.

A parallel element 3008 can indicate that the message 3006 should be provided to both an HVAC digital twin 3010 and a cafeteria digital twin 3012. The HVAC digital twin 3010 and/or the cafeteria digital twin 3012 can execute in parallel each based on the message 3006. For example, the HVAC digital twin 3010 may turn a chiller on at the particular date and/or time, in some embodiments. The cafeteria digital twin 3012 may, in some embodiments, initiate cafeteria functionality, e.g., place an order in an order system, turn lights on in the cafeteria, unlock cafeteria doors, etc. The parallel element 3014 and the end element 3016 can indicate that end of the flow define din the user interface 3000.

The HVAC digital twin 3010 can be defined in the user interface 3300 of FIG. 33. In some embodiments, the user can configure a name of the digital twin, an element template, an implementation type, a topic, a setpoint which the triggered HVAC digital twin 3010 changes temperature to (e.g., 71 degrees Fahrenheit), an indication of whether a temperature was adjusted successfully, etc. The cafeteria digital twin 3012 can be defined in the user interface 3400 of FIG. 34. The cafeteria digital twin 3012 can indicate a name of the digital twin, an element template for the digital twin, an implementation type, a topic for the cafeteria digital twin 3012, an item to be ordered responsive to the twin triggering, and a number of items to be ordered responsive to the cafeteria digital twin 3012 triggering.

Figure 35:
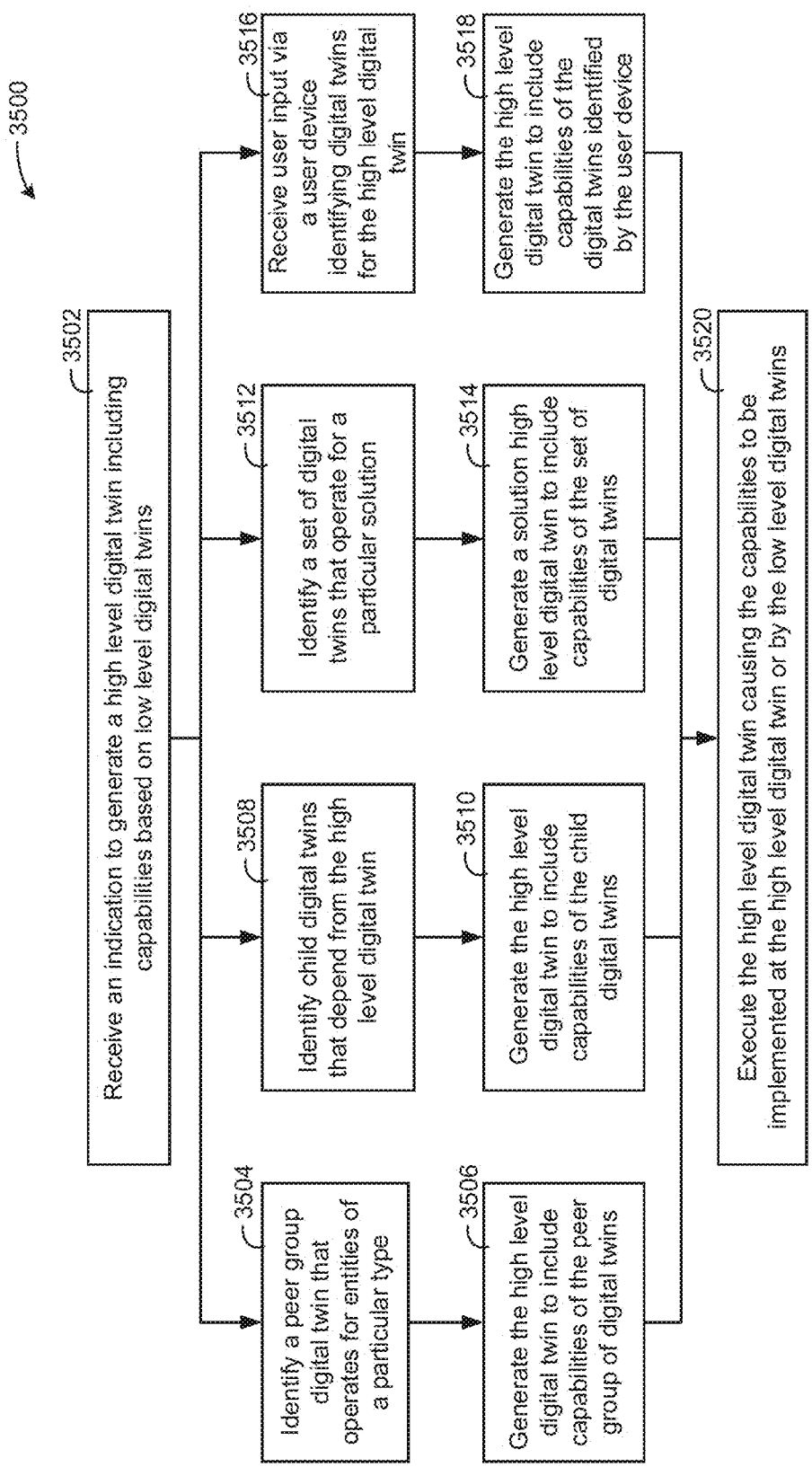
FIG. 35 is a flow diagram of a process of generating a high level digital twin, according to an exemplary embodiment.

Referring now to FIG. 35, a process 3500 of generating a high level digital twin is shown, according to an exemplary embodiment. The process 3500 can be performed by the twin manager 108 to generate high level digital twins, in some embodiments. Furthermore, any computing devices described herein can be configured to perform the process 3500. The high level digital twins generated according to the process 3500 may be based on a peer group based digital twin as discussed in FIGS. 26-27B, an inheritance based digital twin as discussed in FIGS. 24-25B, a solution twin that operates to provide a particular solution as discussed in FIGS. 28-29B, and/or may be based on user input.

In step 3502, the twin manager 108 can receive an indication to generate a high level digital twin that includes capabilities that are at least in part based on the capabilities of lower level digital twins. The indication may be a trigger to search the building graph 2400 for nodes and edges that indicate a new peer group digital twin, inheritance based digital twin, or solution digital twin should be generated. The indication may further be a request by a user (e.g., via the user device 176) and/or system that a new digital twin be generated based on a selection of a peer group, a selection of parent and child digital twins, an indication of a solution, and/or a direct identification of digital twins to be combined. In some embodiments, the indication may be an update to the building graph 2400, e.g., new nodes or edges being added to the building graph 2400. An update to the building graph 2400 may indicate that new high level digital twins should be created or existing digital twins should be adjusted.

In some embodiments, one digital twin could be generated responsive to a particular state occurring. For example, if a people counter identifiers a particular occupancy level, an overpopulation digital twin could be implemented if the occupancy level is over a particular level. In some embodiments, an under population digital twin could be implemented if the occupancy level is below a particular level.

The instantiated digital twins could be generated, e.g., according to the steps 3504-3520 or elsewhere herein to perform a particular solution for overpopulation or under population. In some embodiments, one virtual twin could update its own internal state based on its triggers and update its operation based on the state. The people counter twin could set an overpopulation or under population mode that it operates on based on people counting it performs.

In step 3504, the twin manager 108 can identify a peer group digital twin that is a digital twin for entities of a particular entity type. For example, the twin manager 108 can query the building graph 2400 based on a particular entity type, e.g., person, space, or device. In some embodiments, each identified entity of the building graph 2400 that is part of the peer group can be associated with a digital twin. The digital twin can be generated by the twin manager 108. In some embodiments, the digital twin already exists for the entities of the peer group and is selected instead. Furthermore, continuing from the above example, if the peer group digital twin is a digital twin for VAVs fed by an air handling unit, a digital twin for the air handler unit, the air handling unit digital twin 2702 can be selected as well for the peer group digital twin for the VAVs to be rolled into.

In step 3506, the twin manager 108 can generate the high level digital twin to include capabilities of the peer group digital twin identified in the step 3504. For example, the peer group digital twin may be lower level digital twin that could be combined into a higher level digital twin. In some embodiments, the high level digital twin is generated (or modified) to include all of capabilities of the peer group of digital twins. In some embodiments, the twin manager 108 may rank one or more peer groups of digital twins and/or individual digital twins and cause lower level digital twins to be absorbed into the higher level digital twin. For example, the capabilities of the variable air volume digital twin 2704, that forms a peer group for VAVs, could be rolled up into an air handling unit digital twin for an AHU that feeds air to the VAVS (as identified by the twin manager 108 from the VAV nodes 2428 and 2430 being linked to the AHU node 2422).

In step 3508, the twin manager 108 can identify child digital twins that depend from a high level digital twin. For example, the twin manager 108 could query the building graph 2400 to identify dependent entities that depend from each other and/or a higher level entity. As an example, the twin manager 108 could identify that the damper node 2438 depends from the VAV node 2428 via the edge 2480 and that the VAV node 2428 depends from the AHU node 2422 via the edge 2474. In some embodiments, the twin manager 108 could select or generate a digital twin for each entity, e.g., generate the damper digital twin 2506 for the damper, generate the variable air volume digital twin 2504 for the variable air volume, and/or the air handling unit digital twin 2502 for the air handling unit.

In step 3510, the twin manager 108 can generate the high level digital twin to include the capabilities of the child digital twins identified in the step 3508. For example, in some embodiments, a digital twin could be generated that inherits all of the capabilities of the child digital twins. For example, a parent digital twin could include the capabilities of all of the digital twins that depend from it. For example, the variable air volume digital twin 2504 could inherit the capabilities of the dependent damper digital twin 2506. These capabilities of the variable air volume digital twin 2504 and the damper digital twin 2506 could in turn be inherited into the higher level air handling unit digital twin 2502.

In step 3512, the twin manager 108 can identify a set of digital twins that operate for a particular solution. For example, the twin manager 108 could identify one or more digital twins that have capabilities, attributes, or other information that supports a particular operational goal, e.g., improving sustainability, predicting building load, etc. For example, the twin manager 108 could identify the HVAC digital twin 2804, the lighting digital twin 2806, and the occupancy digital twin 2808 that all support a sustainability solution 2810. In step 3514, the twin manager 108 can generate a solution high level digital twin to include capabilities of the child digital twins, this can form a digital twin that uses the capabilities of other digital twins to perform operations to meet a goal for a solution. For example, if the solution is sustainability, the twin manager 108 can generate the sustainability digital twin 2802 and cause the sustainability digital twin 2802 to inherit the capabilities of the lower level digital twins (which may also be solution twins), e.g., the HVAC digital twin 2804, the occupancy digital twin 2808, and the lighting digital twin 2806.

In step 3516, the twin manager 108 can receive user input via the user device 176 identifying digital twins. The selection can indicate that various digital twins and how each digital twin depends from another digital twin. In some embodiments, the user input may define peer group digital twins, parent-child dependencies between the digital twins, and/or solution based digital twins. Based on the users selections and the hierarchy which they provide for the digital twins, in step 3518, the twin manager 108 can generate the high level digital twin to include capabilities of the digital twins identified by the user device 176. The high level digital twin can, in some embodiments, inherit the capabilities of the lower level digital twins.

In step 3520, the twin manager 108 can execute the high level digital twin generated in any one of the steps 3506-3518. The execution of the high level digital twin can cause the various capabilities of the digital twins to be executed. The execution can cause capabilities of the high level digital twin to execute. The execution can further cause inherited capabilities of the high level digital twin, inherited from lower level digital twins, to execute. In some embodiments, the capabilities are performed by the high level digital twin, or alternatively pushed down to the lower level digital twins by the high level digital twins for the lower level digital twins to execute. The capabilities can be the triggers, actions, or any other functionality as described herein. The result of the execution can be generating predictions, generating inferences, deriving new information, performing environmental control of temperature, humidity, lighting, etc., operating equipment (e.g., boilers, chillers, motors, engines, pumps, etc.), etc.

Digital Twin Based Diagnostics

Figure 36:
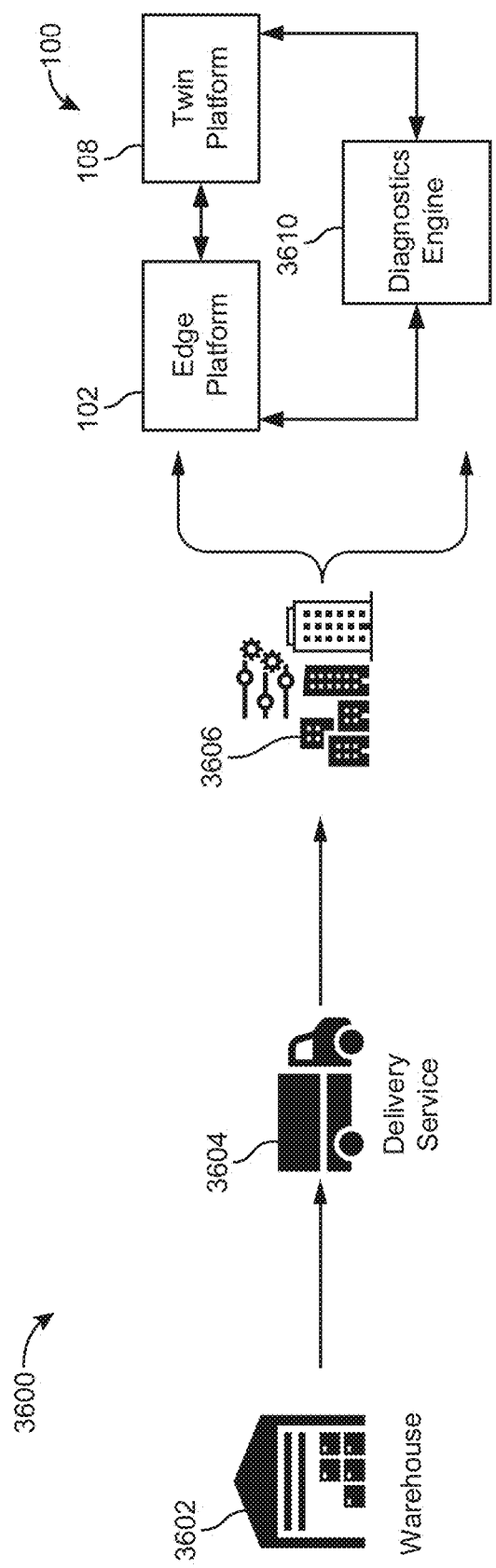
FIG. 36 is a schematic diagram illustrating deploying, installing, and connecting the piece of building equipment to the data platform of FIG. 1, according to an exemplary embodiment.

Referring now to FIG. 36, a schematic diagram 3600 of deploying, installing, and connecting a piece of building equipment in a building to the data platform 100 is shown, according to an exemplary embodiment. A piece of building equipment can be stored and/or provisioned at a warehouse 3602. The manufacturer of the piece of building equipment may define one or more operating standards for the piece of building equipment. The manufacturer may define a diagnostics message and/or routine for testing whether the piece of building equipment meets the one or more operating standards, e.g., standards that indicate whether the piece of building equipment is partially or fully functional or not. The diagnostic message and/or routine may be deployed to a diagnostics engine 3610. In some embodiments, an entity associated with the design and deployment of the diagnostics engine 3610 can define the operating standards and/or the diagnostic message and/or routine. In some embodiments, the entity may develop the diagnostics message and/or routine based on one or more operating standards for the piece of building equipment defined by the manufacturer. A diagnostic message may be a message sent to a piece of equipment that the piece of equipment responds to with diagnostic data, e.g., indications of whether the equipment is functioning or not. A diagnostic routine may be a process where one or multiple messages are sent to the piece of equipment over time and one or multiple responses are provided by the piece of building equipment. In some embodiments, the diagnostic routine may test multiple devices together, e.g., two devices testing each other, one device testing another device, etc.

The piece of building equipment can be delivered by a delivery service 3604 to a building 3608. The building 3608 may be a building that the data platform 100 is deployed for. The building data platform 100 may further include the diagnostics engine 3610 which may store and/or execute the diagnostics messages and/or routines for the building.

In some embodiments, responsive to the piece of building equipment being installed in the building 3608, the twin manager 108 can construct a building graph and/or update a building graph (e.g., the building graph of FIGS. 2-4). The building graph can represent the piece of building equipment as a node in the graph. Furthermore, the building graph can represent capabilities (e.g., capabilities to operate and/or measure data points) as nodes within the building graph. The node representing the building equipment and the node representing the capability can be connected via an edge.

In some embodiments, the diagnostics routine can define command and/or control diagnostics messages. The messages can define operations for operating the pieces of building equipment and/or related pieces of building equipment. In some embodiments, the diagnostics routine can measure conditions to determine whether the piece of building equipment is operating properly. The result of the diagnostics routine can output an indication of whether the pieces of building equipment is operating properly or not.

In some embodiments, the digital twin can traverse a building graph to automatically form a diagnostics routine. For example, the building graph might indicate that a particular room has a light and also a surveillance camera. This can be indicated by the building graph through nodes and edges relating the light, the surveillance camera, and the room together. The digital twin can either create or retrieve a diagnostics routine that generates diagnostics messages, sends the messages to the light and/or the surveillance camera, and monitors the resulting operations of the light and/or surveillance camera to verify that the light and the surveillance camera are functioning properly. The diagnostics routine can use diagnostics messages to actuate the light and check a video feed of the camera to determine whether the light is functioning properly. In some embodiments, the diagnostics routine can be automatically generated by the digital twin, received from a hardware manufacturer of the light and/or camera, and/or received from a software developer of the digital twin.

In some embodiments, the diagnostics messages and/or routines can diagnose issues with connectivity, integration, equipment functionality, etc. The digital twin can be configured to run a diagnostics message and/or routine periodically, e.g., every month, every week, outside working hours, on weekends, during unoccupied times, etc. to proactively determine whether there are any issues with building equipment. The diagnostics messages and/or routines can allow the digital twin to diagnose and issue in the building before it becomes a larger issue, occupants notice the issue, or equipment becomes damaged.

In some embodiments, the diagnostics messages can be generated by the diagnostics engine 3610 for a particular building device. The diagnostics message can be communicated from the diagnostics engine 3610 to a digital twin for the particular building device. The digital twin can handle the communication of the diagnostic messages via a connector integration to the physical building device, e.g., through the edge platform 102. In some embodiments, the diagnostics message may test a single device instead of multiple devices. In some embodiments, the diagnostics message may operate the building equipment and collect operational data and/or measure conditions to determine whether the building device is operating properly.

In some embodiments, the piece of building equipment includes one or more software components that respond in a particular manner responsive to receiving a diagnostics message. In some embodiments, the components can run one or more diagnostics processes responsive to receiving a diagnostics message. The diagnostics engine 3610 can cause a diagnostics message to be sent to the building component causing the one or more components to run the diagnosis process. The process can exercise outputs and measure inputs of the device. In some embodiments, the process can collect various fault flags or other indicators. In some embodiments, the process can analyze historical data of the building equipment to verify that the equipment is operating properly. The piece of equipment can generate a response based on the process summarizing the results of the process. The piece of equipment can communicate the response to the diagnostics engine 3610, in some embodiments.

In some embodiments, the diagnostics engine 3610 can infer performance of the building equipment based on one or more operating standards for the pieces of building equipment. In some embodiments, a manufacturer may define one or more operating requirements for the piece of building equipment. In some embodiments, the diagnostics engine 3610 can compare a current operational state of a piece of building equipment against a baseline state determined by the diagnostics engine 3610 to determine the performance.

In some embodiments, the diagnostics routines can be performed by an orchestration of multiple digital twins. For example, one digital twin for one piece of equipment can, according to a diagnostics routine, work with one or more other digital twins of other pieces of equipment to determine the operation of the one piece of equipment. For example, one digital twin could control a thermostat to adjust temperature while another digital twin of a temperature sensor could communicate with the temperature sensor to measure environmental conditions to verify that the temperature was properly adjusted. In some embodiments, the diagnostics engine 3610 can identify that multiple digital twins can work together to perform a diagnostics routine by identifying relationships between nodes representing equipment in the building graph being related together via edges. In some embodiments, the diagnostics engine 3610 uses one or more fallback mechanisms at runtime in case related digital twins are offline and/or disconnected. A digital twin may be offline and/or disconnected if the device which the digital twin exists for is offline and/or disconnected.

In some embodiments, the diagnostics engine 3610 can confirm the functionality of a piece of equipment or pieces of equipment by determining whether the diagnostics routine could be completed. In some embodiments, the diagnostics engine 3610 can confirm the functionality of a piece of equipment or pieces of equipment by analyzing one or more responses of the equipment responsive to the diagnostics routine. In some embodiments, the diagnostics process is a directed acyclic graph (DAG). The DAG includes various steps including steps that actuate the equipment and steps that read the responses from the equipment. DAGs are described in U.S. patent application Ser. No. 16/143,012 filed Sep. 26, 2018, the entirety of which is incorporated by reference herein. In some embodiment, the digital twins that perform the diagnostics processes can be executed on the edge, e.g., within one or more gateways or other devices located on premises.

Figure 37:
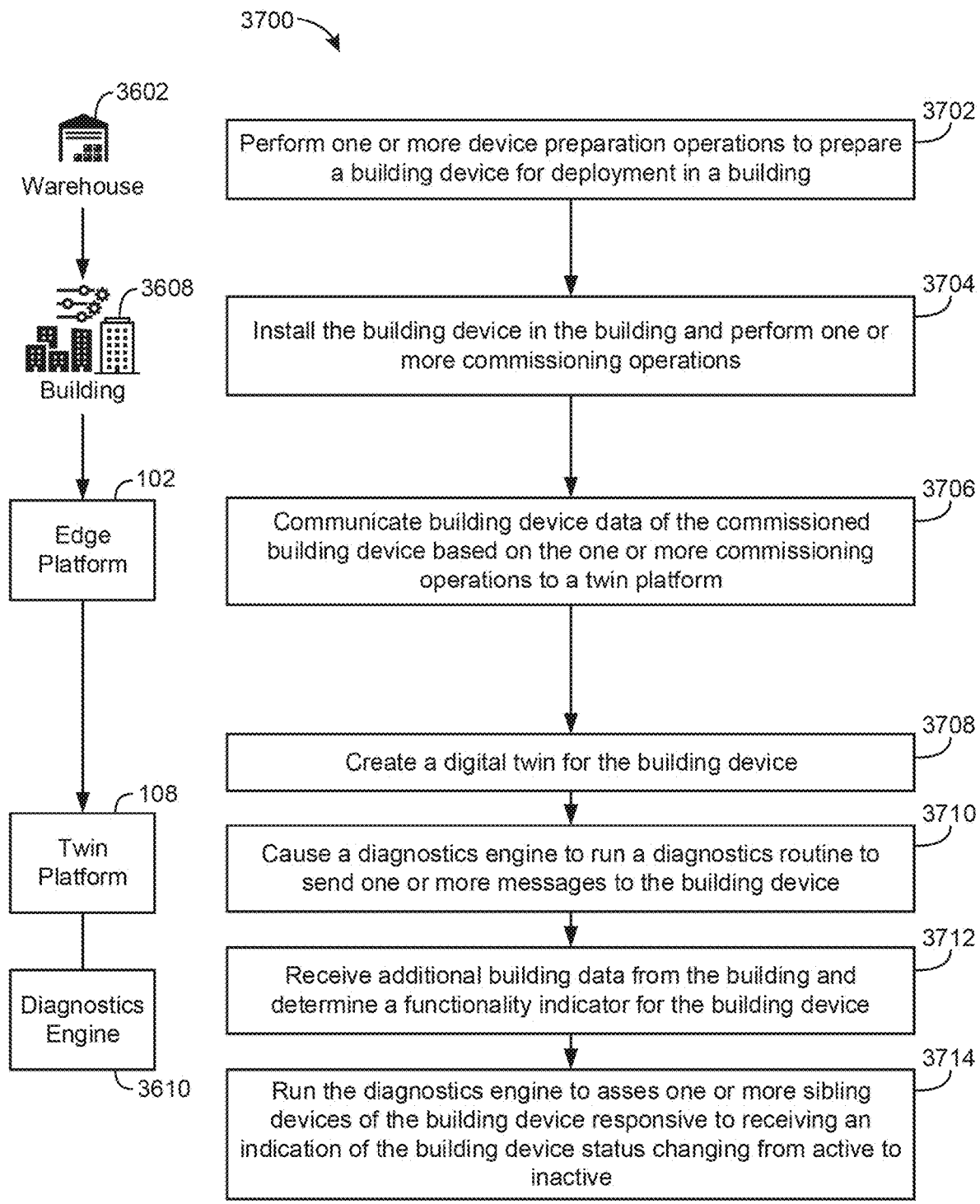
FIG. 37 is a flow diagram of a process of deployment, installation, and digital twin based diagnostics of a piece of building equipment, according to an exemplary embodiment.

Referring now to FIG. 37, a process 3700 of deployment, installation, and digital twin based diagnostics of a piece of building equipment is shown, according to an exemplary embodiment. Various entities can perform the process 3700. For example, a manufacturer, the edge platform 102, the twin manager 108, etc. can be configured to perform some and/or all of the steps of the process 3700. Furthermore, any computing device described herein can be configured to perform some and/or all of the steps of the process 3700.

In step 3702, a manufacturer and/or warehouse system can perform one or more device preparation operates to prepare a building device for deployment to a building, e.g., to be installed and commissioned at the building 3608. The building device could be a sensor, actuator, controller, etc. The building device can be any type of building device, e.g., similar or the same as the building subsystems 122. The warehouse system may give the building device a stock-keeping unit (SKU). Furthermore, the warehouse system and/or a manufacturer system could define and/or store a diagnostic routine and/or a diagnostic message format for the device. The diagnostic routine and/or the diagnostic message format can be linked to the SKU and provided to the twin manager 108.

The diagnostic message format can define a message that can be sent to the building device. The warehouse system and/or manufacturer system can configure the building device to respond with diagnostics data responsive to receiving the diagnostics message, e.g., respond with network connectivity information, the result of a self-test, fault data, etc. The diagnostics routine may define a set of diagnostics messages which may control and/or operate the building device or other building devices. The resulting operations or measurements of the building device and the other building devices to the set of diagnostics messages can be used to determine whether the building device is operating properly. The building device can be shipped from the warehouse 3602 to the building 3608.

In step 3704, the building device can be installed in the building 3608 and the device can be commissioned. In some embodiments, the commissioning is performed locally at the building device within the building 3608 with a commissioning tool. The commissioning can include running a diagnostics routine and/or using a diagnostics message for the building device. The diagnostics message and/or diagnostics routine can be defined by the manufacturer, in some embodiments. In some embodiments, the commissioning is performed by the twin manager 108 and/or the diagnostics engine 3610.

In step 3706, the building device can communicate building device data to the building data platform 100, e.g., via the edge platform 102. The building device data can be used by the twin manager 108, in step 3708 to create a digital twin for the building device. In some embodiments, the building data platform 100 runs a discovery process to discover and create one or more representations of the building device in the digital twin. For example, the edge platform 102 and/or the twin manager 108 could analyze the building data to identify one or more nodes, edges, and/or properties to add to a building graph to represent the building device. Device discovery is described in greater detail in U.S. patent application Ser. No. 17/134,659 filed Dec. 28, 2020 (now U.S. Pat. No. 11,150,617), the entirety of which is incorporated by reference herein.

The edge platform 102 can generate the digital twin to include indications of device states for the building device, e.g., nodes related to a node representing the building device representing the states of the device. The device states can indicate network connectivity, discovery status, configuration status, classification, capabilities, etc. The edge platform 102 can be configured to add an unclassified digital twin representing the building device and onboard the building device to the diagnostics engine 3610. The unclassified digital twin can be marked as new and the twin manager 108 can create a unique identity for the unclassified digital twin, e.g., the SKU of the building device or another identifier.

The edge platform 102 can configure the digital twin with information such as capabilities, device metadata (e.g., manufacturer, location, etc.), and/or any other information. The information used to configure the digital twin can be received directly from the building device, in some embodiments. The edge platform 102 could query the building device for information stored by the building device and receive the information from the building device. In some embodiments, the edge platform 102 can be configured to classify the building device according to various tags, e.g., BRICK or another schema. The edge platform 102 can send the digital twin (or the data for the digital twin) to the twin manager 108. The edge platform 102 can also register the building device with the diagnostics engine 3610.

In step 3708, the twin manager 108 can create a digital twin for the building device. In some embodiments, the twin manager 108 can add one or more nodes to a building graph representing the building device. The created digital twin can include metadata describing the building device which is accessible by a digital twin via one or more interfaces, e.g., APIs. Furthermore, the twin manager 108 can synchronize telemetry data with the digital twin. The twin may further have accessibility to the capabilities of the building device via the digital twin.

In step 3710, the diagnostics engine 3610 can run a diagnostics routine to check the operation of the building devices. In some embodiments, the diagnostics routine is stored by the diagnostics engine 3610. In some embodiments, the diagnostics routine can be received from a manufacturer. The diagnostics engine 3610 can query a building graph to identify sibling digital twins of the digital twin representing the building device. Furthermore, the diagnostics engine 3610 can implement a database of diagnostics routines. The diagnostics engine 3610 can query the database of diagnostics routines with an indication of the piece of building equipment and the sibling devices to identify a diagnostics routine that is applicable for the piece of building equipment that utilizes the sibling devices. In some embodiments, the diagnostics routine causes the building device and/or the sibling building devices to implement commands and/or measure conditions.

In step 3712, the diagnostics engine 1610 can receive additional building data from the building device and/or the sibling building devices. The diagnostics engine 3610 can analyze the additional building data based on the diagnostics routine to determine a functionality indicator for the building device. The first time the diagnostics routine is run, the diagnostics engine may store the functionality indicator as a baseline and measure equipment degradation by comparing additional functionality indicators determined at future times against the baseline functionality indicator. In some embodiments, the diagnostics engine 3610 can run multiple different diagnostics routines consecutively and determine which diagnostics routines are applicable for testing the building device.

In some cases, if the diagnostics routine uses a sibling device as part of the diagnostics routine, the diagnostics engine 1610 can monitor whether the sibling devices are deleted or new sibling devices are added. When new devices are added or deleted, diagnostics routines for the devices may no longer be appropriate or better diagnostics routines may be available for the devices. In some embodiments, each digital twin is linked, e.g., via an edge to a node representing the diagnostics routine for the device represented by the digital twin. The diagnostics engine 3610 can identify new diagnostics routines for the building devices responsive to the addition or modification of the devices of the building and update the nodes linked to the building device digital twin responsive to selecting a new diagnostics routine for the building device.

In step 3714, the diagnostics engine 1610 can run to assess one or more sibling devices of the building device responsive to receiving an indication of the building device status changing from active to inactive. In some cases, the building device may be de-commissioned (e.g., the digital twin of the building device is deleted from a building graph), replaced (e.g., the device is changed), non-operational, etc. In some embodiments, applicable routines for the sibling devices may be reassessed to determine whether a diagnostics routine for the sibling device is still applicable even though the building device is inactive. The diagnostics engine 3610 can determine that a diagnostics routine for a sibling device relies on the operation of the building device. The diagnostics engine 3610 can assign a new diagnostics routine to the sibling device that does not utilize the operation of the building device.

Figure 38:
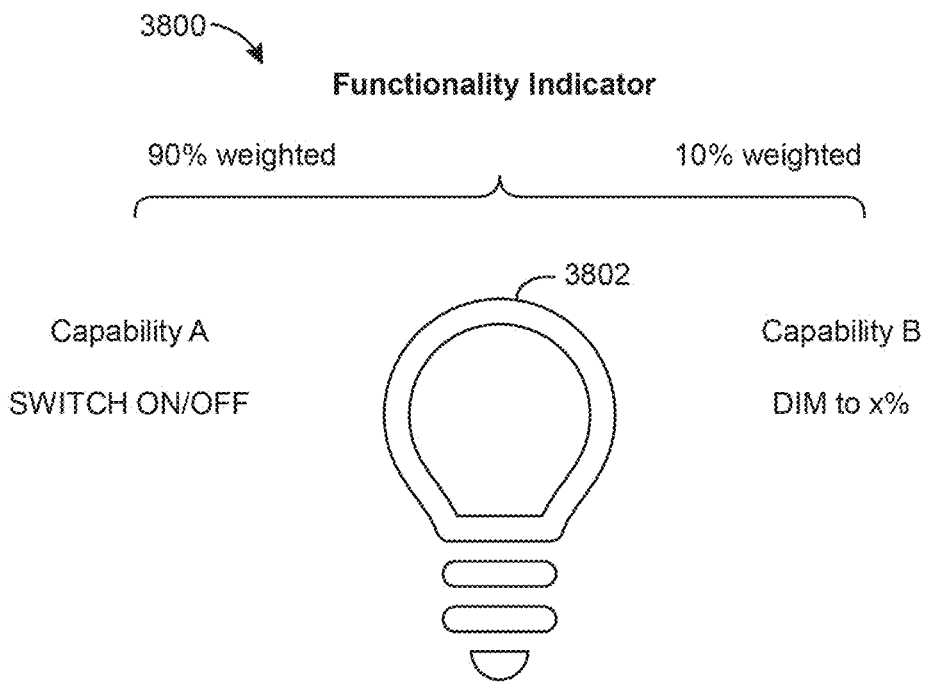
FIG. 38 is a schematic diagram of a lighting device of a building including a functionality indicator that can be generated based on a digital twin, according to an exemplary embodiment.

Referring now to FIG. 38, a lighting device 3800 of a building including a functionality indicator that can be generated based on a digital twin, according to an exemplary embodiment. The lighting device 3800 includes one or more controllers, network communication modules, etc. A digital twin of the lighting device 3800 can communicate with the lighting device 3800 and send the lighting device 3800 a diagnostics message that causes the lighting device 3800 to test the capabilities of the lighting device 3800, for example tests the switch and/or dimming abilities of the lighting device 3800. In some embodiments, the digital twin can run a diagnostics process that tests the capabilities of the lighting device 3800.

In some embodiments, the digital twin can generate a functionality indicator based on the performance of the various capabilities of the lighting device 3800. The functionality indicator could be a grade, a score, a numerical value, a binary value, etc. In some embodiments, the functionality indicator is weighted. For example, the switch of the lighting device 3800 could be weighted at ninety percent while the dimming capability could be weighted at ten percent. In some embodiments, the digital twin generates a functionality indicator for each capability of the lighting device 3800. The digital twin can combine the functionality indicators into one cumulative functionality indicator.

Figure 39:
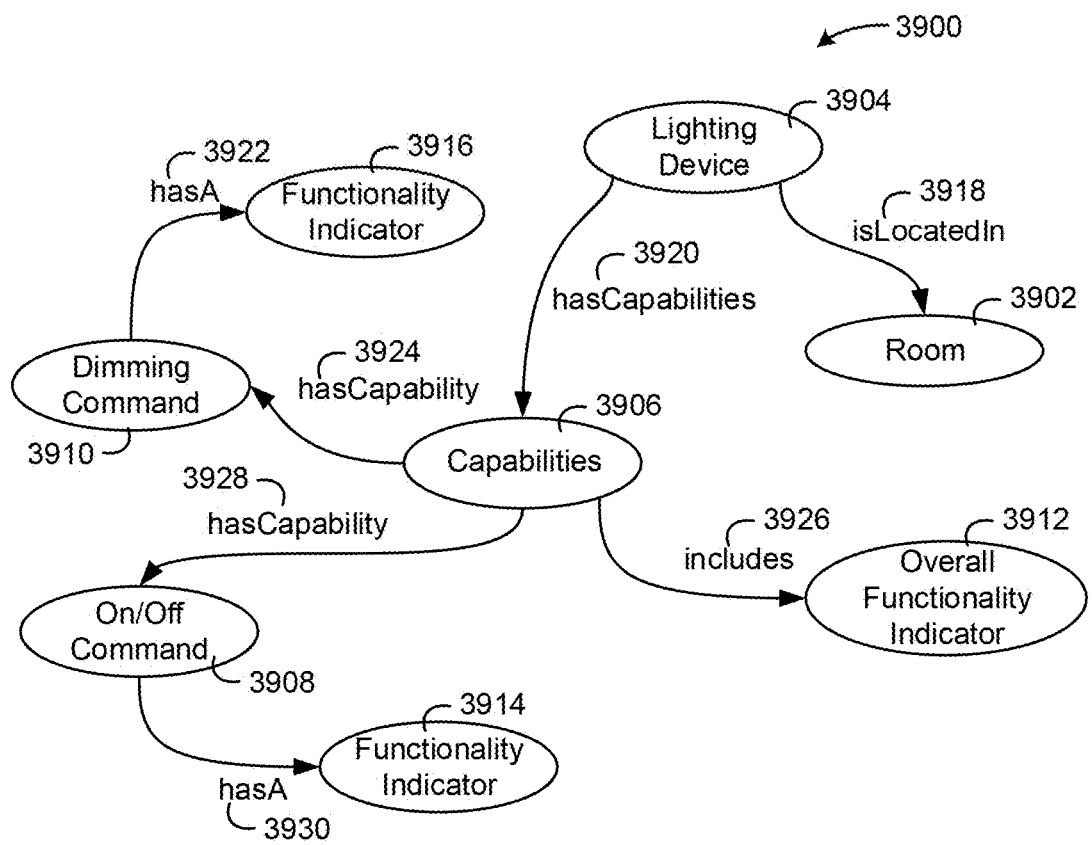
FIG. 39 is a block diagram of a building graph of a digital twin including functionality indicators for capabilities of the lighting device of FIG. 38, according to an exemplary embodiment.

Referring now to FIG. 39, a building graph 3900 of a digital twin including functionality indicators for capabilities of a piece of building equipment is shown, according to an exemplary embodiment. The building graph 3900 includes nodes 3902-3916 and edges 3918-3930 between the nodes 3902-3916. The building graph 3900 represents the lighting device 3800, the capabilities of the lighting device 3800, and/or the functionality indicators of the lighting device 3800.

The lighting device 3800 is represented by the node 3904. The lighting devices is located in a particular room, indicated by an "isLocatedIn" edge 3918 between the node 3904 and the room node 3902. The lighting device 3802 includes an overall functionality indicator node 3912 indicating an overall functionality of the lighting device 3802. This is indicated by the "includes" edge 3926 between the node 3906 and the node 3912. The node 3912 can store an overall functionality indicator or a link to the overall functionality indicator. The functionality indicator can indicate the functionality indicator of FIG. 38. The overall functionality indicator can be based on the specific functionality indicators of the capabilities of the lighting device 3800 indicated by the node 3916 and/or 3914. For example, the overall functionality indicator could be a value based on a weighted average of the specific functionality indicators. The functionality indicator could include a state, e.g., functioning or not functioning. The functionality indicator could include a confidence level of the state. The functionality indicator node 3916 can be related to the dimming command node 3910 via the "hasA" edge 3922.

The lighting device node 3904 includes various capabilities indicated by the capability node 3906 related to the lighting device 3904 via the "hasCapabilities" edge 3920 between the node 3904 and the node 3906. The capability node 3906 indicates particular capabilities, e.g., a dimming command capability indicated by node 3910 and an on/off command capability indicated by the node 3908. The nodes 3910 and 3908 are related to the capability node 3906 via the edges 3924 and 3928 respectively. The dimming command node 3910 indicates an ability of the lighting device to dim. The on/off command node 3908 indicates an ability of the lighting device to turn on and off. In some embodiments, the edge 3924 can connect the lighting device node 3904 directly to the dimming command node 3910. In some embodiments, the edge 3928 can connect the on/off command node 3908 directly to the lighting device node 3904. In some embodiments, the edge 3926 can connect the overall functionality indicator node 3912 directly to the lighting device node 3904. In some embodiments, the capability node 3906 is not included in the graph 3900.

Each capability can include a functionality indicator indicating whether the capabilities are operational, e.g., whether the lighting device 3800 can turn on or off and/or whether the lighting device 3800 can dim. The digital twin can send a diagnostic message causing the lighting device to test the dimming command and/or the on/off command. Based on a response from the lighting device 3800, the digital twin can generate a functionality indicator for each capability and store the functionality indicator, or a link to the functionality indicator, in the nodes 3916 and 3914. The digital twin can further combine the functionality indicators of the nodes 3916 and 3914 into an overall functionality indicator and store the overall functionality indicator, or a link to the overall functionality indicator, in the node 3912.

Figure 40:
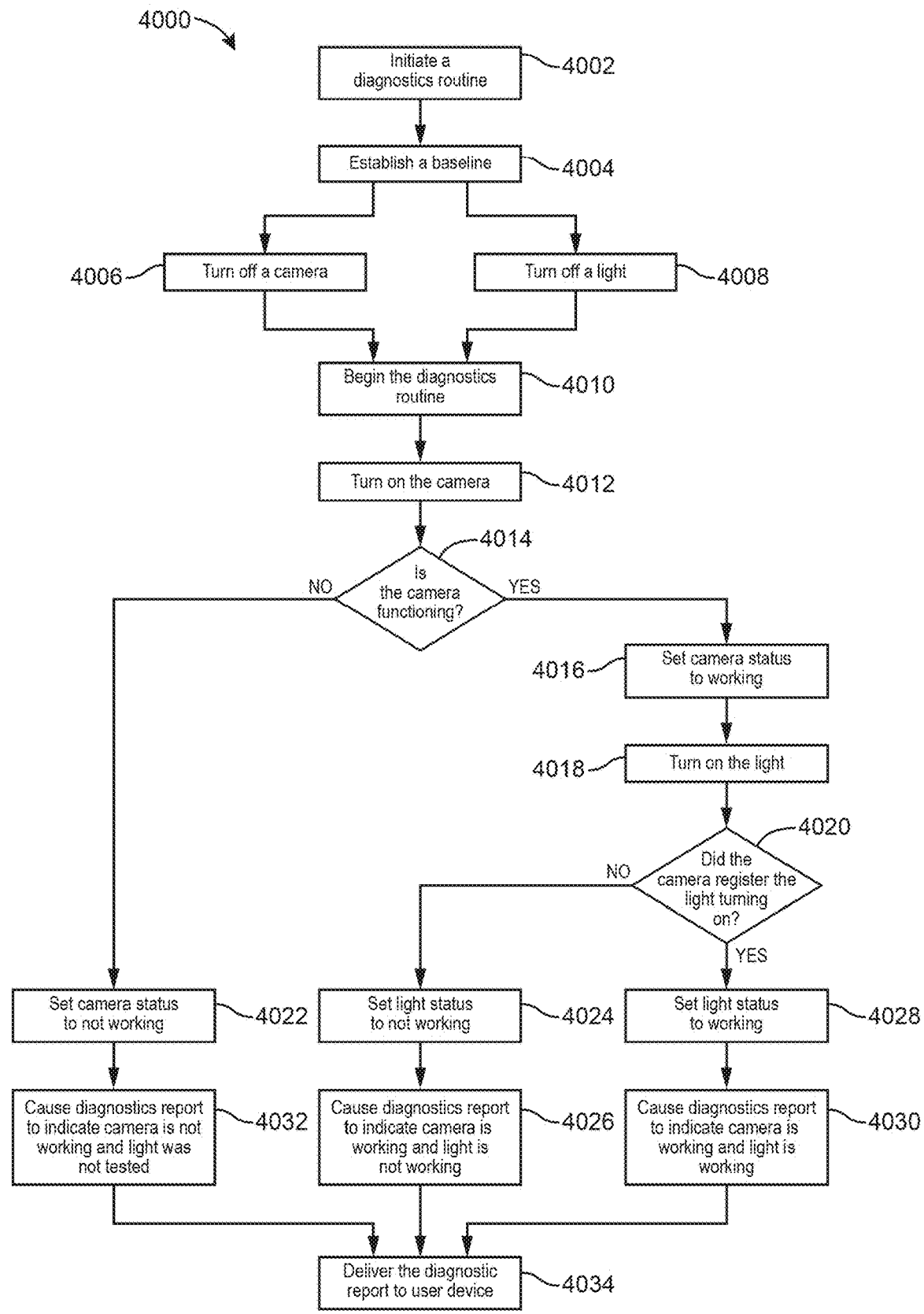
FIG. 40 is a flow diagram of a diagnostic routine executed by a digital twin to test a camera and a light of the building, according to an exemplary embodiment.

Referring now to FIG. 40, a flow diagram of a diagnostic routine 4000 executed by one or more digital twins to test a camera and a light of the building is shown, according to an exemplary embodiment. In some embodiments, a digital twin of various pieces of equipment, e.g., a digital twin of the camera and a digital twin of the light, execute the routine 4000. In some embodiments, the diagnostics engine 3610 runs the routine 4000 and sends messages to the digital twins causing the digital twins to take actions with the camera and/or the light and read feedback from the camera and/or the light. In some embodiments, the routine 4000 is a set of steps. In some embodiments, the routine 4000 is a DAG.

In some embodiments, the diagnostics routine 4000 can be executed for specific pieces of equipment that are related. For example, the diagnostics routine 4000 may be applicable for testing cameras and/or lights where a light is in a field of view of the camera or the light and the camera are located in the same room. To determine whether a particular light is in a field of view of a particular camera, the diagnostics engine 3610 could analyze a building graph and detect, based on the nodes and edges of the graph, that a particular camera has a light in its field of view. The diagnostics engine 3610 can select the digital twins associated with the identified pieces of equipment and communicate with the digital twins to cause the diagnostics routine 4000 to be implemented. In some embodiments, the building graph of FIG. 41 can be analyzed to detect relationships between cameras and lights. Furthermore, the building graph can be used to identify capabilities of the cameras and/or lights as well as functionality indicators.

In some embodiments, a camera and a light bulb located in the same area (e.g., zone, conference room, lobby area, etc.) could be tested together to verify that a particular control algorithm is operating properly. For example, a camera may automatically switch between a day mode when it is bright outside and an infrared mode when it is dark. The digital twin could operate the lights to turn on and/or off. The camera may send a message to the digital twin indicating that the current mode of the camera, e.g., day mode and infrared mode. The digital twin can verify that when the light is on, the camera switches to the day mode and when the light is off, the camera switches to the infrared mode.

In some embodiments, the camera and the light may operate together to meet an objective. For example, the camera may trigger on light changes to detect occupancy. The occupancy can be fed to control algorithms that control the environmental conditions of a space. The diagnostics routines that test the devices together make sure the objective is still being generated and is preserved. In some embodiments, the component dependencies indicated by the building graph can help track and identify failure points quicker than would be possible by other computing solutions. Furthermore, because the dependencies can be identified, fewer computational steps are required to properly test the equipment and determine whether the equipment is functioning properly.

In step 4002, the diagnostics routine 4000 can be initiated. For example, a user may prompt the diagnostics routine 4000 to execute. In some embodiments, the diagnostics routine 4000 can execute periodically, e.g., every week, every month, every two months, every quarter, every year, etc. In step 4004, a baseline for the camera and the light can be established. The baseline for the camera can be established in step 4006 by turning the camera off. The baseline for the light can be established in step 4008 by turning the light off. In some embodiments, the steps 4006 and 4008 can be performed at the same time, e.g., parallel.

In step 4010, the diagnostics routine 4000 can begin running. In step 4012, the camera can be turned back on. The diagnostics routine 4000 can determine whether the camera is functioning properly in step 4014. For example, the camera may send back a confirmation that the camera turned on properly. The camera may send back a message that no faults are present. In some embodiments, the routine 4000 can determine that the camera has not communicated any fault codes or errors and thus the camera is working. Responsive to determining that the camera is working, the routine 4000 can proceed to step 4016. Responsive to determining that the camera is not working, the routine 4000 can proceed to step 4022. In step 4022, the camera status can be set to not working. In step 4032, the diagnostics report can be generated to indicate that the camera is not working and that the light has not been tested, e.g., that the steps 4016-4030 were skipped.

In step 4016, responsive to the camera being identified as working, a status of the camera can be set to working. In step 4018, the light can be turned on. A video recording of the camera can be received and analyzed to determine whether the camera detected the light. In some embodiments, a motion detector, light detector, or other change detecting algorithm can be set in the camera and the light turning on may trigger a message and/or notification. In step 4020, the diagnostics routine 4000 can determine whether the light turned on. In step 4024, the diagnostics routine 4000 can set a light status to not working if the camera did not register the light turning on. In step 4026, the diagnostics routine 4000 can generate the diagnostics report to indicate the camera is working and the light is not working.

In step 4028, if the camera did register the light turning on, the status of the light can be set to working. In step 4030, a diagnostics report can be generated to indicate that the camera is working and the light is also working. In step 4034, the diagnostics report can be delivered to a user device. For example, the diagnostics report generated in steps 4032, 4026, and/or 4030 can be delivered to a user device. The user device may be the device of a technician, a maintenance person, a building manager, etc. In some embodiments, the user device is the user device 176.

Figure 41:
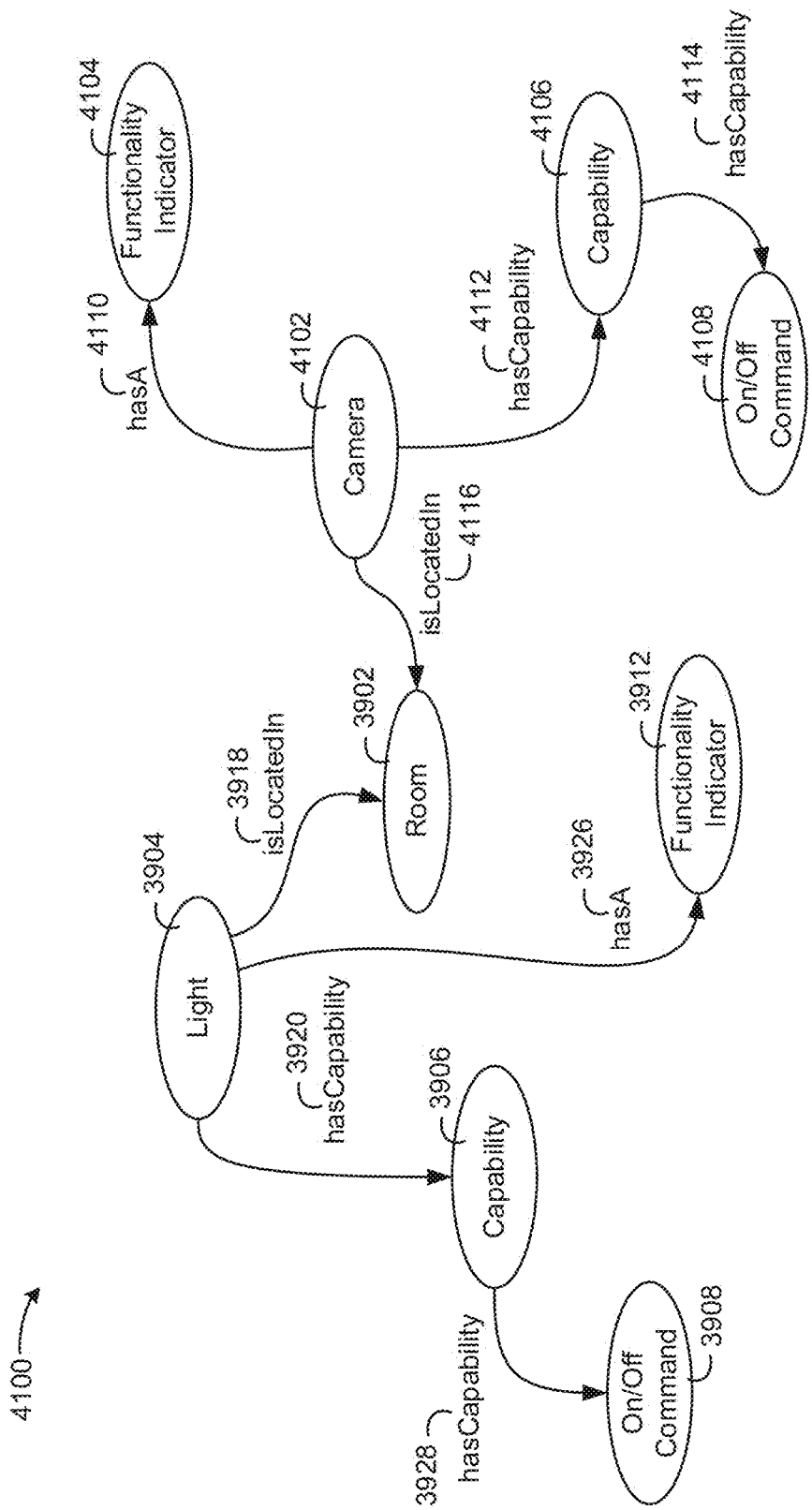
FIG. 41 is a block diagram of a building graph including representations of the camera, the light, capabilities of the camera, capabilities of the light, and functionality indicators determined based on the diagnostic routine, according to an exemplary embodiment.

Referring now to FIG. 41, a building graph 4100 including representations of the camera, the light, capabilities of the camera, capabilities of the light, and functionality indicators determined based on the diagnostic routine, according to an exemplary embodiment. The building graph 4100 includes the nodes 3902, 3904, 3906, 3908, and 3912 of FIG. 39. Furthermore, the building graph 4100 includes edges 3918, 3920, and 3928. Furthermore, the building graph 4100 includes nodes 4102-4108 and edges 4110-4116 describing a camera and the relationship of the camera to the lighting device 3802.

In some embodiments, the diagnostics engine 3610 can be configured to analyze the building graph 4100 to identify that a particular camera has a light in the field of view of the camera and that a diagnostics routine, e.g., the diagnostics routine of FIG. 40, that uses the camera and the light together to turn a test, can be executed. For example, the diagnostics engine 3610 could identify that the light is located in the same room as the camera, e.g., by identifying that the node 3904 is related to the room node 3902 by the "isLocatedIn" edge 3918 and that the camera node 4102 is related to the room node 3902 via the "isLocatedIn" edge 4116.

The camera further includes a functionality indicator node 4104 indicating a functionality of the camera. The result of the diagnostics process 4000 could be an indication that the camera is operating properly and the functionality indicator node 4104 could be updated accordingly. The camera node 4102 is related to a capability node 4106 by a "hasCapability" edge 4112 indicating that the camera has a particular capability. The capability node 4106 is related to an on/off command node 4108 via a "hasCapability" edge 4114 indicating that the camera has the capability to turn on and/or off. When the diagnostics routine 4000 of FIG. 40 is executed, the diagnostics engine 3610 and/or a digital twin of the camera and/or light could identify that the devices can perform particular actuations via the capability nodes of the graph 4100, e.g., by identifying edges between the nodes representing the equipment and the nodes representing the commands.

Figure 42:
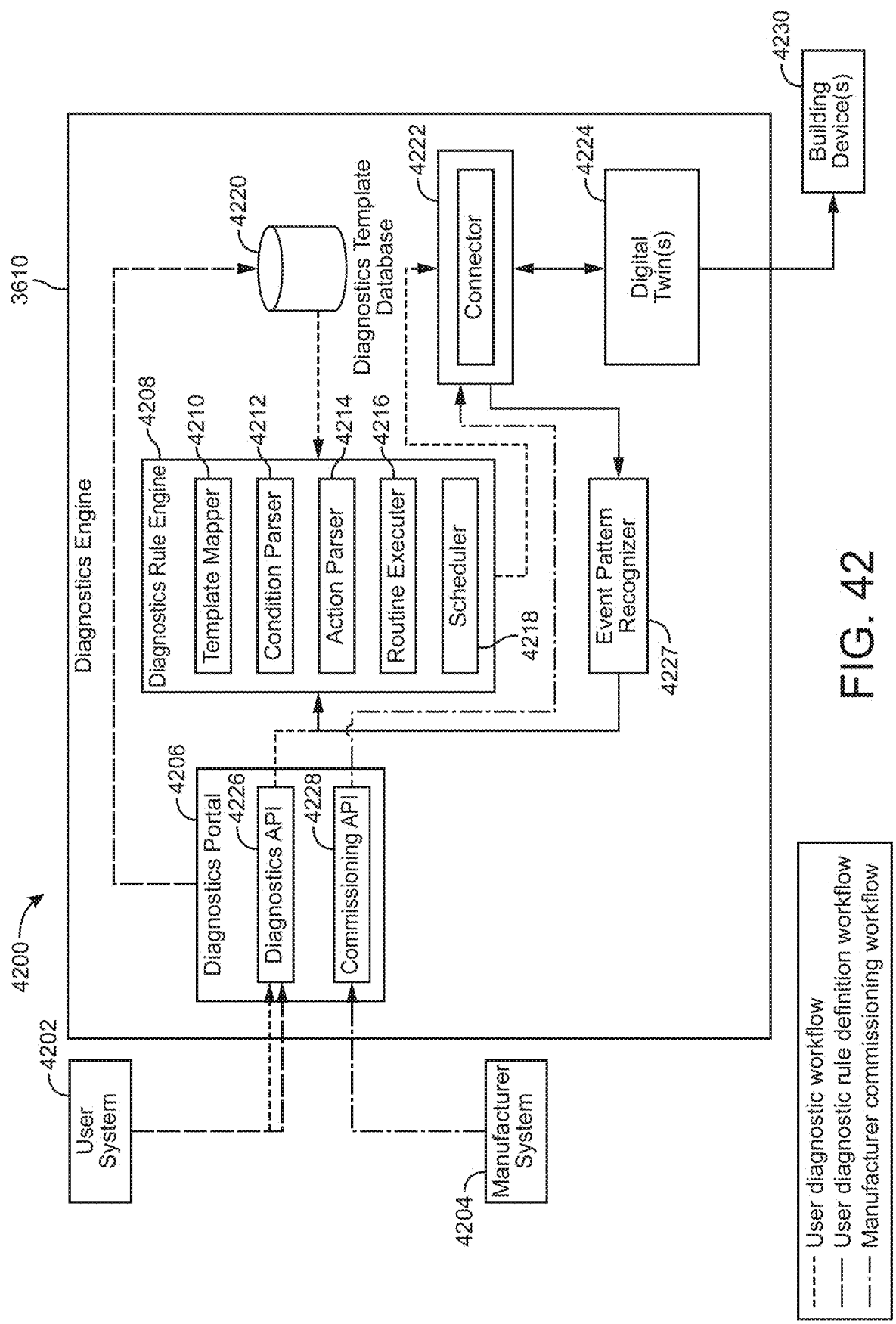
FIG. 42 is a block diagram of a diagnostics engine for running multiple diagnostics routines by a digital twin, according to an exemplary embodiment.

Referring now to FIG. 42, a system 4200 including the diagnostics engine 3610 that is configured to run diagnostics routines by a digital twin is shown, according to an exemplary embodiment. The system 4200 connects the diagnostics engine 3610 with a user system 4202 and the manufacturer system 4204. The diagnostics engine 3610 includes a diagnostics portal 4206. The diagnostics portal 4206 includes a diagnostics API 4226 and a commissioning API 4228. The diagnostics API 4226 can allow for the user system 4202 to interact with the diagnostics engine 3610. The commissioning API 4228 can allow a manufacturer system 4204 to interact with the diagnostics engine 3610.

The user system 4202 could be a system associated with a user, e.g., a laptop computer, a desktop computer, a smartphone, etc. The user system 4202 could provide diagnostics workflows and/or rule definitions for the diagnostic workflows. The user system 4202 could be or include the user device 176, in some embodiments. The user system 4202 could request the execution of a diagnostics message and/or diagnostics routine via the user system 4202 and the diagnostics API 4226.

The manufacturer system 4204 could be a system associated with a manufacturer that creates and/or provisions the building device(s) 4230. The building devices 4230 could be any type of building device, e.g., any device of the building subsystems 122 that a diagnostic can be performed for. In some embodiments, the manufacturer system 4204 with manufacturer commissioning workflows via the commissioning API 4228. In some embodiments, the commissioning API 4228 allows a manufacturer to add diagnostics templates designed by the manufacturer during a commissioning stage of the building device(s) 4230. The provided templates can be stored in the diagnostics template database 4220.

The diagnostics engine 3610 includes a diagnostics rule engine 4208. The engine 4208 can include rules for executing and/or implementing diagnostics messaging and/or diagnostics processes. The diagnostics rule engine 4208 selects and runs diagnostics routines when triggered by a schedule handled by a scheduler 4218, a graph event pattern recognized by the event pattern recognizer 4227, and/or a user request received from a user of the user system 4202.

The diagnostics rule engine 4208 includes a template mapper 4210, a condition parser 4212, an action parser 4214, a routine executor 4216, and the scheduler 4218. The template mapper 4210 can be configured to map templates to specific pieces of equipment and/or specific twins. For example, the template mapper 4210 can analyze a graph of the digital twin(s) 4224 to determine that a particular routine of the diagnostics template database 4220 is applicable for executing for one or more pieces of equipment and/or by digital twins of the pieces of equipment. The condition parser 4212 can be configured to parse and check the conditions of the diagnostics routines executed, e.g., determine whether the building device(s) 4230 are operating properly or improperly based on data received from the building device(s) 4230. The condition parser 4212 may, in some embodiments, determine functionality scores for the building device(s) 4230. The action parser can be configured to parse the diagnostics routines of the diagnostics template database 4220 and generate instructions for executing a particular action by the building device 4230, e.g., communicate an action to the digital twin 4224 via connector 4222 and cause the digital twin 4224 to execute the action. The components of the diagnostics engine 3610 can communicate with the digital twin 4224 via the connector 4222. The routine executor 4216 can be configured to retrieve diagnostics routines from the diagnostics template database 4220 and cause the routines to execute. The scheduler 4218 is configured to handle the execution of routines at a particular cadence. For example, the scheduler 4218 may store a schedule indicating that particular pieces of equipment should have specific diagnostics run at specific intervals. The result of the execution of the diagnostics routine, a report can generated and provided to the user system 4202 via the diagnostics API 4226.

In some embodiments, the diagnostics template database 4220 can store a set of templates that can be analyzed with a building graph to auto-configure diagnostics for a building. For example, for a new building, the diagnostics engine 3610 can analyze a new building graph for a new building and identify all of the templates of the diagnostics template database 4220 that are applicable for the new building and execute the new templates. In some embodiments, the diagnostics engine 3610 can be configured to analyze usage patterns in telemetry data received from the building devices 4230 to identify a usage pattern of the equipment. The usage pattern may indicate how the building devices 4230 are operated and what the expected responses of various operates are. The diagnostics engine 3610 could, in some embodiments, use one or more artificial intelligence algorithms to perform the rule analysis. The diagnostics engine 3610 could, in some embodiments, build diagnostic templates based on the identified patterns and store the identified patterns in the diagnostics template database 4220.

The event pattern recognizer 4227 can be configured to analyze the digital twin 4224, e.g., analyze the graph and/or events of the digital twin 4224. The event pattern recognizer 4227 can identify a particular pattern of events received and/or generated by the digital twin 4224. The event pattern recognizer 4227 could identify a particular pattern of nodes in a graph, e.g., identify that a camera has a light in the field of view. The event pattern recognizer 4227 includes patterns that it matches against the events and/or graph of the digital twin 4224. Based on the identified pattern, the event pattern recognizer 4227 can cause the diagnostics rule engine 4208 to execute a specific diagnostics routine for one or more specific pieces of building equipment of the building device(s) 4230. The event pattern recognizer 4227 can look for patterns and passively cause diagnostics routines to be executed.

As an example workflow, the execution of a diagnostics report could start with a user requesting, via the user system 4202, the execution of a particular diagnostics routine or a request that a particular building device 4230 has a diagnosis run. The engine 2408 can pick up the request via the diagnostics API 4226 and select a template that matches the request. The engine 4208 can cause the digital twin 4224 to run the diagnostics routine and/or one or more steps of the diagnostics routine. Based on determinations made by the routine, a diagnostics report can be generated by the engine 4208. The report can summarize the functionality of the building devices 4230 that were tested by the digital twin 4224. The report can be provided to the user system 4202 via the diagnostics API 4226.

In some embodiments, the result of a diagnostics routine and/or diagnostics message could be a functionality score for the building device(s) 4230 summarizing the functionality of the building device(s) 4230. In some embodiments, a predictive maintenance model that may include one or more machine learning and/or artificial intelligence models could execute against the functionality scores to predict times at which maintenance should be performed for the building device(s) 4230. The model predictive maintenance could consume the functionality scores for training and/or inference.

Referring now to FIG. 43, a diagnostics routine 4300 for checking the functionality of an HVAC system that can be executed by the diagnostics engine 3610 and/or the digital twin 4224 is shown, according to an exemplary embodiment. The routine 4300 may, in some embodiments, be selected and triggered by the diagnostics engine 3610. In some embodiments, the diagnostics engine 3610 can cause the digital twin 4224 to perform the diagnostics routine 4300. In some embodiments, the digital twin 4224 sends one diagnostics message (or a group of diagnostics messages) that cause the building device 4230 to execute a diagnostics process and generate a diagnostics response including the result of the diagnostics process. In some embodiments, the building device 4230 includes code that executes the diagnostics routine 4300 responsive to receiving the diagnostics message. In some embodiments, the diagnostics engine 3610 and/or the digital twin 4224 performs each step of the diagnostics routine 4300.

The diagnostics routine 4300 includes base conditions 4302. The base conditions 4302 can define relationships between a particular thermostat that the diagnostics routine 4300 is executed for and other entities. These relationships can be searched by the diagnostics engine 3610 in a building graph of the digital twin to determine whether the relationships exist and the diagnostics routine 4300 can be executed for the particular thermostat. The base conditions 4302 could be structured as queries of the building graph and use node types and/or relationship types. The base conditions 4302 could ask whether a zone contains the thermostat, whether the thermostat has a temperature sensor, and/or whether the thermostat has a setpoint. If these conditions are met, the diagnostics routine 4300 can be determined to be applicable for performing a diagnostic of the particular thermostat.

The diagnostics routine 4300 includes diagnostic conditions 4304. The diagnostic conditions 4304 include the various conditions that the thermostat may meet to be considered working properly. The conditions may be that when the temperature sensor of the thermostat measures a particular value when a setpoint is at a particular value. The conditions may include a condition that the thermostat opens a damper when the setpoint is set to a particular level. The conditions may include a condition that the damper closes when the setpoint is at a particular level. The conditions may include a condition that the flow increased when the setpoint is at a particular level. The conditions may include a condition that the flow decreases when the setpoint is at a particular level.

The diagnostics routine 4300 includes actions 4306. The actions 4306 may indicate that actions that the thermostat takes to perform the diagnostics routine 4300, e.g., adjusting a setpoint of the thermostat. In some embodiments, the diagnostics engine 3610 and/or the digital twin 4224 can determine that the thermostat has a capability to perform the action, e.g., that the thermostat has the ability to change a setpoint. In some embodiments, the diagnostics engine 3610 and/or the digital twin 4224 can be configured to query a building graph to determine whether the thermostat has the particular capability. In some embodiments, the actions can further include measuring certain conditions, e.g., determining whether a damper is open or closed, measuring a flow rate, etc. These capabilities can be included within the building graph and queried by the diagnostics engine 3610 and/or the digital twin 4224 to determine whether the thermostat has the measurement and/or read capabilities for performing the diagnostics routine 4300.

The diagnostics routine 4300 a diagnosis 4308. The diagnosis 4308 can be a summary included within a report, in some embodiments. The diagnosis 4308 can indicate that the base conditions are not met and the diagnostics were not run, e.g., the zone does not contain a thermostat, the thermostat does not include a temperature sensor, and/or the thermostat does not have a setpoint. The diagnosis 4308 could be that a particular condition was not met and a sensor or setpoint failed. The condition could be that the temperature sensor read a particular value when a setpoint is at a particular value. This condition not being met may indicate that the ability of the thermostat to adjust a setpoint or the ability of the thermostat to measure temperature via a temperature sensor are not functioning properly. The diagnosis 4308 can indicate that another condition was not met and that a damper failed to operate or that the thermostat was not able to adjust the setpoint. In some embodiments, if the damper did not open when a setpoint was adjusted, if a damper did not close when the setpoint was adjusted, if the flow did not increase when the setpoint was adjusted, and/or if the flow did not decrease when the setpoint was adjusted, the diagnostic that the damper or the setpoint adjustment failed could be selected.

Referring now to FIG. 44, a diagnostics routine 4400 for checking the functionality of an outdoor sensor that can be executed by the diagnostics engine 3610 and the digital twin 4224 is shown, according to an exemplary embodiment. The diagnostics routine 4400 can be similar to the diagnostics routine 4300 and can be executed by the diagnostics engine 3610 and/or the digital twin 4224 as described with reference to FIG. 43. The diagnostics routine 4400 includes base conditions 4402. The base conditions 4402 indicate that the outdoor sensor includes an outdoor temperature sensor and an outdoor humidity sensor. The base conditions 4402 further indicate that a weather service is present that can measure environmental conditions, e.g., temperature and/or humidity, in a geographic area that the outdoor sensor is located.

The diagnostics routine 4400 includes diagnostic conditions 4404. The diagnostic conditions 4404 can indicate that the weather temperature measured by the weather service matches the temperature measurements of the outdoor temperature sensor. The diagnostic condition 4404 can indicate that a humidity measured by the weather service matches the outdoor humidity measured by the outdoor humidity sensor. The actions 4406 may be empty since the diagnostics conditions 4404 measure conditions but does not make commands. However, in some embodiments, the actions 4406 may include read and/or measurement commands. For example, the actions 4406 could indicate the ability to read temperature and/or humidity from the outdoor sensor. The actions 4406 could indicate the ability to read temperature and/or humidity from the weather service.

The diagnostics routine 4404 includes a diagnosis 4408. The diagnosis 4408 can indicate that base conditions were not met and that no diagnostics were run. For example, the diagnostics engine 3610 and/or the digital twin 4224 could determine that the base conditions 4402 were not met. The diagnosis 4408 includes a diagnosis that there was a sensor failure if the outdoor temperature of the weather service does not match the outdoor temperature sensor measurements or that the outdoor humidity of the weather service does not match the measurements of the humidity sensor.

Referring now to FIG. 45, a diagnostics routine 4500 for checking the functionality of a camera and a light that can be executed by the diagnostics engine 3610 and the digital twin 4224 is shown, according to an exemplary embodiment. The diagnostics routine 4500 can be similar to the diagnostics routine 4300 and can be executed by the diagnostics engine 3610 and/or the digital twin 4224 as described with reference to FIG. 43. The diagnostics routine 4500 includes base conditions 4502. The base conditions 4502 indicates that a particular location includes both a camera and lights. The base conditions 4502 may require that the location include both the camera and light such that the diagnostics can be performed where the camera may detect the light turning on and/or off. The diagnostics engine 3610 and/or the digital twin 4224 can query a building graph to verify that the particular node representing a location (e.g., a zone or space) is related by edges to a node representing a camera and a node representing the lights. The corresponding camera and/or lights can be identified by the diagnostics engine 3610 and/or the digital twin 4224 for running the diagnostics routine 4500 for.

The diagnostics routine 4500 includes a diagnostic condition 4504. The diagnostic condition 4504 can indicate that the camera outputs video, that the camera lumen value is a particular value when the light is off, and the camera lumen value is a particular level when the light is on. The diagnostics routine 4500 includes actions 4506. The actions 4506 include actions to turn the camera off and/or turn the camera on. The actions 4506 includes actions to turn the lights off and/or on. In some embodiments, the diagnostics engine 3610 and/or the digital twin 4224 can query a building graph to verify that the camera and/or the lights include capabilities to turn on and/or off.

The diagnostics routine 4500 includes a diagnosis 4508. The diagnosis 4508 can indicate that the base conditions were not met and the diagnostics routine 4500 cannot be run. This diagnosis may be selected responsive to determining that the camera and/or light are not located in the same location. The diagnosis 4508 can include a diagnosis that the camera failed. The diagnosis 4508 can further include a diagnosis that the lights failed.

Figures 46, 47:
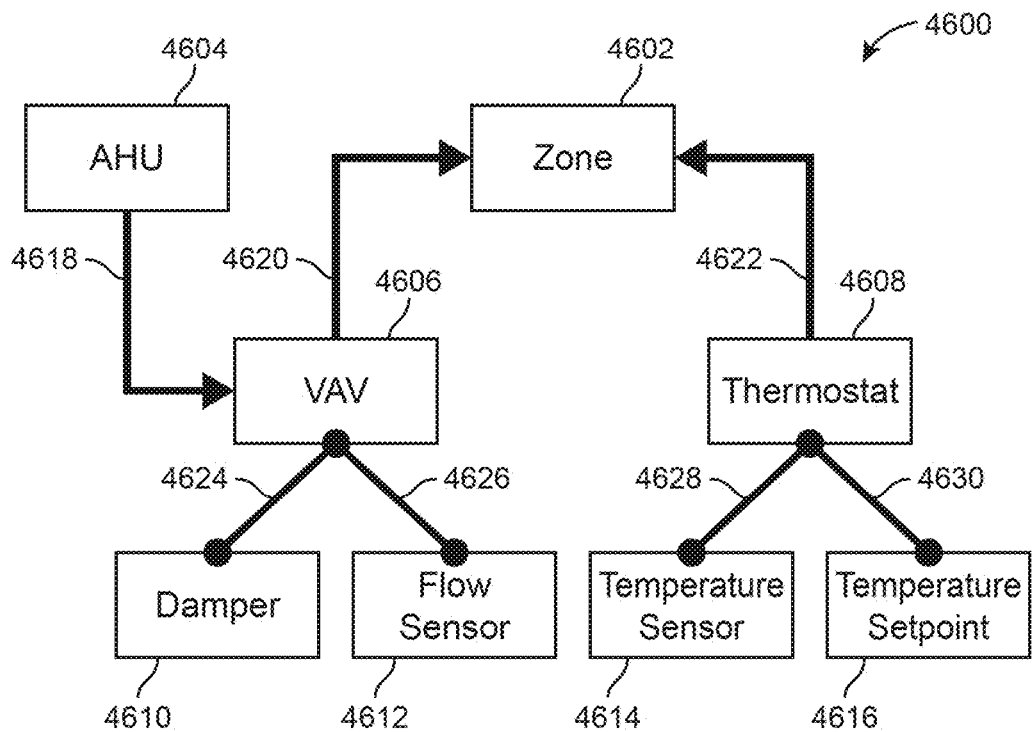
FIG. 46 is a block diagram of a building graph of a digital twin that the digital twin can use to perform diagnostics messaging, according to an exemplary embodiment.
FIG. 47 is a table of diagnostics messages implementing commands for a piece of building equipment and diagnostics responses to each command by the piece of building equipment confirming whether the building equipment is functioning properly, according to an exemplary embodiment.

Referring now to FIG. 46, a building graph 4600 of a digital twin that the digital twin can use to perform diagnostics messaging is shown, according to an exemplary embodiment. In some embodiments, a digital twin may include the building graph 4600. In some embodiments, the digital twin and the building graph 4600 are separate entities. The building graph 4600 includes nodes 4602-4616 and edges 4618-4630. The building graph 4600 includes a node 4602 representing a zone. The zone can include both a VAV and a thermostat indicated by the nodes 4606 and 4608 and the edges 4620 and 4622 between the nodes 4606 and 4608 and the node 4602. The VAV receives air from an AHU. The AHU is represented by a node 4604 which is related to the node 4606 indicating that the VAV receives air from the AHU. The VAV includes a damper and a flow sensor indicated by the nodes 4610 and 4612 being related to the node 4606 via the edges 4624 and 4626. The thermostat includes a temperature sensor and a temperature setpoint indicate by the nodes 4614 and 4616 being related to the node 4608.

Because the VAV and the thermostat are both located in the same zone, a diagnostics can be performed with the VAV and the thermostat together. The digital twin 4224 can send a diagnostic message to the thermostat. The message can indicate that the thermostat should change the setpoint to a particular value. The particular value can be selected such that the VAV would adjust the damper 4610 by a particular level. Changing the damper affects the temperature of the zone and the temperature sensor would measure the resulting temperature. Based on responses received from the VAV and/or the thermostat e.g., damper feedback data, flow measurements of the flow sensor, temperature measurements of the temperature sensor, etc.

The diagnostics engine 3610 and/or the digital twin 4224 can analyze the received information. Specific failures can be identified. For example, if the damper does not move, the damper control may be broken. If the flow measurement does not change, the flow sensor may be broken or the AHU is not supplying air. If the temperature measurement does not change, the sensor may be broken.

Referring now to FIG. 47, a table 4700 of diagnostics messages 4702 implementing commands for a piece of building equipment and diagnostics responses 4704 to each command by the piece of building equipment confirming whether the building equipment is functioning properly, according to an exemplary embodiment. The diagnostic message 4702 could be a message to lower the temperatures setpoint. The digital twin 4224 could monitor the specific diagnostic responses, e.g., monitor whether a damper opens, whether a flow measurement increases, whether a temperature measurement decreases, etc. These responses may be the expected responses and the functionality of the damper, VAV, thermostat, and/or AHU could be determined based on the responses.

Similarly, a diagnostic message 4702 could be a message to raise a temperature setpoint. The diagnostic responses 4704 could be that a damper closes, that flow measurements decrease, and/or that temperature measurement increases. The digital twin 4224 could monitor the specific diagnostic responses, e.g., monitor whether a damper closes, whether a flow measurement decreases, whether a temperature measurement increases, etc. These responses may be the expected responses and the functionality of the damper, VAV, thermostat, and/or AHU could be determined based on the responses.

In some embodiments, the diagnostic messages could be communicated regularly during standard building operation. In some embodiments, the diagnostics engine 3610 and/or the digital twin 4224 can operate lights at the beginning of the day and off at the end of the day to avoid inconveniencing occupants of the building. In some embodiments, the diagnostics engine 3610 can be configured to adjust zone temperature setpoints during occupied and/or unoccupied hours. For example, the diagnostics engine 3610 and/or the digital twin 4224 could detect that a space is unoccupied and then test the zone temperature control in the space.

In some embodiments, the diagnostics engine 3610 and/or the digital twin 4224 can run passive diagnostics. The passive diagnostics can be run based on diagnostic messages and responses sent and received as part of building control and/or operation. The diagnostic messages and/or responses can be inferred from operational data of the building control and/or operation. This can avoid diagnostic messaging while the building is operating. The diagnostics engine 3610 and/or the digital twin 4224 could recognize diagnostic messages and/or responses with a rule based analysis. For example, a rule could be checking if a setpoint changes by more than one degree for at least thirty minutes. In some embodiments, a classifier could be trained based on user selected occurrences of diagnostic messages.

The diagnostics routines and/or messaging could run in a passive mode by default and switch to an active mode based on a schedule and/or responsive to a user request. A state could be tracked for devices indicating whether the devices are operating properly or not. Furthermore, a confidence could be tracked indicating a confidence level of the estimated state. The confidence could increase as each diagnostic messages and decay over time.

Figure 48:
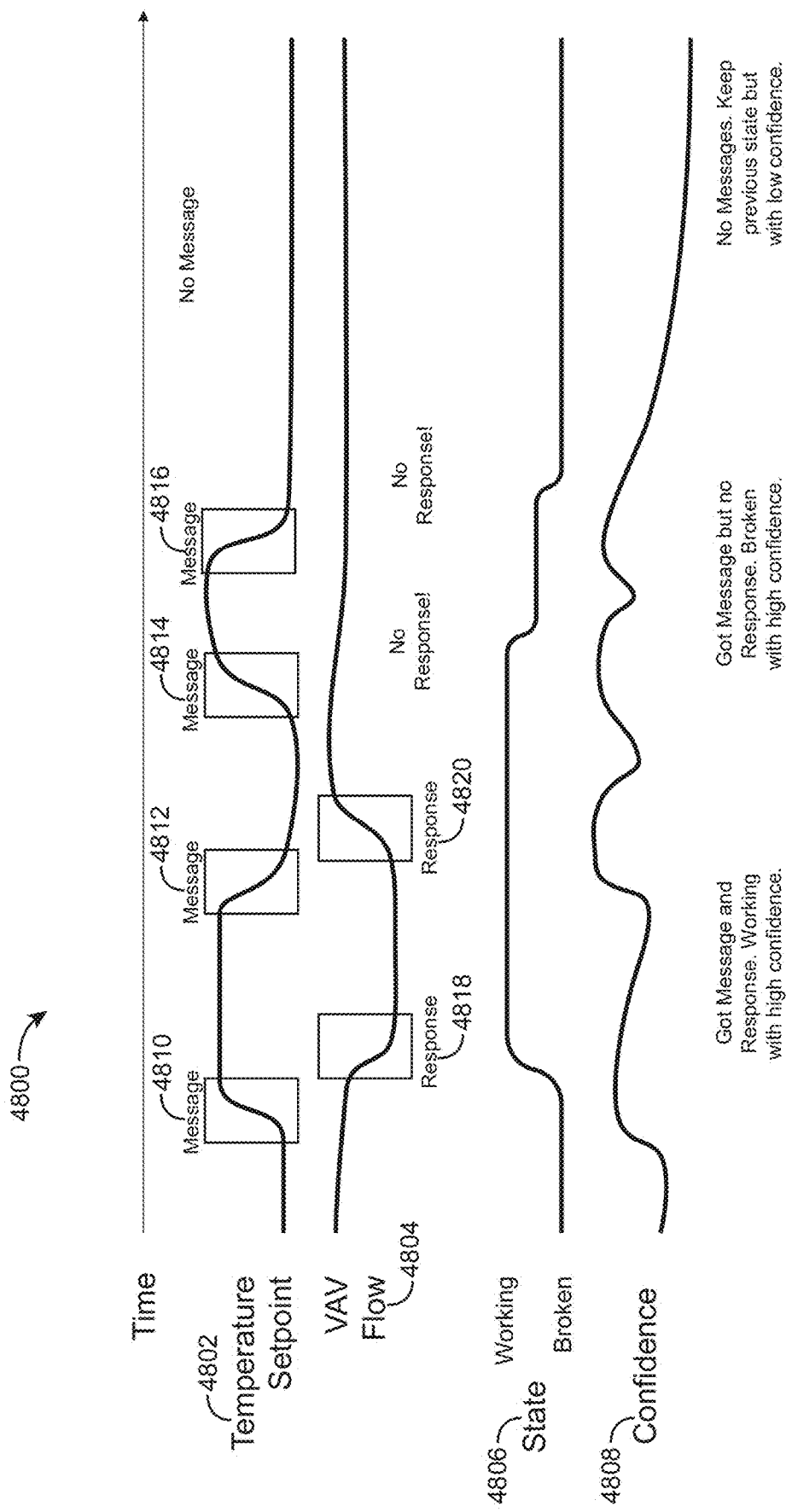
FIG. 48 is a chart indicating multiple trends of points of a piece of building equipment, diagnostics messages, diagnostics responses, a state indicator for the piece of building equipment, and a confidence indicator indicating a confidence level of the state indicator, according to an exemplary embodiment.

Referring now to FIG. 48, a chart 4800 indicating multiple trends of points of a piece of building equipment, diagnostics messages 4810-4816, diagnostics responses 4818-4820, a state indicator 4806 for the piece of building equipment, and a confidence indicator 4808 indicating a confidence level 4808 of the state indicator is shown, according to an exemplary embodiment. The chart 4800 could, in some embodiments, be a report constructed based on an analysis performed by the diagnostics engine 3610 and/or the digital twin 4224. The report could be delivered to the user device 176, in some embodiments.

The chart 4800 indicates a temperature setpoint trend 4802 and a VAV flow trend 4804. The trend 4802 indicates a trend of a setpoint for a thermostat, in some embodiments. The trend may indicate the setpoint that the thermostat control the temperature of a zone to. The setpoint may change over time based on scheduling changes, occupancy detections, etc. Furthermore, the setpoint may change based on a diagnostics message, e.g., messages 4810-4816. The diagnostic messages 4810 and 4814 may cause the setpoint to increase to a particular level. The diagnostic messages 4812-4816 may cause the setpoint to decrease to a particular level.

The chart 4800 indicates a VAV flow rate. The flow may indicate a flow of air supplied by an AHU to the zone of the thermostat. Based on the setpoint of the temperature setpoint trend 4802, the VAV may change the position of a damper to be open or closed. The position of the damper may adjust the VAV flow. In some embodiments, an increase in the temperature setpoint, e.g., message 4810 may affect the VAV flow, e.g., causing the VAV flow to decrease. The response 4818 may be a response by the VAV indicating a flow rate measured by a flow sensor of the VAV. The response 4818 may confirm that the VAV and the thermostat are operating properly. The diagnostic message 4812 may cause the VAV flow to increase. The response 4820 may be an increase to the flow rate indicating that the flow has increased, confirming that the VAV and thermostat are operating properly. A state trend 4806 can indicate working. The confidence trend 4808 can further trend the confidence that the state set is proper.

The messages 4814 and 4816, which increase and decrease the temperature setpoint respectively, may receive not receive appropriate responses from the VAV (e.g., responses that indicate that the VAV is operating properly). This may indicate that the thermostat, VAV, and/or AHU are not operating properly. The state trend 4806 can indicate that the thermostat, VAV, and/or AHU are not operating properly. Furthermore, the confidence 4808 can be decreased to indicate that there is a low confidence that the state is broken. The confidence 4808 can decrease based on a low number of responses. The confidence 4808 can be based on the number of responses received, for example, more responses can indicate greater confidence while less responses can lower the confidence.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system comprising:
one or more memory devices storing instructions thereon that, when executed by one or more processors, cause the one or more processors to:
store a digital twin comprising a building graph, the building graph comprising a plurality of nodes representing a plurality of entities of a building and a plurality of edges between the plurality of nodes representing relationships between the plurality of entities;
identify a piece of building equipment to perform a diagnostic on based on a first node of the plurality of nodes, the first node representing the piece of building equipment;
determine one or more diagnostic messages based on the building graph and communicate the one or more diagnostic messages, by the digital twin, to the piece of building equipment causing the piece of building equipment to perform one or more operations;
receive one or more diagnostic message responses from the piece of building equipment indicating the one or more operations of the piece of building equipment;
generate a value for a functionality indicator based on the one or more diagnostic messages, the functionality indicator identifying a performance level for the piece of building equipment;
identify a second node of the plurality of nodes representing the functionality indicator by identifying an edge of the plurality of edges relating the second node to the first node; and
cause the second node to store the value for the functionality indicator, or a link to the value for the functionality indicator.

2. The building system of claim 1, wherein the functionality indicator indicates a state of the piece of building equipment and a confidence level that the state determined for the piece of building equipment is correct.

3. The building system of claim 1, wherein the instructions cause the one or more processors to:
generate a first functionality indicator for a first operational capability of the piece of building equipment and a second functionality indicator for a second operational capability of the piece of building equipment; and
generate the value for the functionality indicator based on the first functionality indicator and the second functionality indicator.

4. The building system of claim 3, wherein a third node of the plurality of nodes represents the first operational capability and a fourth node of the plurality of nodes represents the first functionality indicator and is related to the third node by a second edge of the plurality of edges;
wherein a fifth node of the plurality of nodes represents the second operational capability and a sixth node of the plurality of nodes represents the second functionality indicator and is related to the fifth node by a third edge of the plurality of edges;
wherein a fourth edge of the plurality of edges relates the first node to the third node;
wherein a fifth edge of the plurality of edges relates the first node to the fifth node.

5. The building system of claim 1, wherein the instructions cause the one or more processors to:
detect an absence of one or more particular diagnostic message responses that were expected to be received from the piece of building equipment responsive to the one or more diagnostic messages; and
generate the value for the functionality indicator based on an indication of the absence of the one or more particular diagnostic message responses.

6. The building system of claim 1, wherein the instructions cause the one or more processors to:
compare the one or more operations of the piece of building equipment to one or more expected operations associated with the one or more diagnostic messages; and
determine the value for the functionality indicator of the piece of building equipment based on a result of comparing the one or more operations of the piece of building equipment to the one or more expected operations.

7. The building system of claim 1, wherein the instructions cause the one or more processors to:
determine, based on the building graph, that an operation of the piece of building equipment is detectable by a second piece of building equipment;
execute a diagnostics routine comprising causing, by a first digital twin, the piece of building equipment to perform the operation and receiving, by a second digital twin, one or more detections of the operation by the second piece of building equipment; and
generate the value for the functionality indicator for the piece of building equipment based on a result of the diagnostics routine.

8. The building system of claim 7, wherein:
a third node of the plurality of nodes represents the second piece of building equipment; and
one or more edges of the plurality of edges relate the first node to the third node indicating that the operation of the piece of building equipment is detectable by the second piece of building equipment;
wherein the instructions cause the one or more processors to determine that the operation of the piece of building equipment is detectable by the second piece of building equipment by identifying the one or more edges of the plurality of edges relating the first node to the third node.

9. The building system of claim 8, wherein:
a fourth node of the plurality of nodes indicates a space of the building;

a first edge of the one or more edges between the fourth node and the first node indicates that the piece of building equipment is located in the space of the building; and a second edge of the one or more edges between the third node and the fourth node indicates that the second piece of building equipment is located in the space of the building.

10. A method comprising:

storing, by a processing circuit, a building graph comprising a plurality of nodes representing a plurality of entities of a building and a plurality of edges between the plurality of nodes representing a plurality of relationships;

identifying, by the processing circuit, a piece of building equipment to perform a diagnostic on based on a first node of the plurality of nodes, the first node representing the piece of building equipment;

determining, by the processing circuit, based on the building graph, that an operation of the piece of building equipment is detectable by a second piece of building equipment;

executing, by the processing circuit, a diagnostics routine comprising causing, by a first digital twin, the piece of building equipment to perform the operation and receiving, by a second digital twin, one or more detections of the operation by the second piece of building equipment;

generating, by the processing circuit, a value for a functionality indicator based on a result of the diagnostics routine, the functionality indicator identifying a performance level for the piece of building equipment;

identifying, by the processing circuit, second node of the plurality of nodes representing the functionality indicator by identifying an edge of the plurality of edges relating the first node to the second node; and causing, by the processing circuit, the second node of the digital twin representing the functionality indicator to store the value for the functionality indicator, or a link to the value for the functionality indicator.

11. The method of claim 10, wherein the functionality indicator indicates a state of the piece of building equipment and a confidence level that the state determined for the piece of building equipment is correct.

12. The method of claim 10, further comprising:

comparing, by the processing circuit, one or more operations of the piece of building equipment to one or more expected operations; and determining, by the processing circuit, the value for the functionality indicator of the piece of building equipment based on a result of comparing the one or more operations of the piece of building equipment to the one or more expected operations.

13. The method of claim 10, further comprising:

determining, by the processing circuit, one or more diagnostic messages based on the building graph and communicate the one or more diagnostic messages, by the digital twin, to the piece of building equipment causing the piece of building equipment to perform one or more operations;

receiving, by the processing circuit, one or more diagnostic message responses from the piece of building equipment indicating the one or more operations of the piece of building equipment; and generating, by the processing circuit, the value for the functionality indicator based on the one or more diagnostic message responses.

14. The method of claim 10, further comprising:

generating, by the processing circuit, a first functionality indicator for a first operational capability of the piece of building equipment and a second functionality indicator for a second operational capability of the piece of building equipment; and generating, by the processing circuit, the value for the functionality indicator based on the first functionality indicator and the second functionality indicator.

15. The method of claim 14, wherein a third node of the plurality of nodes represents the first operational capability and a fourth node of the plurality of nodes represents the first functionality indicator and is related to the third node by a second edge of the plurality of edges;

wherein a fifth node of the plurality of nodes represents the second operational capability and a sixth node of the plurality of nodes represents the second functionality indicator and is related to the third node by a third edge of the plurality of edges;

wherein a fourth edge of the plurality of edges relates the first node to the third node;

wherein a fifth edge of the plurality of edges relates the first node to the fifth node.

16. The method of claim 10, wherein:

a third node of the plurality of nodes represents the second piece of building equipment; and one or more edges of the plurality of edges relate the first node to the third node indicating that the operation of the piece of building equipment is detectable by the second piece of building equipment;

wherein the method further comprises determining, by the processing circuit, that the operation of the piece of building equipment is detectable by the second piece of building equipment by identifying the one or more edges of the plurality of edges relating the first node to the third node;

wherein:

a fourth node of the plurality of nodes indicates a space of the building;

a first edge of the one or more edges between the fourth node and the first node indicates that the piece of building equipment is located in the space of the building; and a second edge of the one or more edges between the third node and the fourth node indicates that the second piece of building equipment is located in the space of the building.

17. One or more non-transitory storage medium storing instructions thereon that, when executed by one or more processors, cause the one or more processors to:

store a digital twin comprising a building graph, the building graph comprising a plurality of nodes representing a plurality of entities of a building and a plurality of edges between the plurality of nodes representing relationships between the plurality of entities;

identify a piece of building equipment to perform a diagnostic on based on a first node of the plurality of nodes, the first node representing the piece of building equipment;

determine one or more diagnostic messages based on the building graph and communicate the one or more diagnostic messages, by the digital twin, to the piece of building equipment causing the piece of building equipment to perform one or more operations;

receive one or more diagnostic message responses from the piece of building equipment indicating the one or more operations of the piece of building equipment;

generate a value for a functionality indicator based on the one or more diagnostic message responses, the functionality indicator identifying a performance level for the piece of building equipment;

generate a second node representing the functionality indicator and an edge to connect the first node and the second node; and cause the building graph to include the second node and the edge connecting the first node and the second node.

18. The one or more non-transitory storage medium of claim 17, wherein the instructions cause the one or more processors to:

detect an absence of one or more particular diagnostic message responses that were expected to be received from the piece of building equipment responsive to the one or more diagnostic messages; and generate the value for the functionality indicator based on an indication of the absence of the one or more particular diagnostic message responses.

19. The one or more non-transitory storage medium of claim 17, wherein the instructions cause the one or more processors to:

compare the one or more operations of the piece of building equipment to one or more expected operations associated with the one or more diagnostic messages; and determine the value for the functionality indicator of the piece of building equipment based on a result of comparing the one or more operations of the piece of building equipment to the one or more expected operations.

\* \* \* \* \*